(12) United States Patent
Wood et al.

(10) Patent No.: US 6,790,126 B2
(45) Date of Patent: Sep. 14, 2004

(54) AGGLOMERATE ABRASIVE GRAIN AND A METHOD OF MAKING THE SAME

(75) Inventors: William P. Wood, Golden Valley, MN (US); James L. McArdle, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 09/972,315

(22) Filed: Oct. 5, 2001

(65) Prior Publication Data

US 2002/0160694 A1 Oct. 31, 2002

Related U.S. Application Data

(60) Provisional application No. 60/238,844, filed on Oct. 6, 2000, and provisional application No. 60/238,826, filed on Oct. 6, 2000.

(51) Int. Cl.$^7$ ................................................. B24B 1/00
(52) U.S. Cl. .................... 451/41; 451/526; 451/533; 451/534; 451/540; 51/295; 51/296; 51/307; 51/308; 51/309
(58) Field of Search .................... 451/41, 526, 533, 451/534, 540; 51/295, 296, 307, 308, 309

(56) References Cited

U.S. PATENT DOCUMENTS

| | | |
|---|---|---|
| 1,910,444 A | 5/1933 | Nicholson |
| 2,194,472 A | 3/1940 | Jackson |
| 2,216,728 A | 10/1940 | Benner et al. |
| 2,768,087 A | 10/1956 | Bird |
| 2,958,593 A | 11/1960 | Hoover et al. |

(List continued on next page.)

FOREIGN PATENT DOCUMENTS

| | | |
|---|---|---|
| DE | 26 08 273 | 12/1977 |
| DE | 2941298 A | 4/1981 |
| EP | 0 109 581 | 5/1984 |
| EP | 0 306 161 | 3/1989 |
| EP | 0 306 162 B1 | 3/1989 |
| EP | 0 306 162 | 3/1989 |
| EP | 0444824 A2 | 4/1991 |
| EP | 0530983 A2 | 10/1993 |
| EP | 0601594 A1 | 6/1994 |
| EP | 0 709 347 | 5/1996 |
| JP | 62-136373 | 1/1977 |
| JP | 53-41833 | 7/1978 |
| JP | 62079841 A | 10/1985 |
| JP | 52-27394 | 6/1987 |
| JP | 3-161273 | 7/1991 |
| JP | 3-281174 | 12/1991 |
| RU | 2064941 | 8/1996 |
| SU | 933431 | 6/1982 |
| SU | 1555117 | 4/1990 |
| WO | WO 92/09543 | 6/1992 |
| WO | WO 93/12911 | 7/1993 |
| WO | WO 95/03370 | 2/1995 |
| WO | WO 95/11774 | 5/1995 |
| WO | WO 95/19871 | 7/1995 |
| WO | WO 96/10471 | 4/1996 |

(List continued on next page.)

OTHER PUBLICATIONS

Pending U.S. patent application Ser. No. 09/618,876, Rosenflanz, filed Jul. 19, 2000.

(List continued on next page.)

*Primary Examiner*—Joseph J. Hail, III
*Assistant Examiner*—Shantese McDonald
(74) *Attorney, Agent, or Firm*—Bradford B. Wright; Gregory D. Allen

(57) ABSTRACT

Agglomerate abrasive grain is disclosed. The agglomerate abrasive grain can be incorporated into abrasive products such as coated abrasives, bonded abrasives, nonwoven abrasives, and abrasive brushes. A method of making agglomerate abrasive grain is also disclosed.

210 Claims, 9 Drawing Sheets

U.S. PATENT DOCUMENTS

| | | |
|---|---|---|
| 3,041,156 A | 6/1962 | Rowse et al. |
| 3,079,243 A | 2/1963 | Ueltz |
| 3,118,265 A | 1/1964 | Shaver |
| 3,491,491 A | 1/1970 | Ueltz |
| 3,491,492 A | 1/1970 | Ueltz |
| 3,502,453 A | 3/1970 | Baratto |
| 3,637,360 A | 1/1972 | Ueltz et al. |
| 3,693,893 A | 9/1972 | McIntyre |
| 3,781,172 A | 12/1973 | Pett et al. |
| 3,828,801 A | 8/1974 | Merrill |
| 3,864,101 A | 2/1975 | Charvat |
| 3,874,856 A | 4/1975 | Leeds |
| 3,891,408 A | 6/1975 | Rowse et al. |
| 3,893,826 A | 7/1975 | Quinan et al. |
| 3,911,202 A | 10/1975 | Stine et al. |
| 3,916,584 A | 11/1975 | Howard et al. |
| 3,924,023 A | 12/1975 | Boranian et al. |
| 3,928,949 A | 12/1975 | Wagner |
| 3,955,942 A | 5/1976 | Cordon et al. |
| 3,990,479 A | 11/1976 | Stine et al. |
| 4,045,416 A | 8/1977 | Robson et al. |
| 4,065,407 A | 12/1977 | Bambrick |
| 4,073,096 A | 2/1978 | Ueltz et al. |
| 4,112,631 A | 9/1978 | Howard |
| RE29,808 E | 10/1978 | Wagner |
| 4,126,429 A | 11/1978 | Watson |
| 4,132,533 A | 1/1979 | Löhmer et al. |
| 4,194,887 A | 3/1980 | Ueltz et al. |
| 4,227,350 A | 10/1980 | Fitzer |
| 4,252,544 A | 2/1981 | Takahashi |
| 4,305,898 A | 12/1981 | Obersby |
| 4,311,489 A | 1/1982 | Kressner |
| 4,314,827 A | 2/1982 | Leitheiser et al. |
| 4,318,766 A | 3/1982 | Smith |
| 4,355,489 A | 10/1982 | Heyer et al. |
| 4,364,746 A | 12/1982 | Bitzer et al. |
| 4,364,877 A | 12/1982 | Clement et al. |
| 4,393,021 A | 7/1983 | Eisenberg et al. |
| 4,407,967 A | 10/1983 | Luks |
| 4,453,107 A | 6/1984 | Keenan |
| 4,456,498 A | 6/1984 | Churchland |
| 4,457,767 A | 7/1984 | Poon et al. |
| 4,486,200 A | 12/1984 | Heyer et al. |
| 4,518,397 A | 5/1985 | Leitheiser et al. |
| 4,541,842 A | 9/1985 | Rostoker |
| 4,543,107 A | 9/1985 | Rue |
| 4,562,275 A | 12/1985 | Speer et al. |
| 4,563,388 A | 1/1986 | Bonk et al. |
| 4,575,384 A | 3/1986 | Licht et al. |
| 4,588,419 A | 5/1986 | Caul et al. |
| 4,611,766 A | 9/1986 | Seifert |
| 4,623,364 A | 11/1986 | Cottringer et al. |
| 4,652,274 A | 3/1987 | Boettcher et al. |
| 4,652,275 A | 3/1987 | Bloecher et al. |
| 4,734,104 A | 3/1988 | Broberg |
| 4,735,632 A | 4/1988 | Oxman et al. |
| 4,737,163 A | 4/1988 | Larkey |
| 4,737,407 A | 4/1988 | Wycech |
| 4,741,743 A | 5/1988 | Narayanan et al. |
| 4,744,802 A | 5/1988 | Schwabel |
| 4,749,617 A | 6/1988 | Canty |
| 4,751,137 A | 6/1988 | Hälg et al. |
| 4,751,138 A | 6/1988 | Tumey et al. |
| 4,751,743 A | 6/1988 | Ishino |
| 4,759,507 A | 7/1988 | Lynch et al. |
| 4,768,722 A | 9/1988 | Lynch et al. |
| 4,770,671 A | 9/1988 | Monroe et al. |
| 4,773,599 A | 9/1988 | Lynch et al. |
| 4,789,507 A | 12/1988 | Wesley et al. |
| 4,799,939 A | 1/1989 | Bloecher et al. |
| 4,800,685 A | 1/1989 | Haynes, Jr. |
| 4,814,029 A | 3/1989 | Butcher |
| 4,816,298 A | 3/1989 | Alderman et al. |
| 4,826,799 A | 5/1989 | Cheng et al. |
| 4,840,809 A | 6/1989 | Hsu |
| 4,848,041 A | 7/1989 | Kruschke |
| 4,881,951 A | 11/1989 | Wood et al. |
| 4,895,994 A | 1/1990 | Cheng et al. |
| 4,898,597 A | 2/1990 | Hay |
| 4,900,698 A | 2/1990 | Lundsager |
| 4,903,440 A | 2/1990 | Larson |
| 4,903,444 A | 2/1990 | Berndt, Jr. |
| 4,906,523 A | 3/1990 | Bilkadi et al. |
| 4,918,874 A | 4/1990 | Tiefenbach, Jr. |
| 4,933,234 A | 6/1990 | Kobe et al. |
| 4,951,427 A | 8/1990 | St. Pierre |
| 4,954,060 A | 9/1990 | Hsu |
| 4,960,441 A | 10/1990 | Pellow et al. |
| 4,964,883 A | 10/1990 | Morris et al. |
| 4,985,340 A | 1/1991 | Palazzotto et al. |
| 4,989,597 A | 2/1991 | Werner |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,028,483 A | 7/1991 | Chernega et al. |
| 5,038,453 A | 8/1991 | Kurita et al. |
| 5,039,311 A | 8/1991 | Bloecher |
| 5,042,991 A | 8/1991 | Kunz et al. |
| 5,051,200 A | 9/1991 | Srail et al. |
| 5,057,371 A | 10/1991 | Canty et al. |
| 5,061,294 A | 10/1991 | Harmer et al. |
| 5,078,596 A | 1/1992 | Carberry et al. |
| 5,085,671 A | 2/1992 | Martin et al. |
| 5,089,536 A | 2/1992 | Palazzotto |
| 5,090,968 A | 2/1992 | Pellow |
| 5,094,672 A | 3/1992 | Giles, Jr. et al. |
| 5,095,665 A | 3/1992 | Nagata et al. |
| 5,096,465 A | 3/1992 | Chen et al. |
| 5,110,332 A | 5/1992 | Isaksson |
| 5,118,326 A | 6/1992 | Lee et al. |
| 5,131,923 A | 7/1992 | Markhoff-Matheny et al. |
| 5,131,926 A | 7/1992 | Rostoker et al. |
| 5,137,542 A | 8/1992 | Buchanan et al. |
| 5,139,978 A | 8/1992 | Wood |
| 5,143,522 A | 9/1992 | Gibson et al. |
| 5,152,917 A | 10/1992 | Pieper et al. |
| 5,160,509 A | 11/1992 | Carman et al. |
| 5,164,348 A | 11/1992 | Wood |
| 5,178,644 A | 1/1993 | Huzinec |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,219,462 A | 6/1993 | Bruxvoort et al. |
| 5,219,806 A | 6/1993 | Wood |
| 5,236,472 A | 8/1993 | Kirk et al. |
| 5,261,612 A | 11/1993 | Ftaiha |
| 5,282,875 A | 2/1994 | Wood et al. |
| 5,300,129 A | 4/1994 | Clark |
| 5,318,604 A | 6/1994 | Gorsuch et al. |
| 5,318,605 A | 6/1994 | Carman |
| 5,330,113 A | 7/1994 | Poser et al. |
| 5,360,587 A | 11/1994 | Brotz et al. |
| 5,366,523 A | 11/1994 | Rowenhorst et al. |
| 5,372,989 A * | 12/1994 | Geigle et al. ............... 504/116 |
| 5,378,251 A | 1/1995 | Culler et al. |
| 5,378,252 A | 1/1995 | Follensbee |
| 5,417,726 A | 5/1995 | Stout et al. |
| 5,418,369 A | 5/1995 | Moore et al. |
| 5,427,595 A | 6/1995 | Pihl et al. |

| | | |
|---|---|---|
| 5,429,647 A | 7/1995 | Larmie |
| 5,436,063 A | 7/1995 | Follett et al. |
| 5,443,906 A | 8/1995 | Pihl et al. |
| 5,453,106 A | 9/1995 | Roberts |
| 5,454,750 A | 10/1995 | Cosmano et al. |
| 5,489,204 A | 2/1996 | Conwell et al. |
| 5,496,386 A | 3/1996 | Broberg et al. |
| 5,496,387 A | 3/1996 | Culler |
| 5,498,268 A | 3/1996 | Gagliardi et al. |
| 5,498,269 A | 3/1996 | Larmie |
| 5,500,273 A | 3/1996 | Holmes et al. |
| 5,520,711 A | 5/1996 | Helmin |
| 5,534,470 A | 7/1996 | Andrus et al. |
| 5,547,479 A | 8/1996 | Conwell et al. |
| 5,549,962 A | 8/1996 | Holmes et al. |
| 5,550,723 A | 8/1996 | Ullman |
| 5,551,963 A | 9/1996 | Larmie |
| 5,578,098 A | 11/1996 | Gagliardi et al. |
| 5,593,467 A | 1/1997 | Monroe |
| 5,609,706 A | 3/1997 | Benedict et al. |
| 5,611,829 A | 3/1997 | Monroe et al. |
| 5,628,952 A | 5/1997 | Holmes et al. |
| 5,645,618 A | 7/1997 | Monroe et al. |
| 5,645,619 A | 7/1997 | Erickson et al. |
| 5,649,984 A | 7/1997 | Sigalas et al. |
| 5,651,801 A * | 7/1997 | Monroe et al. ............... 51/309 |
| 5,669,941 A | 9/1997 | Peterson |
| 5,679,067 A | 10/1997 | Johnson et al. |
| 5,690,705 A | 11/1997 | Holmes et al. |
| 5,714,259 A | 2/1998 | Holmes et al. |
| 5,725,162 A | 3/1998 | Garg et al. |
| 5,733,178 A | 3/1998 | Ohishi |
| 5,738,696 A | 4/1998 | Wu |
| 5,738,697 A | 4/1998 | Wu et al. |
| 5,756,409 A | 5/1998 | van Dijen et al. |
| 5,776,214 A | 7/1998 | Wood |
| 5,779,743 A | 7/1998 | Wood |
| 5,830,548 A | 11/1998 | Andersen et al. |
| 5,840,405 A | 11/1998 | Shusta et al. |
| 5,855,632 A | 1/1999 | Stoetzel et al. |
| 5,863,308 A | 1/1999 | Qi et al. |
| 5,893,935 A | 4/1999 | Wood |
| 5,903,951 A | 5/1999 | Ionta et al. |
| 5,908,477 A | 6/1999 | Harmer et al. |
| 5,908,478 A | 6/1999 | Wood |
| 5,910,471 A | 6/1999 | Christianson et al. |
| 5,914,356 A | 6/1999 | Erbe |
| 5,942,015 A | 8/1999 | Culler et al. |
| 5,954,844 A | 9/1999 | Law et al. |
| 5,958,794 A | 9/1999 | Bruxvoort et al. |
| 5,961,674 A | 10/1999 | Gagliardi et al. |
| 5,975,988 A | 11/1999 | Christianson |
| 5,997,461 A | 12/1999 | Armington et al. |
| 6,013,222 A | 1/2000 | Douglas et al. |
| 6,054,093 A | 4/2000 | Torre, Jr. et al. |
| 6,056,794 A | 5/2000 | Stoetzel et al. |
| 6,096,107 A | 8/2000 | Caracostas et al. |
| 6,155,910 A | 12/2000 | Lamphere et al. |
| 6,171,224 B1 | 1/2001 | Phillips |
| 6,228,133 B1 | 5/2001 | Thurber et al. |
| 6,264,710 B1 * | 7/2001 | Erickson ..................... 51/309 |
| 6,319,108 B1 | 11/2001 | Adefris et al. |
| 6,645,263 B2 | 11/2003 | Keipert et al. |
| 6,702,650 B2 | 3/2004 | Adefris |
| 2002/0160694 A1 | 10/2002 | Wood et al. |

FOREIGN PATENT DOCUMENTS

| | | |
|---|---|---|
| WO | WO 97/21531 | 6/1997 |
| WO | WO 98/04386 | 5/1998 |
| WO | WO 98/58769 | 12/1998 |
| WO | WO 99/42250 | 8/1999 |
| WO | WO 99/51400 | 10/1999 |
| WO | WO 99/56914 | 11/1999 |
| WO | WO 01/08880 A1 | 2/2001 |
| WO | WO 01/85393 | 11/2001 |
| WO | WO 02/38696 A1 | 5/2002 |

OTHER PUBLICATIONS

Pending U.S. patent application Ser. No. 09/618,879, Rosenflanz et al., filed Jul. 19, 2000.

Pending U.S. patent application Ser. No. 09/619,106, Rosenflanz, filed Jul. 19, 2000.

Pending U.S. patent application Ser. No. 09/619,191, Rosenflanz et al., filed Jul. 19, 2000.

Pending U.S. patent application Ser. No. 09/619,192, Rosenflanz, filed Jul. 19, 2000.

Pending U.S. patent application Ser. No. 09/619,215, Rosenflanz, filed Jul. 19, 2000.

Pending U.S. patent application Ser. No. 09/619,289, Rosenflanz, filed Jul. 19, 2000.

Pending U.S. patent application Ser. No. 09/619,563, Rosenflanz et al., filed Jul. 19, 2000.

Pending U.S. patent application Ser. No. 09/619,729, Rosenflanz, filed Jul. 19, 2000.

Pending U.S. patent application Ser. No. 09/619,744, Rosenflanz, filed Jul. 19, 2000.

Pending U.S. patent application Ser. No. 09/620,262, Rosenflanz et al., filed Jul. 19, 2000.

Pending U.S. patent application Ser. No. 09/688,444, Culler et al., filed Oct. 16, 2000.

Pending U.S. patent application Ser. No. 09/688,484, Culler et al., filed Oct. 16, 2000.

Pending U.S. patent application Ser. No. 09/688,486, Culler et al., filed Oct. 16, 2000.

Pending U.S. patent application Ser. No. 09/704,843, Rosenflanz, filed Nov. 2, 2000.

Pending U.S. patent application Ser. No. 09/772,730, Rosenflanz, filed Jan. 30, 2001.

Pending U.S. patent application Ser. No. 09/971,899, McArdle et al., filed Oct. 5, 2001.

Pending U.S. patent application Ser. No. 09/972,316, McArdle et al., filed Oct. 5, 2001.

E. Matijevic et al., Ferric Hydrous Oxide Sols, vol. 63, J. Colloidal Interface Science, p. 509–524 (1978).

B. Voight et al., Formation of Pure Haematite by Hydrolysis of Iron (III) Salt Solutions Under Hydrothermal Conditions, vol. 21, Crystal Research Technology, p. 1177–1183 (1986).

R.N. Sylva, The Hydrolysis of Iron (III), vol. 22, Rev. Pure Applied Chemistry, p. 115–132 (1972).

T. Misawa et al., The Mechanism of Formation of Iron Oxide and Oxyhydroxides in Aqueous Solutions at Room Temperature, vol. 14, Corrosion Science, p. 131–149 (1974).

P. Lafferty, The Dictionary of Science, p. 386 (1993), Simon & Schuster, NY.

R.C. Weast, Handbook of Chemistry and Physics, p. F–22 (1975), CRC Press, Cleveland, Ohio.

R. K. McGeary, Mechanical Packing of Spherical Particles, vol. 44, No. 10, J. American Ceramic Society, p. 513–522 (Oct. 1961).

Vol. 1. P.W. McMillan: Glass–Ceramics. 1964 (Second Addition, 1979).

U.S. patent application Ser. No. 09/666,820, filed Sep. 21, 2000, Abrasion–Resistant Laminate.

U.S. patent application Ser. No. 09/687,376, filed Oct. 13, 2000, Coated Abrasive Having Laminate Backing Material and Method of Making the Same.

U.S. patent application Ser. No. 09/710,371, filed Nov. 10, 2000, Spray Drying Methods of Making Agglomerate Abrasive Grains and Abrasive Articles.

U.S. patent application Ser. No. 09/791,157, filed Feb. 22, 2001, Optical Bodies Containing Cholesteric Liquid Crystal Material and Methods of Manufacture.

U.S. patent application Ser. No. 09/942,007, filed Aug. 29, 2001, Composite Abrasive Particles and Method of Manufacture.

60/238,826, Oct. 6, 2000, Methods of Making Agglomerate Abrasive Grain.

60/238,844, Oct. 6, 2000, Agglomerate Abrasive Grain.

Culler et al., U.S.S.N. 10/612,999 "Method of Making An Agglomerate Particle", Filed Jul. 2, 2003 (Case No. 56086US012) and "Preliminary Amendment And Remarks", Filed Jul. 2, 2003.

McArdle et al., U.S.S.N. 10/776,156 "Ceramic Aggregate Particles", Filed Feb. 11, 2004 (Case No. 55304US016).

* cited by examiner

AGGLOMERATE ABRASIVE GRAIN AND A METHOD OF MAKING THE SAME

This application claims priority to provisional applications having U.S. Serial Nos. 60/238,844 and 60/238,826, filed Oct. 6, 2000, the disclosures of which are incorporated by reference.

FIELD OF THE INVENTION

This invention relates to agglomerate abrasive grain comprising a plurality of abrasive particles bonded together via a sintered, alumina-based bonding material, and a method of making the agglomerate abrasive grain. The agglomerate abrasive grain can be incorporated into a variety of abrasive articles, including bonded abrasives, coated abrasives, nonwoven abrasives, and abrasive brushes.

BACKGROUND OF THE INVENTION

There are a variety of abrasive particles (e.g., diamond particles, cubic boron nitride particles, fused abrasive particles (including fused alumina, heat treated fused alumina, fused alumina zirconia, and the like), and sintered, ceramic abrasive particles (including sol-gel-derived abrasive particles) known in the art. In some abrading applications, the abrasive particles are used in loose form or a slurry, while in others the particles are incorporated into abrasive products (including: bonded abrasives, coated abrasives and nonwoven abrasives).

Bonded abrasives typically comprise a plurality of abrasive particles bonded together to form a shaped mass. Coated abrasives typically comprise a plurality of abrasive particles bonded to a backing. Nonwoven abrasives typically comprise a plurality of abrasive particles bonded onto and into a lofty, porous, nonwoven substrate. Typical bonding materials for bonded abrasives are organic binders, vitreous binders, and metallic binders, while for coated and nonwoven abrasives they are typically organic binders. Criteria used in selecting abrasive particles used for a particular abrading application typically include: abrading life, rate of cut, substrate surface finish, grinding efficiency, and product cost.

The abrasive industry and their customers are continually looking for ways to improve one or more of these abrading criteria. For the past one hundred years or so, fused alumina abrasive particles have been widely utilized. Fused alumina abrasive particles are typically made by charging a furnace with an alumina source (such as aluminum ore or bauxite), as well as other desired additives, heating the material above its melting point, cooling the melt to provide a solidified mass, crushing the solidified mass into particles, and then screening and grading the particles to provide the desired abrasive particle size distribution. Over the past thirty years or so, there have been numerous inventions and developments concerning abrasive particles. One of these inventions was the development of co-fused alumina-zirconia abrasive particles. Additional information on alumina-zirconia abrasive particles can be found, for example, in U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), and U.S. Pat. No. 5,143,522 (Gibson et al.).

Although fused alpha alumina abrasive particles and fused alumina-zirconia abrasive particles are still widely used in abrading applications (including those utilizing coated and bonded abrasive products), the premier abrasive particles for many abrading applications since about the mid-1980's are sol-gel-derived alpha alumina particles (also referred to as sintered, ceramic alpha alumina particles). The sol-gel-derived alpha alumina abrasive particles may have a microstructure made up of very fine alpha alumina crystallites, with or without the presence of secondary phases added (see, e.g., U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), (Pellow), U.S. Pat. No. 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), and U.S. Pat. No. 5,725,162 (Garg et al.)).

Coated abrasives tend to be "more flexible" than bonded abrasives; thus coated abrasives are widely utilized where the abrasive article needs to conform to the workpiece surface. Coated abrasives tend to have one or several layers of abrasive particles. It is generally preferred to orient these abrasive particles to enhance their cutting ability. However in some instances during the initial abrading, coated abrasives provide relatively very high cut rates. With time, the cut rate diminishes until the coated abrasive no longer provides acceptable cut rates.

To address the inconsistent cut rates with time, agglomerate abrasive grains have been developed (see, e.g., U.S. Pat. No. 3,928,949 (Wagner), U.S. Pat. No. 4,132,533 (Lohrner), U.S. Pat. No. 4,311,489 (Kressner), U.S. Pat. No. 4,393,021 (Eisenberg), U.S. Pat. No. 4,562,275 (Bloecher et al.), U.S. Pat. No. 4,799,939 (Bloecher et al.), U.S. Pat. No. 5,318,604 (Gorsuch), U.S. Pat. No. 5,550,723 (Holmes et al.), and U.S. Pat. No. 5,975,988 (Christiansen)). In the case of coated abrasives, these agglomerate abrasive grains are bonded to the backing to form an abrasive article. The agglomerate abrasive grains typically comprises a plurality of abrasive particles bonded together with a binder; usually an organic binder or inorganic binder.

One disadvantage with these abrasive agglomerate particles is that they are composite particles (i.e., abrasive particles and binder). The binder may adversely influence the abrading characteristics of the agglomerate grain. What is desired in the industry is a coated abrasive that provides a relatively long life and a cut rate that is relatively consistent over time.

Bonded abrasives are three dimensional in structure. Ideal bonded abrasive abrade the workpiece and when the abrasive particles are worn and dulled, these abrasive particles are expelled from the bonded abrasive to expose new, fresh cutting abrasive particles. In adequate adhesion between the abrasive particles and the bond material, can lead to premature release of the abrasive particles from the abrasive article. If the abrasive particles are prematurely released, the resulting bonded abrasive life is typically less than desired. What is desired in the industry is a bonded abrasive that exhibits good adhesion between the abrasive particles and the bond material.

In another aspect, to minimize inventory, and other associated manufacturing associated costs, it is typically preferred to make an abrasive grain that provides good grinding performance (e.g., long life, high cut rates, consistent cut rates, consistent surface finish and the like) in both coated abrasive and bonded abrasive applications. What is desired often in a coated abrasive is an abrasive grain that exhibits long life. What is desired often in a bonded abrasive is long life associated with good adhesion between the abrasive particles and the bonded abrasive binder.

SUMMARY OF THE INVENTION

The present invention provides agglomerate abrasive grain comprising a plurality of abrasive particles bonded together via sintered bonding material. The abrasive particles may comprise one or more abrasive particles including, but not limited to, fused aluminum oxide (including white fused alumina, heat-treated aluminum oxide, and brown aluminum oxide), silicon carbide, boron carbide, titanium carbide, diamond, cubic boron nitride, garnet, fused alumina-zirconia, sintered alpha alumina-based abrasive particles, and the like. Preferably, the bonding material comprises, on a theoretical oxide basis, at least 50 percent by weight $Al_2O_3$, based on the total metal oxide content of the bonding material. The bonding material may comprise, on a theoretical oxide basis, at least 60, 65, 70, 75, 80, 85, 90, 95, 97, 98, 99, 99.5, or even 100 (i.e., consists essentially of) percent by weight $Al_2O_3$, based on the total metal oxide content of the bonding material. In another aspect, the bonding material typically is at least 70, 75, 80 85, 90, 95, 97, 98, 99, 100 percent crystalline.

In some embodiments of the present invention, the agglomerate abrasive grain may comprise a plurality of abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, and wherein the abrasive particles preferably have an average particle size of at least 5 micrometers. The average particle size of the particles in the agglomerate abrasive grain may be, at least 6, 7, 8, 9, 10, 15, 20, 25, or 30 micrometers, or larger.

In other embodiments of the present invention, the agglomerate abrasive grain according to the present invention may comprise a plurality of abrasive particles bonded together with a sintered, bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 15 percent. Desirably, the abrasive particles have a density of at least 90% (at least 95%, at least 96%, at least 97%, at least 98%, at least 98.5%, at least 99%, or even at least 99.5%) of theoretical density. In another aspect, desirably the agglomerate abrasive grain has a porosity value of at least 15 (at least 20, at least 25, at least 30, at least 35, at least 40, at least 45, at least 50, at least 55, or at least 60) percent.

The agglomerate abrasive grain of the present invention typically have a porosity value (determined as described in the Examples, below) of, in increasing order of preference, at least 10%, 15%, or 20%. Preferably, the porosity value is, in increasing order of preference, in the range from about 15% to about 60%, about 20% to about 50%, or about 30% to about 45%.

In one exemplary embodiment, the present invention provides agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to about 60 percent.

Another exemplary embodiment of the present invention provides agglomerate abrasive grain comprising a plurality of polycrystalline abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent.

Embodiments of abrasive grain according to the present invention may have an abrasive particle size distribution within the abrasive grain, which varies depending on the desired properties and specific use of the abrasive grain. Typically, at least three (typically at least four, five, six, seven, eight, nine, ten, fifteen, twenty, thirty, or forty) of the largest abrasive particles in the abrasive grain of the present invention have substantially the same volume. In another aspect, at least three (typically at least four, five, six, seven, eight, nine, ten, fifteen, twenty, thirty, or forty) of the largest abrasive particles in the abrasive grain of the present invention may be greater than 20, 25, 30, 40, or even 50 micrometers in size. In another aspect, the plurality of abrasive particles may have at least a bi-modal distribution, and wherein the average particle size of a first distribution of the particles is at least 25 percent (more typically at least 100 percent, or even at least 200 percent) by volume larger than the average particle size of a second distribution of the particles.

In another exemplary embodiment, the present invention provides agglomerate abrasive grain comprising a plurality of sintered, crystalline abrasive particles bonded together via crystalline ceramic, metal oxide bonding material, wherein the agglomerate abrasive grain comprises, on a theoretical oxide basis, at least 85% by weight $Al_2O_3$, based on the total metal oxide content of the agglomerate abrasive grain; and wherein at least three of the largest abrasive particles are greater than 20 micrometers in size.

In addition to abrasive particle size and size distribution, the crystal size of the crystals within abrasive grain according to the present invention may vary as desired. Preferably, the abrasive particles of agglomerate abrasive grain according to the present invention are comprised of crystals (e.g., alpha alumina crystals) having an average crystal size less than 10 micrometers (preferably, less than 5 micrometers, more preferably, less than 1 micrometer).

In one exemplary embodiment, the present invention provides agglomerate abrasive grain comprising a plurality of sintered polycrystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles have substantially the same volume.

In another exemplary embodiment, the present invention provides agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles are greater than 20 micrometers in size.

The present invention also provides methods for making agglomerate abrasive grain. Embodiments of such methods includes those comprising contacting a plurality of particles (i.e., abrasive particles, precursor abrasive particles, or a combination thereof) with a precursor bonding material such that the particles agglomerate together (provides a precursor agglomerate abrasive grain)); and heating the agglomerated particles at at least one temperature for a time sufficient to convert the agglomerated particles into agglomerate abrasive grain according of the present invention. An example of suitable precursor abrasive particles for use in the methods of the present invention is boehmite-based particles. Exemplary precursor bonding materials include crystalline ceramic oxide precursor materials such as boehmite (e.g., boehmite sols, and optionally metal oxides (e.g., alumina) and/or precursors thereof (e.g., metal nitrates).

Further, for example, embodiments of agglomerate abrasive grain according to the present invention may be made by a method comprising:

contacting a plurality of at least one of abrasive particles or precursor abrasive particles with a precursor bonding material such that the particles agglomerate together; and heating the agglomerated particles at at least one temperature for a time sufficient to convert the agglomerated particles into agglomerate abrasive grain comprising a plurality of abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the abrasive particles of the agglomerate abrasive grain have an average particle size of at least 5 micrometers.

Agglomerate abrasive grain of the present invention may also be made by a method comprising:

contacting a plurality of at least one of abrasive particles or precursor abrasive particles with a precursor bonding material such that the particles agglomerate together; and heating the agglomerated particles at at least one temperature for a time sufficient to convert the agglomerated particles into agglomerate abrasive grain comprising a plurality of abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the heat-treated abrasive particles have a density of at least 85% of theoretical density, and the agglomerate abrasive grain has a porosity value of at least 10 percent.

Embodiments of agglomerate abrasive grain according to the present invention may be formed from abrasive particle, precursor abrasive particle, or combination thereof may be used in the methods of the present invention to form agglomerate abrasive grain. An exemplary method according to the present invention comprises:

contacting dried, boehmite-based precursor particles in the presence of liquid (e.g., water) such that a plurality of the precursor particles agglomerate together; and heating the agglomerated particles at at least one temperature for a time sufficient to provide the agglomerate abrasive grain.

In some embodiments, it may be desirable to form an agglomerate abrasive grain, wherein the largest abrasive particles of the agglomerate abrasive grain have substantially the same volume. In these embodiments, the present invention provides a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles have substantially the same volume, the method comprising:

contacting dried, boehmite-based precursor particles in the presence of liquid (e.g., water) such that a plurality of the precursor particles agglomerate together; and heating the agglomerated particles at at least one temperature for a time sufficient to provide the agglomerate abrasive grain.

The present invention is directed to a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles have substantially the same volume, the method comprising:

contacting dried, boehmite-based precursor particles in the presence of liquid (e.g., water) such that a plurality of the precursor particles agglomerate together;

drying the agglomerated precursor particles;

calcining the dried agglomerated precursor particles to provide porous agglomerated precursor particles;

impregnating the porous agglomerated precursor particles with a composition comprising liquid (e.g., water) and at least one of metal oxide or metal oxide precursor; and heating the impregnated, agglomerated precursor particles at at least one temperature for a time sufficient to provide the agglomerate abrasive grain.

In some embodiments, it may be desirable to form an agglomerate abrasive grain, wherein the largest abrasive particles of the agglomerate abrasive grain are at least a given particle size. In these embodiments, the present invention provides a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles are greater than 20 micrometers in size, the method comprising:

contacting dried, boehmite-based precursor particles in the presence of liquid (e.g., water) such that a plurality of the precursor particles agglomerate together; and heating the agglomerated particles at at least one temperature for a time sufficient to provide the agglomerate abrasive grain.

The present invention also provides a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles are greater than 20 micrometers in size, the method comprising:

contacting dried, boehmite-based precursor particles in the presence of liquid (e.g., water) such that a plurality of the precursor particles agglomerate together;

drying the agglomerated precursor particles;

calcining the dried agglomerated precursor particles to provide porous agglomerated precursor particles;

impregnating the porous agglomerated precursor particles with a composition comprising liquid (e.g., water) and at least one of metal oxide or metal oxide precursor; and heating the impregnated, agglomerated precursor particles at at least one temperature for a time sufficient to provide the agglomerate abrasive grain.

In these embodiments, the present invention provides a method for making agglomerate abrasive grain comprising a plurality of sintered, crystalline, alpha alumina-based abrasive particles bonded together via crystalline ceramic, metal oxide bonding material, wherein the agglomerate abrasive grain comprises, on a theoretical oxide basis, at least 85% by weight alumina, based on the total metal oxide content of the agglomerate abrasive grain, and wherein at least three of the largest abrasive particles are greater than 20 micrometers in size, the method comprising:

contacting dried, boehmite-based precursor particles in the presence of liquid (e.g., water) such that a plurality of the precursor particles agglomerate together; and heating the agglomerated particles at at least one temperature for a time sufficient to provide the agglomerate abrasive grain.

The present invention also provides a method for making agglomerate abrasive grain comprising a plurality of sintered, crystalline, alpha alumina-based abrasive particles bonded together via crystalline ceramic, metal oxide bonding material, wherein the agglomerate abrasive grain comprises, on a theoretical oxide basis, at least 85% by weight alumina, based on the total metal oxide content of the agglomerate abrasive grain, and wherein at least three of the largest abrasive particles are greater than 20 micrometers in size, the method comprising:

contacting dried, boehmite-based precursor particles in the presence of liquid (e.g., water) such that a plurality of the precursor particles agglomerate together;

drying the agglomerated precursor particles;

calcining the dried agglomerated precursor particles to provide porous agglomerated precursor particles;

impregnating the porous agglomerated precursor particles with a composition comprising liquid (e.g., water) and at least one of metal oxide or metal oxide precursor; and heating the impregnated, agglomerated precursor particles at at least one temperature for a time sufficient to provide the agglomerate abrasive grain.

In yet other embodiments, it may be desirable to form agglomerate abrasive grain, wherein the agglomerate abrasive grain has a desired porosity value. In these embodiments, the present invention provides a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to 60 percent, the method comprising:

contacting dried, boehmite-based precursor particles in the presence of liquid (e.g., water) such that a plurality of the precursor particles agglomerate together; and heating the agglomerated particles at at least one temperature for a time sufficient to provide the agglomerate abrasive grain.

The present invention also provides a method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to 60 percent, the method comprising:

contacting dried, boehmite-based precursor particles in the presence of liquid (e.g., water) such that a plurality of the precursor particles agglomerate together; drying the agglomerated precursor particles;

calcining the dried agglomerated precursor particles to provide porous agglomerated precursor particles;

impregnating the porous agglomerated precursor particles with a composition comprising liquid (e.g., water) and at least one of metal oxide or metal oxide precursor; and heating the impregnated, agglomerated precursor particles at at least one temperature for a time sufficient to provide the agglomerate abrasive grain.

Optionally, methods for making embodiments of agglomerate abrasive grain according to the present invention optionally include utilizing curable binder precursor material, ceramic binder precursor material in forming precursor agglomerate abrasive grain, and at least partially curing the ceramic binder precursor material when converting the precursor agglomerate abrasive grain into agglomerate abrasive grain according to the present invention.

The present invention further provides abrasive articles of manufacture. Agglomerate abrasive grain according to the present invention may be incorporated into various abrasive articles such as coated abrasives, bonded abrasives (including vitrified and resinoid grinding wheels), nonwoven abrasives, and abrasive brushes. The abrasive articles typically comprise agglomerate abrasive grain according to the present invention and binder.

Typically, agglomerate abrasive grain according to the present invention are sufficiently porous to advantageously allow binder to penetrate therein. This feature is particularly advantageous for coated and bonded abrasive articles. Further with regard to coated abrasives, preferred agglomerate abrasive grain according to the present invention can have a long life and relatively consistent cut rate. In another aspect, embodiments of agglomerate abrasive grain according to the present invention may be made having a desired level of porosity and/or bond strength between abrasive particles in order to provide preferential wearing of the agglomerate abrasive grain. Such preferential wearing of the agglomerate abrasive grain may be particularly desirable for bonded abrasive articles.

Alternatively, for example, agglomerate abrasive grain according to the present invention may be used as in loose form, including in abrasive slurries and as shot blast media.

The present invention also provides a method of abrading a surface, said method comprising:

contacting at least agglomerate abrasive grain according to the present invention, with a surface of a workpiece; and moving at least of one the agglomerate abrasive grain or the surface relative to the other to abrade at least a portion of the surface with the agglomerate abrasive grain.

In this application:

"Crystalline ceramic, metal oxide bonding material" refers to ceramic, metal oxide bonding material that is at least 60% by volume crystalline.

"Substantially the same volume" means the volume of each relevant particle has a volume that is within fifty percent of the average volume of the relevant particles (i.e., if the three largest particles are to have substantially the same volume, each of the three largest particles have a volume that is within fifty percent of the average volume of the three largest particles);

"Alpha alumina-based abrasive particle or bonding material" as used herein refers to an abrasive particle comprising, on a theoretical oxide basis, at least 50% by weight 10 Al2O3, wherein at least 40% by weight of the total amount of alumina is present as alpha alumina, based on the total metal oxide content of the particle or bonding material, respectively.

"Abrasive particle precursor" or "unsintered abrasive particle" refers to a dried dispersion (i.e., "dried abrasive particle precursor") or a calcined dispersion (i.e., "calcined abrasive particle precursor"), typically in the form of particles, that has a density of less than 80% (typically less than 60%) of theoretical, and is capable of being sintered or impregnated with an impregnation composition and then sintered to provide a sintered abrasive particle.

"Boehmite-based precursor particle" refers to a precursor abrasive particle comprising at least 50 by weight boehmite, based on the total solids content of the particle.

"Sintering" refers to a process of heating at a temperature below the melting temperature of the material being heated to provide densification and crystallite growth to provide a tough, hard, and chemically resistant ceramic material. Sintered abrasive particles are not made by a fusion process wherein heating is carried out at a temperature above the melting temperature of the material being heated.

DETAILED DESCRIPTION

Agglomerate abrasive grain according to the present invention comprise a plurality of abrasive particles bonded together via a sintered, crystalline ceramic oxide bonding material. The sintered, bonding material desirably comprises, on a theoretical oxide basis, at least 50 percent by weight crystalline $Al_2O_3$, based on a total metal oxide content of the bonding material. Agglomerate abrasive grain may be prepared, for example, using processes, wherein (1) abrasive particles and/or abrasive particle precursors agglomerate via a precursor bonding material, and/or (2) a bonding material and/or abrasive particle precursor material form a sintered, crystalline bonding material when sufficiently heated.

Figure 6:
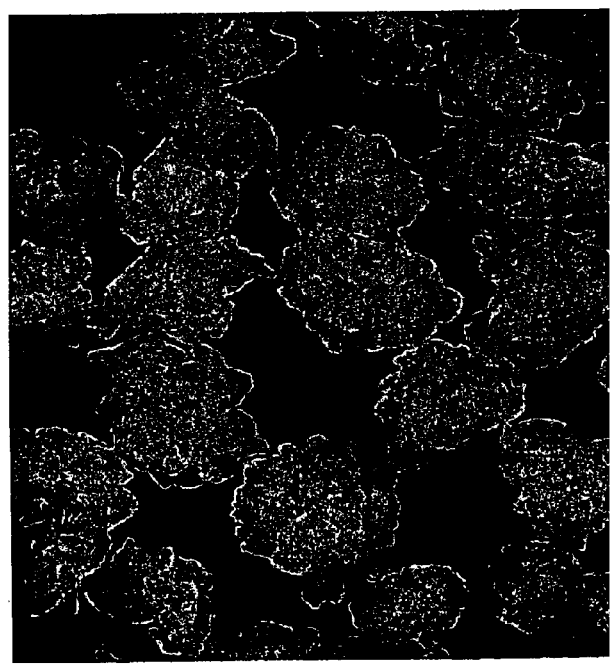
FIG. 6 is a photograph of exemplary agglomerate abrasive grain according to the present invention.

Embodiments of agglomerate abrasive grain according to one aspect of the present invention, can be made, for example, by contacting dried, boehmite-based precursor particles in the presence of liquid (e.g., water) such that a plurality of the precursor particles agglomerate together, and heating the agglomerated particles to at at least one temperature for a time sufficient to provide the agglomerate abrasive grain. When the dried boehmite-based precursor particles are contacted with a liquid (e.g., water), at least the outer portion of the particles soften and become sticky. Such particles tend to stick together forming agglomerates. When these agglomerates of boehmite-based precursor particles are heated at a temperature (including one or more temperatures) for a time sufficient to convert the precursor materials into sintered, alpha alumina-based material, agglomerated abrasive grain according to the present invention is produced. An exemplary agglomerate abrasive grain according to the present invention is shown in FIG. 6. Agglomerate abrasive grain of FIG. 6 is comprised of sintered alpha alumina-based abrasive particles 62 bonded together by alpha alumina-based bonding material 64 with porosity 66 between the agglomerated particles (i.e., there is open porosity between the particles).

Dried, boehmite-based precursor particles can be made by techniques known in the art (see, e.g., U.S. Pat. No. 4,314, 827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe), U.S. Pat. No. 4,744,802 (Schwabel), U.S. Pat. No. 4,848,041 (Kruschke), U.S. Pat. No. 4,881,951 (Wood et al.), U.S. Pat. No. 4,964,883 (Morris et al.),U.S. Pat. No. 5,139,978 (Wood), U.S. Pat. No. 5,164,348 (Wood), U.S. Pat. No. 5,201,916 (Berg et al.), U.S. Pat. No. 5,219,006 (Wood), U.S. Pat. No. 5,219,806 (Wood), U.S. Pat. No. 5,429,647 (Larmie), U.S. Pat. No. 5,498,269 (Larmie), U.S. Pat. No. 5,551,963 (Larmie), U.S. Pat. No. 5,593,647 (Monroe), U.S. Pat. No. 5,611,829 (Monroe et al.), and U.S. Pat. No. 5,645,619 (Erickson et al.), the disclosures of which are incorporated herein by reference). Dried, boehmite-based precursor particles are typically made from a dispersion comprised of liquid medium and boehmite (typically alpha alumina monohydrate and boehmite commonly referred to in the art as "pseudo" boehmite (i.e., $Al_2O_3 \cdot xH_2O$, wherein x=1 to 2)).

Suitable boehmites include those formerly marketed under the trade designation "HIQ" (e.g., "HIQ-10," "HIQ-20," "HIQ-30," and "HIQ-40") from Alcoa Industrial Chemicals, and those commercially available under the trade designations of "DISPERAL" from Sasol of Johannesburg, South Africa (formerly from Condea GmbH, Hamburg, Germany), and "DISPAL" (e.g., "DISPAL 23N480") and "CATAPAL" (e.g., "CATAPAL D") from Condea Vista Company, Houston, Tex. These boehmites or alumina monohydrates are in the alpha form, and include relatively little, if any, hydrated phases other than monohydrates (although very small amounts of trihydrate impurities can be present in some commercial grade boehmite, which can be tolerated).

The preferred liquid medium is typically water, although organic solvents, such as lower alcohols (typically $C_{1-6}$ alcohols), hexane, or heptane, may also be useful as the liquid medium. The water may be, for example, tap water, distilled water or deionized water.

The dispersion may further comprise peptizing agents. These peptizing agents are generally soluble ionic compounds that are believed to cause the surface of a particle or colloid to be uniformly charged in a liquid medium (e.g., water). The preferred peptizing agents are acids or acid compounds. Examples of typical acids include monoprotic acids and acid compounds, such as acetic, hydrochloric, formic, and nitric acid, with nitric acid being preferred. The amount of acid used depends, for example, on the dispersibility of the boehmite, the percent solids of the dispersion, the components of the dispersion, the amounts, or relative amounts of the components of the dispersion, the particle sizes of the components of the dispersion, and/or the particle size distribution of the components of the dispersion. For boehmite, the dispersion typically contains at least, 0.1% to 20%, preferably 1% to 10% by weight acid, and most preferably 3% to 8% by weight acid, based on the weight of boehmite in the dispersion.

In some instances, the acid may be applied to the surface of the boehmite particles prior to being combined with the water. The acid surface treatment may provide improved dispersibility of the boehmite in the water.

Suitable methods for mixing the dispersion include ball milling, vibratory milling, attrition milling, and/or high shear mixing (colloid mills). High shear mixing is the preferred mixing method.

In some instances, the dispersion gels prior to the drying step. The pH of the dispersion and the concentration of ions in the dispersion are critical in determining how fast the dispersion gels. Typically, the pH is in the range of about 1.5 to 4. Further, the addition of modifier oxide material or other additive may result in the dispersion gelling.

The dispersion typically comprises greater than 15% by weight (generally from greater than 20% to about 80% by weight; typically greater than 30% to about 80% by weight) solids (or alternatively boehmite), based on the total weight of the dispersion. Certain preferred dispersions, however, comprise 35% by weight or more, 45% by weight or more, 50% by weight or more, 55% by weight or more, 60% by weight or more and 65% by weight or more by weight or more solids (or alternatively boehmite), based on the total weight of the dispersion. Weight percents of solids and boehmite above about 80 wt-% may also be useful, but tend to be more difficult to process to make the particles. For additional details regarding relatively high solids dispersions, see, e.g., U.S. Pat. No. U.S. Pat. No. 5,776,214 (Wood), U.S. Pat. No. 5,779,743 (Wood), U.S. Pat. No. 5,893,935 (Wood), and U.S. Pat. No. 5,988,478 (Wood), the disclosures of all of which are incorporated herein by reference.

A high solids dispersion is typically, and preferably, prepared by gradually adding a liquid component(s) to a component(s) that is non-soluble in the liquid component(s), while the latter is mixing or tumbling. For example, a liquid containing water, nitric acid, and metal salt may be gradually added to boehmite, while the latter is being mixed such that the liquid is more easily distributed throughout the boehmite.

Boehmite-based dispersions may be heated to increase the dispersibility of the alpha alumina monohydrate and/or to create a homogeneous dispersion. The temperature may vary to convenience, for example the temperature may range from about 20° C. to 80° C., usually between 25° C. to 75° C. Alternatively, the dispersion may be heated under a pressure ranging from 1.5 to 130 atmospheres of pressure.

The dispersion is typically prepared by adding the various components and then mixing them together to provide a homogenous mixture. For example, boehmite is typically added to water that has been mixed with nitric acid. The other components are added before, during, or after the boehmite is added.

The dispersion may further comprise "nucleating material." A nucleating material refers to material that enhances the transformation of transitional alumina(s) to alpha alumina via extrinsic nucleation. The nucleating material can be a nucleating agent (i.e., material having the same or approximately the same crystalline structure as alpha alumina, or otherwise behaving as alpha alumina) itself (e.g., alpha alumina seeds, alpha $Fe_2O_3$ seeds, or alpha $Cr_2O_3$ seeds) or a precursor thereof. Other nucleating agents may include $Ti_2O_3$, $MnO_2$, $Li_2O$, and titanates (e.g., magnesium titanate and nickel titanate).

Sources of iron oxide include hematite (i.e., $\alpha\text{-}Fe_2O_3$), as well as precursors thereof (i.e., goethite ($\alpha$-FeOOH), lepidocrocite ($\gamma$-FeOOH), magnetite ($Fe_3O_4$), and maghemite ($\gamma\text{-}Fe_2O_3$)). Suitable precursors of iron oxide include any iron-containing material that, when heated, will convert to $\alpha\text{-}Fe_2O_3$.

Suitable iron oxide sources can be prepared by a variety of techniques well known in the art. For example, a dispersion of hematite ($\alpha\text{-}Fe_2O_3$) can be prepared by the thermal treatment of iron nitrate solutions, as is described, for example, by E. Matijevic et al., *J. Colloidal Interface Science*, 63, 509–24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of $Fe(OH)_2$ with a $NaNO_2$ solution. Maghemite ($\gamma\text{-}Fe_2O_3$) can be obtained, for example, by dehydrating $\gamma$-FeOOH in a vacuum. $\gamma$-FeOOH can also be converted to $\alpha\text{-}Fe_2O_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*. 22, 15 (1972), and T. Misawa et al.,

*Corrosion Science*, 14 131 (1974), the teachings of which are incorporated herein by reference.

The type of iron oxide source employed to make abrasive grain described herein can vary. Preferably, it is a crystalline particulate material. Such particulate material can be spherical, acicular, or plate-like, depending upon the crystallinity of the particles and/or the method of preparation. Whatever the shape of the particulate material, it preferably has a surface area of at least about 60 $m^2/g$ (more preferably, at least about 80 $m^2/g$, and most preferably, at least about 100 $m^2/g$) and an average particle size of less than about 1 micrometer (more preferably, less than about 0.5 micrometer). In this context, "particle size" is defined by the longest dimension of a particles. In preferred embodiments, the crystalline particles are acicular with an aspect ratio of at least about 2:1. One particularly preferred material has acicular particles with a length of about 0.04–0.1 micrometer and a width of about 0.01–0.02 micrometer. Such particles can be obtained from a variety of suppliers of magnetic media pigment such as Magnox Pulaski, Inc., Pulaski, Va.

The surface area of the particulate source of iron oxide can be measured, for example, by nitrogen absorption using a Quantasorb System OS-10 from Quantachrome Corp. of Boynton Beach, Fla. The particle size can be determined by measuring the longest dimension of the particle using a variety of techniques. For example, the particle size can be measured using a Transmission Electron Microscope, whereby a micrograph is taken of a collection of the particles at appropriate magnification and then the size of the particles is measured. Another measurement technique is Quasi Elastic Light Scattering in which a stream of light is scattered by the particles. The particle size is determined by numerical analysis of the fluctuations of the intensity of light scattered by the particles.

The presence of very small amounts of $Fe_2O_3$ particulate (e.g., with as little as 0.01 wt-% $Fe_2O_3$, on a theoretical oxide basis) is believed to aid in nucleating the transformation of transitional alumina(s) to alpha alumina. It is also believed to aid in densifying the alpha alumina at a temperature lower than densification would occur without the iron oxide (i.e., in abrasive grain made in the same manner but without the source of $Fe_2O_3$).

Additional details regarding nucleating materials are also disclosed, for example, in U.S. Pat. No. 4,623,364 (Cottringer et al.), U.S. Pat. No. 4,744,802 (Schwabel), U.S. Pat. No. 4,964,883 (Morris et al.), U.S. Pat. No. 5,139,978 (Wood), U.S. Pat. No. 5,219,806 (Wood), U.S. Pat. No. 5,611,829 (Monroe et al.), and U.S. Pat. No. 5,645,619 (Erickson et al.), the disclosures of which are incorporated herein by reference.

The dispersion may further comprise other metal oxide sources (i.e., materials that are capable of being converting into metal oxide with the appropriate heating conditions), sometimes referred to as a metal oxide modifiers. Such metal oxide modifiers may alter the physical properties and/or chemical properties of the resulting abrasive particle. The amount of these other metal oxides incorporated into the initial mixture and/or impregnation composition may depend, for example, on the desired composition and/or properties of the sintered abrasive particle, as well as on the effect or role the additive may have on or play in the process used to make the abrasive particles. The other metal oxides may be added to the initial mixture as a metal oxide (e.g., a colloidal suspension or a sol) and/or as a precursor (e.g., a metal salt such as metal nitrate salts, metal acetate salts, metal citrate salts, metal formate salts, and metal chloride salts).

Examples of other metal oxide modifiers include: praseodymium oxide, dysprosium oxide, samarium oxide, cobalt oxide, zinc oxide, neodymium oxide, yttrium oxide, ytterbium oxide, magnesium oxide, nickel oxide, lanthanum oxide, gadolinium oxide, sodium oxide, zirconium oxide, dysprosium oxide, europium oxide, hafnium oxide, and erbium oxide, as well as manganese oxide, chromium oxide, titanium oxide, and ferric oxide which may or may not function as nucleating agents.

Metal oxide precursors include metal nitrate salts, metal acetate salts, metal citrate salts, metal formate salts, and metal chloride salts. Metal nitrate, acetate, citrate, formate, and chloride salts can be made by techniques known in the art, or obtained from commercial sources such as Alfa Chemicals of Ward Hill, MA and Mallinckrodt Chemicals of Paris, Ky. Examples of nitrate salts include magnesium nitrate ($Mg(NO_3)_2.6H_2O$), cobalt nitrate ($Co(NO_3)_2.6H_2O$), nickel nitrate ($Ni(NO_3)_2.6H_2O$), lithium nitrate ($LiNO_3$), manganese nitrate ($Mn(NO_3)_2.4H_2O$), chromium nitrate ($Cr(NO_3)_3.9H_2O$), yttrium nitrate ($Y(NO_3)_3.6H_2O$), praseodymium nitrate ($Pr(NO_3)_3.6H_2O$), samarium nitrate ($Sm(NO_3)_3.6H_2O$), neodymium nitrate ($Nd(NO_3)_3.6H_2O$), lanthanum nitrate ($La(NO_3)_3.6H_2O$), gadolinium nitrate ($Gd(NO_3)_3.5H_2O$), dysprosium nitrate ($Dy(NO_3)_3.5H_2O$), europium nitrate ($Eu(NO_3)_3.6H_2O$), ferric nitrate ($Fe(NO_3)_3.9H_2O$), zinc nitrate ($Zn(NO_3)_2.6H_2O$), erbium nitrate ($Er(NO_3)_3.5H_2O$), zirconium nitrate, zirconium oxynitrate ($ZrO(NO_3)_2.xH_2O$), and zirconium hydroxynitrate. Examples of metal acetate salts include magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, dysprosium acetate, and zirconyl acetate ($ZrO(CH_3COO)_2$).

A common preferred use of metal oxide modifiers is to decrease the porosity of the sintered abrasive particle and thereby increase the density. Additionally certain metal oxide precursors (e.g., nucleating materials which are, or transform into, nucleating agents, or materials that otherwise behave as nucleating agents) may reduce the temperature at which the transitional alumni transform into alpha alumina. Certain metal oxides may react with the alumina to form a reaction product and/or form crystalline phases with the alpha alumina, which may be beneficial during use of the abrasive particles in abrading applications. Thus the selection and amount of metal oxide will depend in part upon the processing conditions and the desired abrading properties of the abrasive particles.

The oxides of cobalt, nickel, zinc, and magnesium, for example, typically react with alumina to form a spinel, whereas zirconia and hafnia typically do not react with the alumina. Alternatively, for example, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Ai_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, or $Co^{2+}$. Such aluminates have a hexagonal crystal structure. A preferred rare earth aluminate is $MgLaAl_{11}O_{19}$.

The dispersion may be extruded by techniques known in the art (see, e.g., U.S. Pat. No. 4,848,041 (Kruschke), U.S.

Pat. No. 5,776,214 (Wood), U.S. Pat. No. 5,779,743 (Wood), U.S. Pat. No. 5,893,935 (Wood), and U.S. Pat. No. 5,908,478 (Wood), the disclosures of which are incorporated herein by reference.

In general, techniques for drying the dispersion are known in the art, including heating to promote evaporation of the liquid medium, or simply drying in air. The drying step generally removes a significant portion of the liquid medium from the mixture; however, there still may be a minor portion (e.g., about 10% or less by weight) of the liquid medium present in the dried mixture. Typical drying conditions include temperatures ranging from about room temperature to over about 200° C., typically between 50° C. to 150° C. The times may range from about 30 minutes to over days. To minimize salt migration, it may be desirable to dry the dispersion at low temperature.

After drying, the dried dispersion may be converted into precursor particles. One typical technique to generate these precursor particles is by crushing. Various crushing or comminuting techniques may be employed such as a roll crusher, jaw crusher, hammer mill, ball mill and the like. Coarser particles may be recrushed to generate finer particles. It is also preferred that the dried mixture be crushed, as, for example, it is generally easier to crush dried mixture versus the sintered alpha alumina based abrasive particles.

Alternatively, for example, the dispersion may be converted into precursor particles prior to drying. This may occur for instance if the mixture is processed into a desired particle shape and particle size distribution. Alternatively, for example, the dispersion may be molded into a triangular shape particle and then dried. Additional details concerning triangular shaped particles may be found in U.S. Pat. No. 5,201,916 (Berg et al.), the disclosure of which is incorporated herein by reference.

Alternatively, for example, the dried dispersion is shaped into lumps with a high volatilizable content which then are explosively communited by feeding the lumps directly into a furnace held usually at a temperature(s) between 600° C. to 900° C.

Although boehmite-based precursor particles are desired in numerous embodiments of the present invention, other precursor particles may be used to form abrasive particles and agglomerate abrasive grain of the present invention. Other precursor abrasive particles are disclosed, for example, in U.S. Pat. No. 5,593,467 (Monroe), U.S. Pat. No. 5,645,618 (Monroe et al.), and U.S. Pat. No. 5,651,801 (Monroe et al.), the disclosures of all of which are incorporated herein by reference. The other precursor abrasive particles may be processed similarly as described above with regard to the processing of boehmite-based precursor particles.

Figure 4:
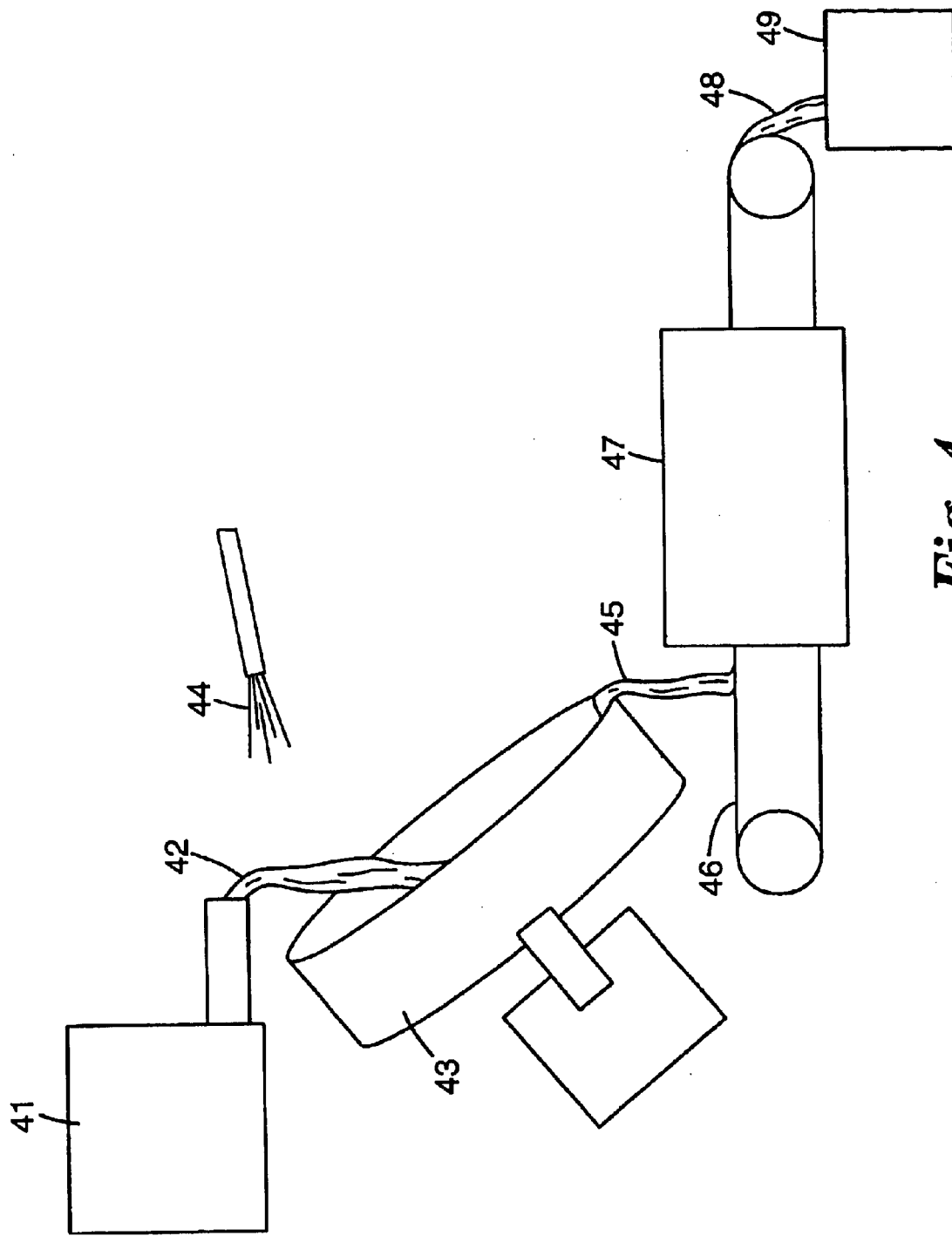
FIG. 4 is a schematic of a portion of an assembly for making embodiments of agglomerate abrasive grain according to the present invention.

Precursor agglomerate abrasive grain can be made by agglomerating a plurality of dried boehmite-based particles, other precursor abrasive particles, and/or abrasive particles. An example of an assembly for agglomerating dried boehmite-based particles is shown in FIG. 4. Dried boehmite-based particles 42 are fed into rotating disc agglomerator 43 via feeder 41. Examples of feeders include augers, gravity feeders, vibratory beds or feeders, or conveyor systems. Liquid (e.g., water, acidified water, bochmite sol, or a boehmite sol (including a sol made from a acidified water) comprising at least one of metal oxide or precursor thereof) 44 is sprayed onto dried boehmite-based particles 42. A plurality of dried boehmite-based particles 42 agglomerate and overflow out of agglomerator 43. The agglomerated boehmite-based particles 45 can then be further process (including sintering the particles and bond material) to provide agglomerate abrasive grain according to the present invention. As shown, agglomerated boehmite-based particles 45 fall onto belt 46 and are transported through drying oven 47. Dried agglomerated boehmite-based particles 48 are collected in bin 49. Examples of other equipment which may be useful in making agglomerate abrasive grain according to the present invention include drum agglomerators, roll briquetters, roll compactors, screw extruders, ring extruders, plow mills, Erich mixers, and landcaster mixers.

The manner and rate of introducing the dried boehmite-based particles, the manner and rate of introducing the liquid, the settings for agglomerator, and other aspects of making the agglomerated dried boehmite-based particles may be dependent, for example, on the composition of the dried boehmite-based particles, the size of the dried boehmite-based particles, the composition of the liquid, the specific agglomerator used, as well as on each other.

Typically, the preferred liquid is water, although organic solvents, such as lower alcohols (typically $C_{1-6}$ alcohols), hexane, or heptane, may also be useful as the liquid. The water may be tap water, distilled water or deionized water. Optionally, the liquid may comprise acid (such as those described above for addition to the dispersions), $NH_4(OH)$, metal oxide, and/or metal oxide precursors (including nucleating agents and materials) such as those described above for addition to the dispersions, as well as, alpha alumina particles and/or alpha alumina precursors (e.g., boehmite).

For a disc pelletizer (agglomerator) (obtained from Feeco, Corp. Green Bay, Wis.), it has been found that the preferred rotational speed is typically about 5–70 revolutions per minute (rpm), more preferably about 20–40 rpm. In part, the preferred rotational speed depends on the angle of the rotating surface. The angle is preferably about 30°–60°, more preferably about 40°–50° or even about 45°.

Precursor agglomerate abrasive grain can also be made, for example, by providing droplets of liquid to such that the liquid contacts the surface of a static bed of dried boehmite-based particles.

Typically, the agglomerated dried particles (i.e., boehmite-based or otherwise) are dried and calcined prior to sintering. In general, techniques for calcining, wherein essentially all the volatiles are removed, and the various components that were present in a material mixture are transformed into oxides, are known in the art. Such techniques include using a rotary or static furnace to heat the material at temperatures ranging from about 400–1000° C. (typically from about 450–800° C.) until the free water, and typically until at least about 90 wt % of any bound volatiles are removed.

Embodiments of agglomerate abrasive grain according to the present invention, can be made, for example, by contacting at least one of precursor abrasive particles or abrasive particles (e.g., fused and/or sintered abrasive particles) with a precursor bonding material comprising crystalline ceramic oxide precursor material to form agglomerated particles and heating the agglomerated particles at at least one temperature for a time sufficient to convert the agglomerated particles into agglomerate abrasive grain according of the present invention. Embodiments of the method may include forming dried and/or calcined precursor agglomerate abrasive grain prior to completing conversion of the (precursor) agglomerated particles into agglomerate abrasive grain according of the present invention.

Suitable abrasive particles may comprise any known abrasive particle including fused aluminum oxide (including white fused alumina, heat-treated aluminum oxide, and brown aluminum oxide) abrasive particles, silicon carbide abrasive particles, boron carbide abrasive particles, titanium carbide abrasive particles, diamond abrasive particles, cubic boron nitride abrasive particles, garnet abrasive particles, fused alumina-zirconia abrasive particles, sintered alpha alumina-based (including sol gel-derived alpha alumina-based) abrasive particles, and the like. Suitable precursor abrasive particles may include those abrasive particles described above with repeat to the dried boehmite-based particles, as well as calcined versions thereof.

Precursor bonding material may be and/or comprise crystalline ceramic oxide precursor material such as alumina, alumina precursor material (e.g. boehmite, boehmite sols (for example, as discussed above)), other sinterable ceramic materials and/or precursors thereof. The precursor bonding material may include one or more of water, organic solvents, peptizing agents, nucleating materials, metal oxides or metal oxide modifiers, metal oxide precursors, and pH modifiers (i.e., acid (such as those described above for addition to the dispersions), and $NH_4(OH)$).

More specifically, for example, embodiments of agglomerate abrasive grain according to the present invention can also be made, for example, by a method comprising:

contacting a composition comprising curable binder precursor material, crystalline ceramic binder precursor material, and a plurality of at least one of abrasive particles or precursor abrasive particles such that the particles agglomerate together; and converting the agglomerated particles into agglomerate abrasive grain (see, e.g., copending application having U.S. Ser. No. 09/972,316, filed Oct. 5, 2001, the disclosure of which is incorporated herein by reference. One embodiment of the method includes forming precursor agglomerate abrasive grain from a plurality of at least one of abrasive particles or precursor abrasive particles, curable binder precursor material, and ceramic binder precursor material. A composition comprising a plurality of at least one of abrasive particles or precursor abrasive particles, curable binder precursor material, and ceramic binder precursor material is passed through at least one orifice in a substrate. The resulting agglomerated particles (precursor agglomerate abrasive grain) are separated from the substrate. The precursor agglomerate abrasive grain is converted into agglomerate abrasive grain according to the present invention. Typically, converting the precursor agglomerate abrasive grain includes at least partially curing the curable binder precursor material present in the precursor agglomerate abrasive grain.

As used herein, the expression "curable binder precursor material" refers to any material that is deformable or can be made to be deformed by heat or pressure or both and can he at least partially cured to provide material, such as, for example, precursor agglomerate abrasive grain, that are handleable and collectable. As used herein with respect to curable binder precursor material, the expression "at least partially cured" means "part" or "all" of the curable binder precursor material has been cured to such a degree that it is handleable and collectable. The expression "at least partially cured" does not mean that part or all of the curable binder precursor is always fully cured, but that it is sufficiently cured, after being at least partially cured, to be handleable and collectable.

As used herein, the expression "handleable and collectable" refers to material that will not substantially flow or experience a substantial change in shape. Precursor agglomerate abrasive grain and agglomerate abrasive grain that are handleable and collectable tend to remain intact if subjected to an applied force that tends to strain or deform a body. Precursor agglomerate abrasive grain and agglomerate abrasive grain that are not handleable and collectable tend not to remain intact if subjected to an applied force that tends to strain or deform a body.

As used herein, the expression "crystalline ceramic oxide binder precursor material" refers to particulate additives which, when heated to a temperature sufficient to bum out organic materials present in the precursor agglomerate abrasive grain, may subsequently bond together to form a rigid ceramic oxide phase bonding the abrasive particles together and to provide a precursor agglomerate abrasive grain. Crystalline ceramic oxide binder precursor material may include crystalline or noncrystalline ceramic material. Hereinafter, "precursor agglomerate abrasive grain" includes where the crystalline ceramic oxide binder precursor material has not yet bonded together sufficiently to provide precursor agglomerate abrasive grain that is handleable and collectable. Typically, at least a portion of the precursor agglomerate abrasive grain provided by this method have an aspect ratio greater than one.

Hereinafter, "essentially free of solvents" means the composition used to make precursor agglomerate abrasive grain contain less than 10% solvent.

Curable binder precursor can be cured by radiation energy or thermal energy. Typically, radiation curable binder precursor material comprises at least one of epoxy resin, acrylated urethane resin, acrylated epoxy resin, ethylenically unsaturated resin, aminoplast resin having at least one pendant unsaturated carbonyl group, isocyanurate derivatives having at least one pendant acrylate group, isocyanate derivatives having at least one pendant acrylate group, or combinations thereof. Other useful radiation curable binder precursor material includes vinyl ethers.

Epoxies have an oxirane ring and are polymerized by the ring opening via a cationic mechanism. Useful Epoxy resins include monomeric epoxy resins and polymeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of some epoxy resins useful in this invention include 2,2-bis[4-(2,3-epoxypropoxy)phenyl]propane (diglycidyl ether of bisphenol A) and materials under the trade designations "EPON 828", "EPON 1004" and "EPON 1001F", commercially available from Shell Chemical Co., Houston, Tex., "DER-331", "DER-332" and "DER-334", commercially available from Dow Chemical Co., Freeport, Tex. Other suitable epoxy resins include glycidyl ethers of phenol formaldehyde novolac (e.g., available under the trade designations "DEN-431" and "DEN-428", commercially available from Dow Chemical Co.). The epoxy resins used in the invention can polymerize via a cationic mechanism with the addition of appropriate photoinitiator(s). These resins are further described in U.S. Pat. No. 4,318,766 (Smith) and U.S. Pat. No. 4,751,138 (Tumey et al.), the disclosures of which are incorporated herein by reference.

Exemplary acrylated urethane resin includes a diacrylate ester of a hydroxy terminated isocyanate extended polyester or polyether. Examples of commercially available acrylated urethane resin include those available under the trade designation "UVITHANE 782" and "UVITHANE 783," from Morton Thiokol Chemical, Moss Point, Miss., and under the trade designation "CMD 6600", "CMD 8400", and "CMD 8805", from Radcure Specialties, Pampa, Tex.

Exemplary acrylated epoxy resin includes a diacrylate ester of epoxy resin, such as the diacrylate ester of an epoxy resin such as bisphenol. Examples of commercially available acrylated epoxy resin include those available under the trade designation "CMD 3500", "CMD 3600", and "CMD 3700", from Radcure Specialties.

Exemplary ethylenically unsaturated resin includes both monomeric and polymeric compounds that contain atoms of carbon, hydrogen and oxygen, and optionally, nitrogen or the halogens. Oxygen atoms, nitrogen atoms, or both, are generally present in ether, ester, urethane, amide, and urea groups. Ethylenically unsaturated resin typically has a molecular weight of less than about 4,000 and is in one embodiment an ester resulting from the reaction of compounds containing aliphatic monohydroxy groups or aliphatic polyhydroxy groups and Representative examples of other useful acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other useful ethylenically unsaturated resins include monoallyl, polyallyl, and polymethylallyl esters and amides of carboxylic acids, such as diallyl phthalate, diallyl adipate, and N,N-diallyladipamide. Still, other useful ethylenically unsaturated resins include styrene, divinyl benzene, and vinyl toluene. Other useful nitrogen-containing, ethylenically unsaturated resins include tris(2-acryloyl-oxyethyl) isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Some useful aminoplast resins can be monomeric or oligomeric. Typically, the aminoplast resins have at least one pendant α,β-unsaturated carbonyl group per molecule. These α,β-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. No. 4,903,440 (Kirk et al.) and U.S. Pat. No. 5,236,472 (Kirk et al.), the disclosures of which are incorporated herein by reference.

Useful isocyanurate derivatives having at least one pendant acrylate group and isocyanate derivatives having at least one pendant acrylate group are further described in U.S. Pat. No. 4,652,274 (Boettcher), the disclosure of which is incorporated herein by reference. One such isocyanurate material is a triacrylate of tris(2-hydroxyethyl)isocyanurate.

Examples of vinyl ethers suitable for this invention include vinyl ether functionalized urethane oligomers, commercially available from Allied Signal, Morristown, N.J., under the trade designations "VE 4010", "VE 4015", "VE 2010", "VE 2020", and "VE 4020".

Optionally, the composition of a plurality of at least one of abrasive particles or precursor abrasive particles, curable binder precursor material, and ceramic binder precursor material may further comprise initiator selected from the group consisting of photoinitiator, thermal initiator, and combinations thereof. As used herein, a thermal initiator may be used when thermal energy is used in the at least partially curing step, and photoinitiators may be used when ultraviolet and/or visible light is used in the at least partially curing step. The requirement of an initiator may depend on the type of the curable binder precursor used and/or the type of energy used in the at least partially curing step (e.g., electron beam or ultraviolet light). For example, phenolic-based curable binder precursors typically do not require the addition of an initiator when at least thermally cured. However, acrylate-based curable binder precursors typically do require the addition of an initiator when at least thermally cured. As another example, initiators typically are not required when electron beam energy is used during the at least partially curing step. However, if ultraviolet or visible light is utilized, a photoinitiator is typically included in the composition.

Upon being exposed to thermal energy, a thermal initiator generates a free radical source The free radical source then initiates the polymerization of the curable binder precursor. Exemplary thermal initiators include organic peroxides (e.g. benzoil peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Azo compounds suitable as thermal initiators in the present invention may be obtained under the trade designations "VAZO 52," "VAZO 64," and "VAZO 67" from E.I. duPont deNemours and Co., Wilmington, Del.

Upon being exposed to ultraviolet or visible light, the photoinitiator generates a free radical source or a cationic source. This free radical or cationic source then initiates the polymerization of the curable binder precursor.

Examplary photoinitiators that generate a free radical source when exposed to ultraviolet light include, but are not limited to, those selected from the group consisting of organic peroxides (e.g., benzoil peroxide), azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are further described, for example, in U.S. Pat. No. 4,735,632 (Oxman et al.), the disclosure of which is incorporated herein by reference.

Cationic photoinitiators generate an acid source to initiate the polymerization of an epoxy resin or a urethane. Exemplary cationic photoinitiators include a salt having an onium cation and a halogen-containing complex anion of a metal or metalloid. Other useful cationic photoinitiators include a salt having an organometallic complex cation and a halogen-containing complex anion of a metal or metalloid. These photoinitiators are further described in U.S. Pat. No. 4,751,138 (Tumey et al.), the disclosure of which is incorporated herein by reference. Another example is an organometallic salt and an onium salt described in U.S. Pat. No. 4,985,340 (Palazotto et al.); the disclosure of which is incorporated herein by reference. Still other cationic photoinitiators include an ionic salt of an organometallic complex in which the metal is selected from the elements of Periodic Groups IVB, VB, VIB, VIIB, and VIIIB. These photoinitiators are further described in U.S. Pat. No. 5,089,536 (Palazotto), the disclosure of which is incorporated herein by reference.

Ultraviolet-activated photoinitiators suitable for the present invention may be obtained under the trade designations "IRGACURE 651", "IRGACURE 184", "IRGACURE 369" and "IRGACURE 819" from Ciba Geigy Company, Winterville, Miss., "Lucirin TPO-L", from BASF Corp., Livingston, N.J., and "DAROCUR 1173" from Merck & Co., Rahway, N.J. In one embodiment, the total amount of initiator (either photoinitiator, thermal initiator, or combinations thereof) may be in the range from 0.1 to 10 percent by weight of the curable binder precursor; in another embodiment, from about 1 to about 5 percent by weight of the curable binder precursor. If both photoinitiator and thermal initiator are used, the ratio of photoinitiator to thermal initiator is between about 3.5:1 to about 1:1.

In another aspect, if ultraviolet or visible light energy is used in the at least partially curing step, the composition may also include a photosensitizer. Photosensitizer expands the wavelength at which the initiator or monomer forms free radicals. Exemplary photosensitizers include compounds having carbonyl groups or tertiary amino groups and mixtures thereof. Useful examples of compounds having carbonyl groups are benzophenone, acetophenone, benzil, benzaldehyde, o-chlorobenzaldehyde, xanthone, thioxanthone, 9,10-anthraquinone, and other aromatic ketones. Useful examples of tertiary amines are methyldiethanolamine, ethyldiethanolamine, triethanolamine, phenylmethyl-ethanolamine, and dimethylaminoethylbenzoate. In one embodiment, the amount of photosensitizer in the composition may be in the range from about 0.01 to 10% by weight of the curable binder precursor. In another embodiment, the amount of photosensitizer in the composition may be in the range from about 0.25 to 4% by weight of the curable binder precursor.

Modifying additives are typically included in the curable composition to modify the processing characteristics of the composition (e.g., change viscosity, etc.). Useful examples of modifying additives include coupling agents, wetting agents, flowing agents, surfactants and combinations thereof. Many additives tend to decompose during the heating step.

Coupling agents tend to enhance the adhesion between a solid surface (e.g., abrasive particles) and curable binder precursor. Useful examples of coupling agents suitable for this invention include organo-silanes, zircoaluminates, and titanates. An abrasive particle may also contain a coupling agent on its surface, such as a silane coupling agent.

Wetting agents, or surfactants, tend to control rheology of the composition during processing. In general, any type of wetting agent (i.e., anionic, cationic, nonionic, amphoteric, zwitterionic, etc.) can be employed in the composition. Useful examples of wetting agents include those available under the trade designations "INTERWET 33" from Chemie America Interstab Chemicals, New Brunswick, N.J.; "FLUORAD" from the 3M Company St. Paul, Minn., and "AEROSOL OT" from Rohm Haas, Philadelphia, Pa.

Flowing agents tend to prevent "caking" of powders during processing. For example, a flowing agent may be used in the present invention to prevent ceramic binder precursor from caking during the forming step. Useful examples of flowing agents include condensates of ethylene oxide and unsaturated fatty acids.

Figure 12:
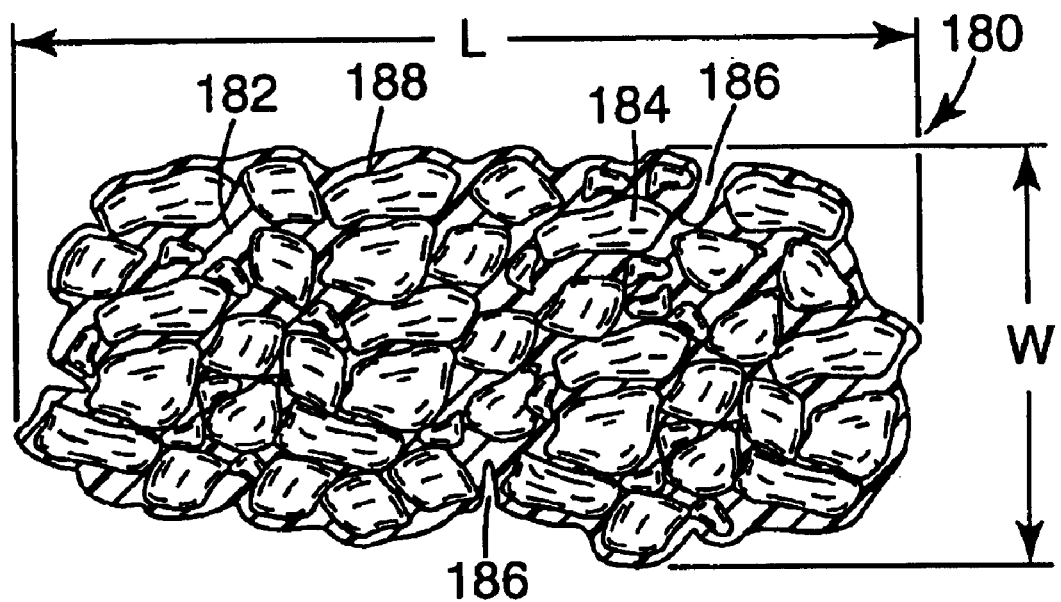
FIG. 12 is a schematic side view in elevation of another exemplary agglomerate abrasive grain according to the present invention.

In one embodiment of the present invention, a composition is formed into ceramic aggregate precursor particles by passing the composition through an orifice. For example, FIG. 12 illustrates exemplary agglomerate abrasive grain according to the present invention 180. Agglomerate abrasive grain 180 includes plurality of abrasive particles 184 coated by and embedded in crystalline ceramic oxide bonding material 182. Optionally, there may be space 186 void of crystalline ceramic oxide bonding material 182 that is accessible to the outer surface of the agglomerate abrasive grain and suitable to permit fluid penetration. Such fluid penetration allows the agglomerate abrasive grain to possess "surface connected porosity". In one embodiment, aggiomerate abrasive grain have an aspect ratio greater than one, and typically in the range from about one to about 30. As used herein, the expression "aspect ratio" with regard to agglomerate abrasive grain is the longest dimension of the agglomerate abrasive grain, L, divided by the shortest dimension of the agglomerate abrasive grain, W. In another embodiment, the agglomerate abrasive grain have an aspect ratio in the range from about one to about 10. And in another embodiment, the agglomerate abrasive grain have an aspect ratio in the range from about one to about 3.

In another aspect, agglomerate abrasive grain according to the present invention may have different sizes (e.g., agglomerate abrasive grain with different diameters). For example, in one embodiment, a composition that is passed through a substrate with circular orifice(s) tends to form agglomerate abrasive grain with approximately circular cross-sections of about the same diameter as the orifice(s). In some embodiments, the resulting agglomerate abrasive grain may have a diameter in the range from about 25 micrometers (one mil) to about 12,700 micrometers (500 mils). In another embodiments, for example the agglomerate abrasive grain may have a diameter in the range from about 381 micrometers (15 mils) to about 6350 micrometers (250 mils) in diameter.

In another aspect, agglomerate abrasive grain according to the present invention may be formed by a method that includes as described above have "substantially uniform" (i.e., the dimension does not vary by more than about 20 percent, typically no more than about 10 percent) cross-sectional shapes, as measured along a designated axis.

In another aspect, ceramic agglomerate abrasive grain according to the present invention may have different shapes. For example, the agglomerate abrasive grain may have cross-sectional shapes that are approximately circular or polygonal (e.g., square, triangular, etc.). Agglomerate abrasive grain having an aspect ratio greater than one are typically rod-shaped. In another embodiment, the agglomerate abrasive grain may be crushed to have random shapes.

An exemplary substrate for the method of passing the composition through an orifice(s) may be material with one or more orifices that has sufficient strength to allow a composition to be passed through the orifice(s) without rupturing the substrate. In general, substrates may include, for example, mesh screens (as described, for example, in U.S. Pat. No. 5,090,968 (Pellow), the disclosure of which is incorporated herein by reference), film dies, spinneret dies, sieve webs (as described, for example, in U.S. Pat. No. 4,393,021 (Eisenberg et al.), the disclosure of which is incorporated herein by reference) or screens (as described, for example, in U.S. Pat. No. 4,773,599 (Lynch et al.), the disclosure of which is incorporated herein by reference). In one embodiment of the present invention, substrates include conical screens with circular orifice(s) in the range from about 25 micrometers (one mil) to about 12,700 micrometers (500 mils) in diameter. In another embodiment, substrates include conical screens with circular orifice(s) in the range from about 381 micrometers (15 mils) to about 6350 micrometers (250 mils) in diameter.

Figure 13:
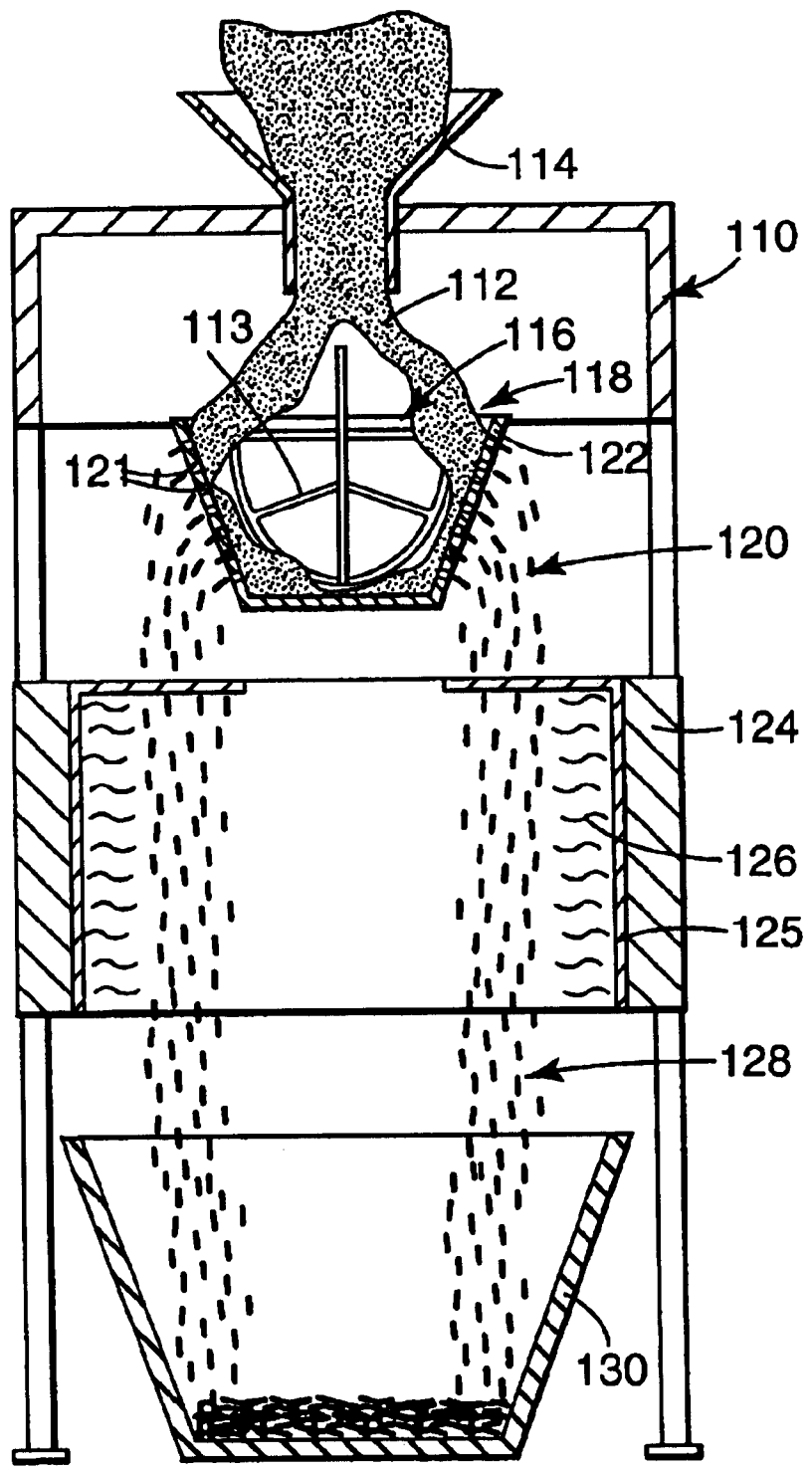
FIG. 13 is a schematic side view illustrating a device for making a plurality of agglomerate abrasive grain according to the present invention.
Figure 14:
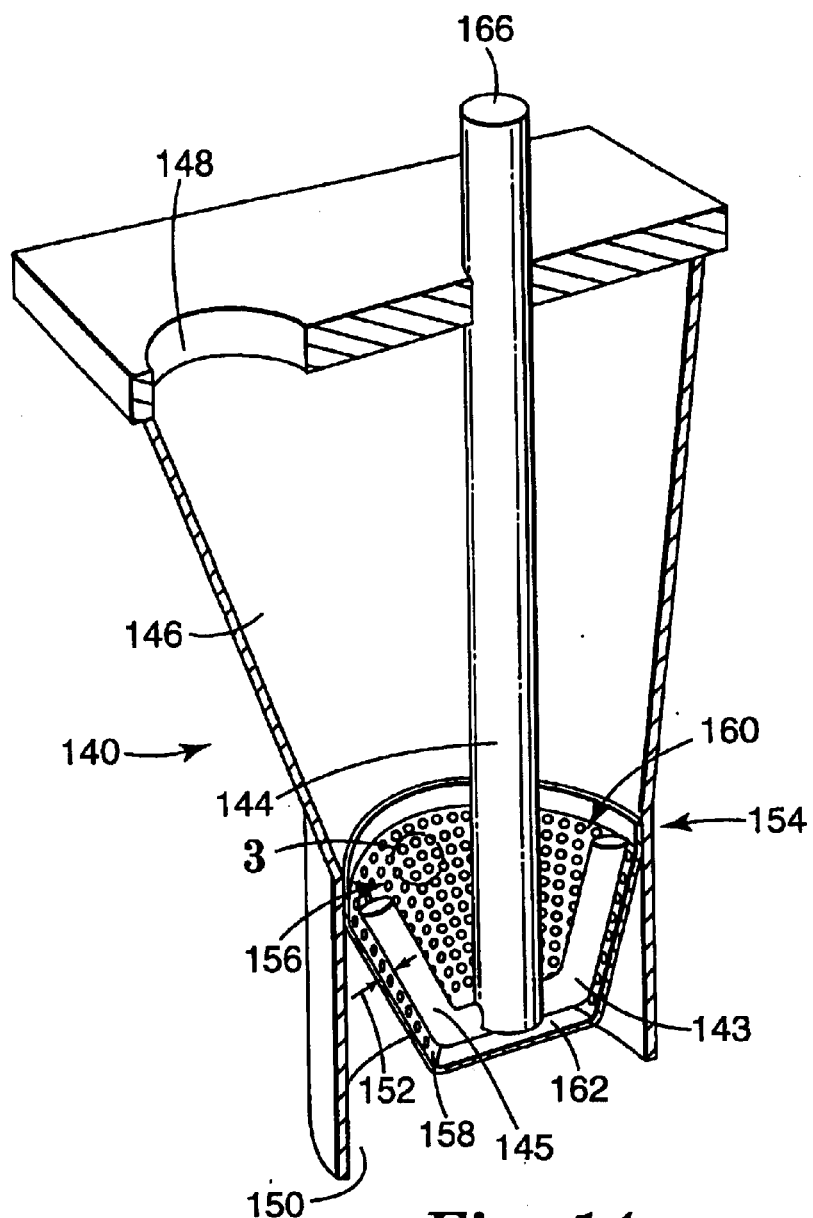
FIG. 14 is a perspective view of a portion of a device for making the plurality of agglomerate abrasive grain according to the present invention, with a front portion of the device cut away to expose a portion of the interior of the device.

Forming device 118 in FIG. 13 may be any material forming apparatus such as, for example, an extruder, milling/size reducing machine, pellitizer or pan agglomerator. FIG. 14 illustrates preferred forming device 140 which is a size-reducing machine, available from Y-Tron Quadro (U.K.) Limited, Chesham, United Kingdom, under the trade designation "QUADRO COMIL." Forming device 140 has impeller 143 mounted on rotatable. shaft 144. Shaft 144 and impeller 413 are located in channel 146 having input 148 and output 150. Impeller 143 is shaped and mounted so that gap 152 exists between outer edge 145 of impeller 143 and tapered aperatured wall 158 of screen 156 and gap 152 is substantially constant as impeller 143 rotates about shaft 144.

Generally, the cross sectional shape of impeller 143 may be, for example, round, flat or angular flats. Typically, impeller 143 shapes used in the present invention are round. In one embodiment, impeller 143 shapes are arrow-head shaped.

Gap 152 width may range, for example, from 25 micometers (1 mil) to 5080 micometers (200 mils). Typically, gap 152 width ranges from 127 micrometers (5 mils) to 1270 micrometers (50 mils).

Adjusting impeller 43 rotation speed to optimize forming ceramic aggregate precursor particles will be readily apparent to one skilled in the art. Typically, impeller 43 rotation speed is from 50 to 3500 rpm.

Channel 146 also contains support 154 shaped and positioned to hold screen 156 so that any material passing from input 148 to output 150 passes through screen 156. Screen 156 is formed to have the tapered apertured wall 158 formed into a frusto-conical shape, with wide end 160 of screen 156 being open and narrow end 162 being at least partially closed. In most uses, it is desirable to have narrow end 162 completely closed. Screen 156 has orifice(s) 164 that are shaped.

Figure 15:
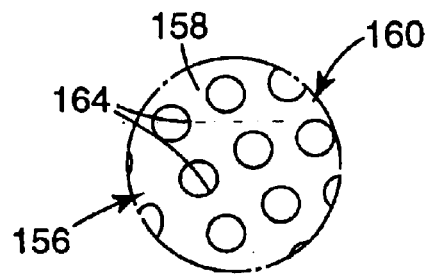
FIG. 15 is a perspective view of a portion of the screen used in the device shown in FIG. 14.

As shown in FIG. 15, screen orifice(s) 164 may be shaped to be curved, circular or polygonal, including, for example, triangles, squares and hexagons. Typically, the shape of screen orifice(s) 164 used in the present invention are circular or square. Preferred shapes for screen orifice(s) 164 are square or circular, ranging in size from 381 micrometers (15 mil) to 6350 micrometers (250 mil) in diameter or across.

As can readily be seen from FIG. 14, end 166 of shaft 144 protrudes from channel 146. A power source (not shown) can easily be attached to end 166 of shaft 144 to cause shaft 144 and attached impeller 143 to rotate relative to screen 156. Typically, the power source is a variable speed electric motor. However, the power source is conventional and many other power sources will be suitable to operate apparatus 140.

In another aspect, embodiments of making agglomerate abrasive grain according to the present invention include at least partially curing curable binder precursor material present in the precursor agglomerate abrasive grain. In one embodiment, for example as illustrated in FIG. 13, the precursor agglomerate abrasive grain are at least partially cured as they fall by gravity through curing zone 124. As shown in FIG. 13, at least partially curing may provide handleable and collectable precursor agglomerate abrasive grain 128, which may be collected in container 130.

The at least partially curing of the ceramic aggregate precursor particles may be caused by energy source 126. Exemplary energy source(s) 126 include thermal and radiation energy. Typically, a radiation energy source(s) is used. Exemplary sources of radiation energy are electron beam, ultraviolet light, visible light, microwave, laser light and combinations thereof.

In one embodiment, ultraviolet light is used as radiation energy source 126 and mirrors 125 are used in curing zone 124 to reflect the ultraviolet waves in a way that intensifies the energy transmitted to the precursor agglomerate abrasive grain. Ultraviolet radiation refers to non-particulate radiation having a wavelength within the range of about 4 to about 400 nanomcters, preferably in the range of about 250 to about 400 nanometers. In one embodiment, an apparatus used for at least partially radiation curing is one such as that available from Fusion UV Systems, Inc., Gaithersburg, Md., under the trade designation "DRE 410 Q". In one embodiment, the "DRE 410 Q" radiation apparatus is equipped with, for example, two 600 watt "d" fusion lamps that are set on "high" power.

Visible radiation refers to non-particulate radiation having a wavelength within the range of about 400 to about 800 nanometers. In one embodiment, non-particulate radiation having a wavelength in the range of about 400 to about 550 nanometers is used.

In other embodiments, a thermal energy source(s) may be used. Exemplary sources of thermal energy that may be utilized include electrical or combustion heat sources. In another embodiment, infrared radiation may be used as a source of thermal energy.

The amount of radiation energy needed to at least partially cure the curable binder precursor material to provide handleable and collectable precursor agglomerate abrasive grain may depend upon factors such as, for example, the type of curable binder precursor material, the type of crystalline ceramic oxide bonding precursor material, residence time in the curing zone, the type of precursor abrasive particles and/or abrasive particles and the type of, if any, optional modifying additives.

Optionally, precursor agglomerate abrasive grain may be further at least partially cured using thermal energy, radiation energy, or combinations thereof. Further at least partially curing may provide precursor agglomerate abrasive grain with different properties such as, for example, increased rigidity for handling and collecting. Typically, precursor agglomerate abrasive grain that are handleable and collectable tend to remain cohesive precursor agglomerate abrasive grain through the method steps. Typically, precursor agglomerate abrasive grain that are not handleable and collectable tend to break apart if the they are physically moved at a point during the method steps.

In one embodiment, heating includes the following two-step firing process. The two steps of the firing process are usually performed at separate times, but could be completed sequentially at the same time in one firing furnace cycle. In one embodiment, the first (i.e., calcining) step involves heating the precursor agglomerate abrasive grain from room temperature to a final temperature in the range from about 500° C. to about 650° C. at a slow rate, typically 2° C. per minute and exposing the precursor agglomerate abrasive grain to the final temperature for about 1 to about 4 hours typically, in order to remove cured and/or uncured material, such as, for example, acrylate resin, and to cause the crystalline ceramic oxide binder precursor material to sufficiently bond together to provide handleable and collectable precursor agglomerate abrasive grain. Typically, as heating during the first step progresses, precursor agglomerate abrasive grain Crush Strength decreases to a minimum. This minimum typically occurs upon complete pyrolysis of cured and/or uncured material because the pyrolysis of any cured and/or uncured material leaves spatial voids in the precursor agglomerate abrasive grain and the crystalline ceramic binder precursor material typically has not sufficiently bonded together to provide handleable and collectable precursor agglomerate abrasive grain. However, as heating continues towards the final temperature, the crystalline ceramic binder precursor material typically starts to sufficiently bond together to cause the agglomerate abrasive grain Crush Strength to increase and to provide handleable and collectable agglomerate abrasive grain. Because the material is typically not handleable and collectable upon complete pyrolysis, a static bed is typically used during the first step to minimize applied forces to the material so that the material remain intact. Examples of firing kilns suitable for static bed firing in the first step include shuttle kilns, roller hearth kilns, pusher plate kilns, and belt furnace kilns. In one embodiment a slow rate of heating, for example 2° C. per minute, the precursor agglomerate abrasive grain during the first step is performed to control the rate of pyrolysis of cured and/or uncured material. Typically, relatively fast heating rates tend to cause cured and/or uncured material to decompose into gas(es) at a rate which most likely destroys the precursor agglomerate abrasive grain. Typically, first heating step is a calcining conducted in an oxidizing atmosphere (e.g., air) to aid in complete pyrolysis of any cured and/or uncured material, such as, for example, acrylate resin. The heating times, temperatures, rates, atmosphere, etc. are typically selected to remove organic material from the precursor agglomerate abrasive grain. The presence of organic material during the second heating step is generally undesirable because organic material would tend to thermally decompose during the heating, resulting in the evolution of gas(es), which in turn may lead to fracture of the bonding material.

Typically, in the second firing step, calcined precursor agglomerate abrasive grain are heated to a final temperature in the range from about 650° C. to about 1500° C. at any desired heating rate. Typically, the calcined precursor agglomerate abrasive grain particles are exposed to the final temperature for one to four hours in order to cause partial or complete densification of the crystalline ceramic oxide bonding precursor material. As used in the present invention, "densification" means the partial or complete elimination of open space within the agglomerate abrasive grain to provide precursor agglomerate abrasive grain with increased particle density (i.e., decreased particle volume per unit particle mass). In one embodiment, heating during the second firing step may occur in a static bed or non-static bed because calcined precursor agglomerate abrasive grain particles are handleable and collectable and remain intact if subjected to an applied force that tends to strain or deform a body. Examples of non-static beds include rotary kiln or fluidized bed firing techniques.

Typically, at least partially cured precursor agglomerate abrasive grain are at least partially coated with a metal oxide particulate to prevent them from sticking to one another during heating. If firing steps are performed at separate times, the precursor agglomerate abrasive grain are typically coated with metal oxide particulate after pre-firing but before the second firing step. In one embodiment, the quantity of metal oxide particulate used to at least partially coat the precursor agglomerate abrasive grain is approximately 5%–10% by weight of the precursor agglomerate abrasive grain. In one embodiment, metal oxide particulate includes hydrous alumina.

In another embodiment, methods according to the present invention may involve reducing the average size of precursor agglomerate abrasive grain and/or agglomerate abrasive grain after at least partially curing and/or heating respectively. Typically, reducing the average size of the agglomerate abrasive grain is performed using at least one of milling, crushing, or tumbling. In one embodiment, apparatus 140 shown in FIG. 14 may be used to reduce the average size of precursor agglomerate abrasive grain and/or agglomerate abrasive grain.

It is also within the scope of the present invention to impregnate a metal oxide modifier source (typically a metal oxide precursor) into dried or calcined material (including the calcined precursor abrasive particles and/or the calcined bonding material). These metal oxide precursors and metal salts are described above with respect to the dispersion.

Methods of impregnating calcined materials are described in general, for example, in U.S. Pat. No. 5,164,348 (Wood), the disclosure of which is incorporated herein by reference. In general, precursor agglomerate material (dried material or calcined material) is porous. For example, a calcined boehmite-derived agglomerate material typically has pores about 2–15 nanometers in diameter extending therein from an outer surface. The presence of such pores allows an impregnation composition comprising a mixture comprising liquid medium (typically water) and appropriate metal precursor to enter into precursor material. The metal salt material is dissolved in a liquid, and the resulting solution mixed with the porous material. The impregnation process is thought to occur through capillary action.

The liquid used for the impregnating composition is preferably water (including deionized water), an organic solvent, and mixtures thereof If impregnation of a metal salt is desired, the concentration of the metal salt in the liquid medium is typically in the range from about 5% to about 40% dissolved solids, on a theoretical metal oxide basis). Preferably, there is at least 50 ml of solution added to achieve impregnation of 100 grams of porous material, more preferably, at least about 60 ml of solution to 100 grams of porous material.

After the impregnation, the resulting impregnated material is typically calcined to remove any volatiles prior to sintering. The conditions for this calcining step are described above.

After the precursor agglomerate abrasive grain is formed and optionally calcined, it is sintered to provide the crystalline bonding material and the abrasive particles. In general, techniques for sintering the precursor material, which include heating at a temperature effective to transform transitional alumina(s) into alpha alumina, to causing all of the metal oxide precursors to either react with the alumina or form metal oxide, and increasing the density of the ceramic material, are known in the art. The precursor material may be sintered by heating (e.g., using electrical resistance, microwave, plasma, laser, or gas combustion) on a batch basis, or a continuous basis. Sintering temperatures usually range from about 1200° C. to about 1650° C.; typically, from about 1200° C. to about 1500° C.; more typically, less than 1400° C. The length of time, which the precursor material is exposed to the sintering temperature depends, for example, on particle size, composition of the sinterable material (i.e., abrasive particle precursor and/or bonding material), and sintering temperature. Typically, sintering times range from a few seconds to about 60 minutes (preferably, within about 3–30 minutes). Sintering is typically accomplished in an oxidizing atmosphere, although inert or reducing atmospheres may also be useful.

Figure 5:
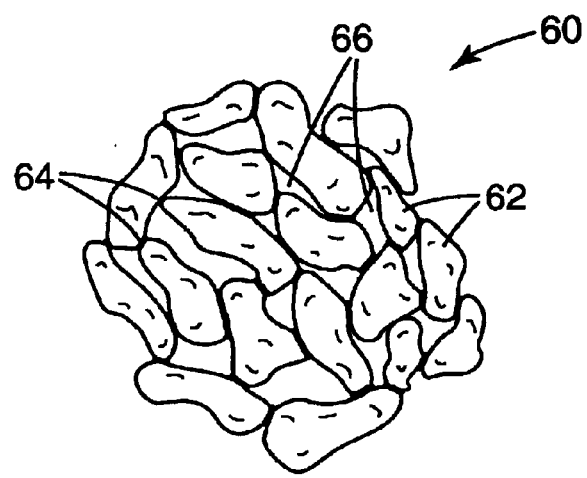
FIG. 5 is a schematic of exemplary agglomerate abrasive grain according to the present invention.

In some desired embodiment of the present invention, agglomerate abrasive grain comprises sintered alpha alumina-based abrasive particles and bonding material, both of which have a density of at least 85% (preferably, at least 90% and more preferably, at least 95%) of theoretical, and comprise, on a theoretical oxide basis, at least 60% by weight $Al_2O_3$, wherein at least 50% by weight of the total amount of alumina is present as alpha alumina, based on the total metal oxide content of the abrasive particle or bonding material, respectively. It is understood however, that the agglomerate abrasive grain itself has a porous structure such as shown and described in FIGS. 5 (above) and 6 (below). Agglomerate abrasive grain according to the present invention typically have a porosity value of, in increasing order of preference, at least 10%, 15%, or 20%. Preferably, the porosity value is, in increasing order of preference, in the range from about 15% to about 60%, about 20% to about 50%, or about 30% to about 45%.

Typically, sintered, crystalline, alpha alumina-based abrasive particles, as well as, the crystalline bonding materials or agglomerate abrasive grain according to the present invention, comprise, on a theoretical metal oxide basis, about 55 to about 99 percent by weight (preferably, about 65 to 95 percent by weight; more preferably, about 70 to about 95 percent by weight; and even more preferably about 80 to 94 percent by weight) $Al_2O_3$, based on the total metal oxide content of the sintered, crystalline, alpha alumina-based abrasive particles, crystalline ceramic bonding material, and/or agglomerate abrasive grain, respectively. Further certain sintered, crystalline, alpha alumina-based abrasive particles, crystalline ceramic bonding materials, or agglomerate abrasive grains, respectively, preferably comprise, on a theoretical metal oxide basis, about 0.1 to about 10 (preferably, about 0.5 to about 10 percent by weight; more preferably, about 0.75 to about 5; and even more preferably, about 1 to about 3 percent by weight) nucleating agent, based on the total metal oxide content of the sintered, crystalline, alpha alumina-based abrasive particles, crystalline ceramic bonding material, or agglomerate abrasive grain, respectively.

Some preferred sintered, crystalline, alpha alumina-based abrasive particles, as well as the crystalline ceramic bonding materials or agglomerate abrasive grain according to the present invention comprise about 0.75 to about 5 (more preferably, about 1 to about 3) percent by weight $Y_2O_3$, about 0.75 to about 5 (more preferably, about 1 to about 3) percent by weight $La_2O_3$, 0.1 to about 15 (more preferably, about 0.5 to about 10) percent by weight MgO, and about 70 to about 98.4 (more preferably, about 80 to about 98, about 85 to about 97, or about 90 to about 95) percent by weight $Al_2O_3$, based on the total metal oxide content of the sintered, crystalline, alpha alumina-based abrasive particles, (sintered) crystalline ceramic bonding material, or agglomerate abrasive grain, respectively.

Some preferred sintered, crystalline, alpha alumina-based abrasive particles, as well as the crystalline ceramic bonding materials or agglomerate abrasive grain according to the present invention comprise 0 to about 15 (more preferably, about 1 to about 10) percent by weight $ZrO_2$, 0 to about 15 (more preferably, about 1 to about 10, even more preferably, about 2 to about 5) percent by weight MgO, about 0.1 to about 10 (more preferably, about 0.1 to about 5, and even more preferably, about 0.5 to about 3) percent by weight nucleating agent (e.g., alpha $Fe_2O_3$ or alpha $Al_2O_3$), 0 to about 5 (more preferably, about 0.1 to about 3, and even more preferably, about 0.5 to about 2) percent by weight $SiO_2$, and about 70 to about 99 (more preferably, about 80 to about 98, about 85 to about 97, or about 90 to about 95) percent by weight $Al_2O_3$, based on the total metal oxide content of the sintered, crystalline, alpha alumina-based abrasive particles, crystalline ceramic bonding material, or agglomerate abrasive grain, respectively.

Some preferred sintered, crystalline, alpha alumina-based abrasive particles, as well as the crystalline ceramic bonding materials or agglomerate abrasive grain according to the present-invention comprise about 0.8 to about 2 (more preferably, about 1.2 to about 1.6) percent by weight $Y_2O_3$, about 0.8 to about 2 (more preferably, about 1.2 to about 1.6) percent by weight $La_2O_3$, about 0.8 to about 2 (more preferably, about 1.2 to about 1.6) percent by weight $Nd_2O_3$, about 0.8 to about 2 (more preferably, about 1.2 to about 1.6) percent by weight MgO, and about 96.8 to about 92 percent by weight $Al_2O_3$, based on the total metal oxide content of the sintered, crystalline, alpha alumina-based abrasive particles, crystalline ceramic bonding material, or agglomerate abrasive grain, respectively.

Generally, the preferred abrasive particles have a length in the range from about 100 to about 5000 micrometers (typically in the range from about 100 to about 3000 micrometers), although other sizes are also useful, and may even be preferred for certain applications. In another aspect, the preferred abrasive particles typically have an aspect ratio of at least 1.2:1 or even 1.5:1, sometimes at least 2:1, and alternatively, at least 2.5:1.

Typically, for sintered, crystalline alpha alumina-based abrasive particles, for example, the composition and microstructure of the crystalline ceramic, metal oxide bonding material can be the same or substantially the same as sintered, crystalline alpha alumina-based abrasive particles. The composition and/or microstructure of the crystalline ceramic, metal oxide bonding material and the sintered, crystalline alpha alumina-based abrasive particles, however, may be different. For example, the liquid used in forming agglomerated particles (e.g., agglomerated dried boehmite-based particles) may include metal oxide particulate and/or precursors thereof that provide the resulting crystalline ceramic bonding material with a composition and/or microstructure that is different than that of sintered, crystalline alpha alumina-based abrasive particles when used. Further, for example, migration of a metal oxide precursor present in precursor abrasive particles (e.g., dried boehmite-based particles) may also lead to differences in the composition and/or microstructure between the sintered, crystalline alpha alumina-based abrasive particles and the crystalline ceramic oxide bonding material. It is also within the scope of the present invention for the abrasive particles to include crystalline alpha alumina-based abrasive particles of more than one composition and/or microstructure, and/or types of abrasive particles such as fused aluminum oxide (including white fused alumina, heat-treated aluminum oxide, and brown aluminum oxide), silicon carbide, boron carbide, titanium carbide, diamond, cubic boron nitride, garnet, and fused alumina-zirconia abrasive particles. For example, the agglomerates can be formed using two or more different formulations of precursor abrasive particles (e.g., dried boehmite-based particles) and/or other abrasive particles (e.g., fused alumina, etc. or sintered alpha-alumina particles) in combination with a formulation(s) of dried boehmite-based particles.

The degree of crystallinity of the crystalline ceramic oxide bonding material can be determined using powder x-ray diffraction using known methods or procedures. For example, x-ray powder diffraction data can be collected employing a Philips vertical reflection geometry diffractometer (Philips Analytical (Division of Philips Electronics North America), Natick Mass.) using copper $K_\alpha$ radiation, and proportional detector registry of the scattered radiation. In this procedure, the diffractometer is equipped with variable entrance slits, fixed exit slits, and graphite diffracted beam monochromator. Step-scans are conducted within the 5 to 80 degree (2θ) scattering angle range using a 0.04 degree step size and 4 second dwell time. Generator settings are 45 kV and 35 mA. Analysis of the resulting data is performed using software obtained from Philips Analytical under the trade designation "PHILIPS PC-APD".

Crystalline phases are identified based on observed diffraction peaks and aided by use of diffraction patterns contained within the ICDD Powder Diffraction Database (International Centre for Diffraction Data (ICDD), Newtown Square, Pa.). Amounts of crystalline phases are estimated by comparison of observed relative peak intensities after removal of background intensity.

Some embodiments of agglomerate abrasive grain according to the present invention have a generally spherical in shape, although it may also, for example, be randomly shape or have a predetermined shape associated with them. The shape may be, for example, a block, cylinder, pyramid, rod, coin, square, or the like. Techniques for making various shaped agglomerate abrasive grain include shaping agglomerate abrasive grain precursor in molds, or forcing abrasive agglomerate precursor slurries through a substrate with one or more orifices, e.g., a sieve, mesh screen. Agglomerate abrasive grain can also be made, for example, by crushing relatively large pieces of agglomerated abrasive particles into smaller pieces.

Agglomerate abrasive grain according to the present invention typically have particle sizes ranging from about 20 to about 10,000 micrometers, more typically about 20 to about 5000 micrometers, preferably, about 100 micrometers to about 2500 micrometers, and more preferably, about 250 micrometers to about 1500 micrometers.

Abrasive precursor particles (e.g., dried precursor abrasive particles) dried precursor agglomerate abrasive grain, and calcined precursor agglomerate abrasive grain, as well as, agglomerate abrasive grain according to the present invention, may be screened and graded using techniques known in the art. For example, the dried particles are typically screened to a desired size prior to forming precursor agglomerate abrasive grain.

Typically, screening and grading is done using the well known techniques and standards for ANSI (American National Standard Institute), FEPA (Federation Europeenne des Fabricants de Products Abrasifs), or JIS (Japanese Industrial Standard) grade abrasive grain. Examples of ANSI grades are ANSI 24, ANSI 36, ANSI 40, ANSI 50, ANSI 60, and ANSI 80. Examples of FEPA grades are P8, P12, P16, P24, P36, P40, P54, P60, P80, P100, and P120. Examples of JIS grades are JIS JIS8, JIS12, JIS16, JIS24, JIS36, JIS40, JIS54, JIS60, JIS80, JIS100, and JIS120. Agglomerate abrasive grain according to the present invention can be made using such "in-grade" abrasive particles. Alternatively, for example, agglomerate abrasive grain according to the present invention can be made using even narrower distributions of particle sizes.

It may be desirable for agglomerate abrasive grain according to the present invention to comprise at least two distinct grades of abrasive particles (i.e., a first larger grade, and a second smaller grade). One measurement of the size of a sample of graded abrasive particles is the median particle size or $D_{50}$. As used herein "median particle size" or "$D_{50}$" for a sample of abrasive particles is equal to the abrasive particle size (typically specified as a diameter) for which 50% of the volume of the sample comprises abrasive particles which are smaller than the median volume particle size. As used herein "median particle size ratio" or "$D_{50}$ ratio" refers to the median particle size of the larger grade of abrasive particles in the agglomerate abrasive grain divided by the median particle size of any smaller grade of abrasive particles in the agglomerate abrasive grain. For example, for agglomerate abrasive grain according to the present invention comprising first and second abrasive particle grades having median particle sizes of 100 micrometer and 50 micrometers, respectively, the median particle size ratio or $D_{50}$ ratio is equal to 2. In agglomerate abrasive grain according to the present invention, the median particle size ratio is preferably about 2 or greater, more preferably about 3 or greater, most preferably about 5 or greater, and particularly most preferably about 7 or greater. It is also within the scope of the present invention to have more than two abrasive particle grades in the abrasive article. For example, the abrasive particle size distribution may contain three distinct grades of abrasive particle.

In some embodiments of agglomerate abrasive grains according to the present invention the mixture of at least two distinct grades of abrasive particles results in a distribution of abrasive particles sizes having at least two Gaussian-like, or bell-shaped curves. This distribution is evident when the particle size distribution is measured and displayed as a graph having particle size plotted along the x-axis, and the total number of particles having a given particle size plotted along the y-axis. For additional details regarding two distinct grades of abrasive particles, see, for example, U.S. Pat. No. 5,942,015 (Culler et al.), the disclosure of which is incorporated herein by reference.

It should be noted that although the median particle size ratio for any two grades of abrasive particles is preferably about 2 or greater, this does not preclude having abrasive particles of the same size in each grade. Since each abrasive particle grade comprises a distribution of abrasive particle sizes, overlap of the distributions is not precluded. For example, an abrasive grade having a $D_{50}$ of 30 micrometers and an abrasive grade having a $D_{50}$ of 60 micrometers may both contain abrasive particles having a size of 45 micrometers. As the $D_{50}$ ratio increases the range of particle sizes common to both grades decreases.

Typically, agglomerate abrasive grain according to the present invention containing two grades of abrasive particles comprise from about 10% to about 90% by weight of the larger grade of abrasive particles and from about 90% to about 10% of the smaller grade of abrasive particles. More preferably, the agglomerate abrasive grain according to the present invention comprise from about 25% to about 75% by weight of the larger grade of abrasive particles and from about 25% to about 75% by weight of the smaller grade of abrasive particles. Most preferably, the larger grade of abrasive particle is about 60% by weight and the smaller grade of abrasive particles is about 40% by weight. Agglomerate abrasive grain according to the present invention comprising more than two grades of abrasive particles typically comprise from about 10% to 50% by weight of the larger grade of abrasive particles and from about 50% to about 90% by weight for all smaller grades of abrasive particles. If there are two or more of the smaller abrasive particle grades, these grades may be present in equal or unequal amounts.

It is also within the scope of the present invention to coat the agglomerate abrasive grain with a surface coating such as described in U.S. Pat. No. 1,910,440 (Nicholson), U.S. Pat. No. 3,041,156 (Rowse), U.S. Pat. No. 4,997,461 (Markhoff-Matheny et al.), U.S. Pat. No. 5,009,675 (Kunz et al.), U.S. Pat. No. 5,011,508 (Wald et al.), U.S. Pat. No. 5,042,991 (Kunz et al.), and U.S. Pat. No. 5,213,591 (Celikkaya et al.), the disclosures of which are incorporated herein by reference.

It is within the scope of this invention to impregnate the abrasive agglomerate particle after the abrasive agglomerate particle is formed. In many instances the abrasive agglomerate will have porosity associated with it. The abrasive agglomerate may be impregnated with a composition to at least partially fill in some of this porosity. One such composition is a mixture of a grinding aid and a binder, preferably an organic binder.

Grinding aids encompass a wide variety of different materials and can be inorganic or organic based. Examples of chemical groups of grinding aids include waxes, organic halide compounds, halide salts and metals and their alloys. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, iron, and titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Agglomerate abrasive grain according to the present invention can be used in conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include binder and abrasive particles (which in practicing the present invention includes abrasive particles agglomerated together in the form of agglomerate abrasive grain according to the present invention), secured within the abrasive product by the binder. Methods of making such abrasive products and using abrasive products are well known to those skilled in the art. Furthermore, agglomerate abrasive grain according to the present invention can be used in abrasive applications that utilize slurries of abrading compounds (e.g., polishing compounds), milling media, shot blast media, vibratory mill media and the like.

Coated abrasive products generally include a backing, abrasive material, and at least one binder to hold abrasive particles (which in practicing the present invention includes abrasive particles agglomerated together in the form of agglomerate abrasive grain according to the present invention) onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive product.

Figure 1:
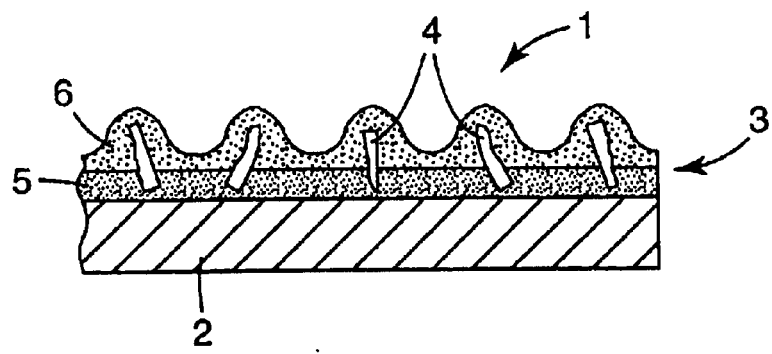
FIG. 1 is a fragmentary cross-sectional schematic view of a coated abrasive article including agglomerate abrasive grain according to the present invention.

An example of a coated abrasive product is depicted in FIG. 1. Referring to this figure, coated abrasive product 1 has a backing (substrate) 2 and abrasive layer 3. Abrasive layer 3 includes agglomerate abrasive grain according to the present invention 4 secured to a major surface of backing 2 by make coat 5 and size coat 6. In some instances, a supersize coat (not shown) is used.

Bonded abrasive products typically include a shaped mass of abrasive particles (which in practicing the present invention includes abrasive particles agglomerated together in the form of agglomerate abrasive grain according to the present invention), held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive products typically comprise about 3–50% by volume bond material, about 30–90% by volume abrasive material, up to 50% by volume additives (including grinding aids), and up to 70% by volume pores, based on the total volume of the bonded abrasive product. Typically, grinding wheels have at least 10%, 20%, or even porosity.

Figure 2:
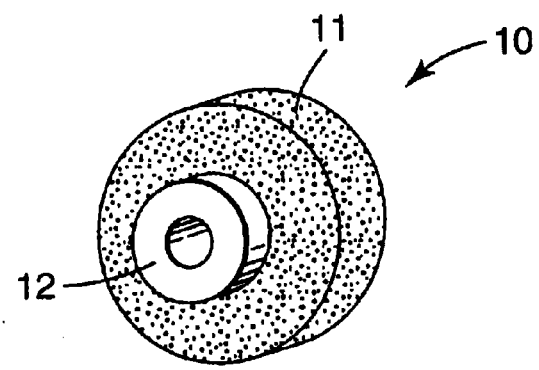
FIG. 2 is a perspective view of a bonded abrasive article including abrasive grain according to the present invention.

A preferred form is a grinding wheel. Referring to FIG. 2, grinding wheel 10 is depicted, which includes agglomerate abrasive grain according to the present invention 11, molded in a wheel and mounted on hub 12. An advantage that embodiments of agglomerate abrasive grain according to the present invention may offer in a bonded abrasive such as a grinding wheel may be room for chip clearance during metal removal. That is, the porosity present in certain embodiments of agglomerate abrasive grain according to the present invention may provide room for chip clearance during metal removal.

Figure 3:
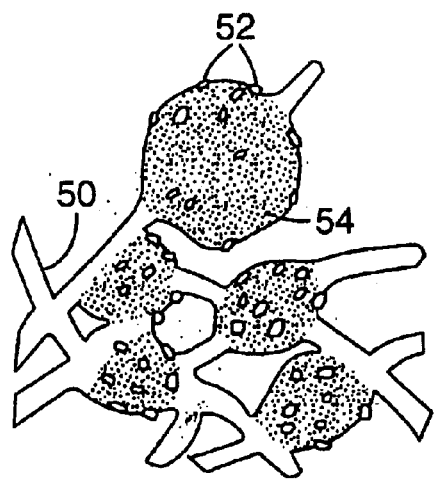
FIG. 3 is an enlarged schematic view of a nonwoven abrasive article including agglomerate abrasive grain according to the present invention.

Nonwoven abrasive products typically include an open porous lofty polymer filament structure having abrasive particles (which in practicing the present invention includes abrasive particles agglomerated together in the form of agglomerate abrasive grain according to the present invention), distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which agglomerate abrasive grain according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Preferably, such brushes are made by injection molding a mixture of polymer and abrasive particles (which in practicing the present invention includes abrasive particles agglomerated together in the form of agglomerate abrasive grain according to the present invention).

Suitable organic binders for making abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive product may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminatcs, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,137 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. Bonded, vitrified abrasive products may be in the shape of a wheel (including cut off wheels), honing stone, mounted pointed or other conventional bonded abrasive shape. A preferred vitrified bonded abrasive product is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C., sometimes in the range from about 900° C. to about 1200° C., or even in the range from about 950° C. to about 1100° C. The actual temperature at which the bond is matured depends, for example, on the particular bond chemistry.

Preferred vitrified bonding materials may include those comprising silica, alumina (preferably, at least 10 percent by weight alumina), and boria (preferably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, and titanium dioxide), and metal sulfites (e.g., calcium sulfite).

In general, the addition of a grinding aid increases the useful life of the abrasive product. A grinding aid is a material that has a significant effect on the chemical and physical processes of abrading, which results in improved performance. Although not wanting to be bound by theory, it is believed that a grinding aid(s) will (a) decrease the friction between the abrasive material and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

The abrasive products can contain 100% agglomerate abrasive grain according to the present invention, or blends of such agglomerate abrasive grain with other abrasive particles (which may also be agglomerated) and/or diluent particles. However, at least about 2% by weight, preferably at least about 5% by weight, and more preferably about 30–100% by weight, of the abrasive particles in the abrasive products should be agglomerate abrasive grain according to the present invention. In some instances, the agglomerate abrasive grain according the present invention may be blended with other abrasive particles and/or diluent particles at a ratio between 5 to 75% by weight, about 25 to 75% by weight, about 40 to 60% by weight, or about 50% to 50% by weight (i.e., in equal amounts by weight). Examples of suitable abrasive particles include, but are not limited to, fused aluminum oxide (including white fused alumina, heat treated aluminum oxide and brown aluminum oxide), silicon carbide, silicon nitride, boron carbide, titanium carbide, diamond, cubic boron nitride, garnet, fused alumina-zirconia, sol-gel-derived abrasive particles, and the like. The sol-gel-derived abrasive particles may be seeded or non-seeded. Likewise, the sol-gel-derived abrasive particles may be randomly shaped or have a shape associated with them, such as a triangle. Examples of sol gel abrasive particles include those described above. The agglomerate grain may have the essentially the same size as the diluent particle. Conversely, the agglomerate grain may be larger in size than the diluent particle.

Agglomerate abrasive grain according to the present invention can also be combined with other abrasive agglomerates. The binder of the other abrasive agglomerates may be organic and/or inorganic. Additional details regarding abrasive agglomerates may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), the disclosures of which are incorporated herein by reference.

If there is a blend of agglomerate abrasive grain or a blend of agglomerate abrasive grain and abrasive particles, the particle/agglomerate types forming the blend may be of the same size. Alternatively, the particle/agglomerate types may be of different particle sizes. For example, the larger sized particles may be agglomerate abrasive grain according to the present invention, with the smaller sized particles being another particle/agglomerate type. Conversely, for example, the smaller sized abrasive particles may be agglomerate abrasive grain according to the present invention, with the larger sized particles being another particle/agglomerate type.

Examples of suitable diluent particles include marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example in a coated abrasive, there may be two layers of abrasive particles/grain. The first layer comprises abrasive particles/grain other than agglomerate abrasive grain according to the present invention, and the second (outermost) layer comprises agglomerate abrasive grain according to the present invention. Likewise in a bonded abrasive, there may be two distinct sections of the grinding wheel. The outermost section may comprise agglomerate abrasive grain according to the present invention, whereas the innermost section does not. Alternatively, agglomerate abrasive grain according to the present invention may be uniformly distributed throughout the bonded abrasive article.

Further details regarding coated abrasive products can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive products can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,038,453 (Narayanan et al.), U.S. Pat. No. 5,110,332 (Narayanan et al.), and U.S. Pat. No. 5,863,308 (Qi et al.) the disclosures of which are incorporated herein by reference. Further, details regarding vitreous bonded abrasives can be found, for example, in U.S. Pat. No. 4,543,107 (Rue), U.S. Pat. No. 4,898,597 (Hay), U.S. Pat. No. 4,997,461 (Markhoff-Matheny et al.), U.S. Pat. No. 5,094,672 (Giles et al.), U.S. Pat. Nos. 5,118,326 (Sheldon et al.), 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive products can be found, for example, in U.S. Pat. No. 2,958,593 (Hoover et al.), the disclosure of which is incorporated herein by reference.

Methods for abrading with preferred abrasive agglomerate grain according to the present invention range from snagging (i.e., high pressure high stock removal) to polishing (e.g., polishing medical implants with coated abrasive belts), wherein the latter is typically done with finer grades (e.g., less ANSI 220 and finer) of abrasive particles. The abrasive agglomerate grain may also be used in precision abrading applications, such as grinding cam shafts with vitrified bonded wheels. The size of the abrasive agglomerate grain (and abrasive particles comprising such agglomerates) used for a particular abrading application will be apparent to those skilled in the art.

Abrading with abrasive agglomerate grain according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive agglomerate grain according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Agglomerate abrasive grain according to the present invention may be also be used in loose form or in a slurry wherein agglomerate abrasive grain is dispersed in liquid medium (e.g., water).

EXAMPLES

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

Example 1

Example 1 was prepared as follows. A boehmite sol was prepared by mixing 1194 parts of boehmite (obtained under the trade designation "DISPERAL" from Condea Chemie, GmbH of Hamburg, Germany) with 3000 parts of acidified water (prepared by mixing 3000 parts of deionized water with 71 parts of concentrated nitric acid) using a continuous mixer. The sol was dried at less than 160° C. for less than 48 hours. The dried material was crushed, and then screened to produce −100 mesh (U.S. Standards screen size) particles.

Approximately 5.7 liters (1.5 gallon) of the −100 mesh material were placed in the mixer pan of a Eirich mixer (Model RV02, obtained from Eirich Machines Inc., Gurnee, Ill.). With both the pan rotation and beater bar at their lowest settings, 1000 ml of a rare earth nitrate solution (solution (hereafter referred to as "REO1 solution") prepared by mixing a lanthanum, neodymium, and yttrium nitrate (having, on a theoretical metal oxide basis, 23% rare earth oxide (i.e., $La_2O_3$, $Nd_2O_3$, and $Y_2O_3$); available from Molycorp of Lourviers, Colo.) with a sufficient amount of magnesium nitrate ($Mg(NO_3)_2.6H_2O$) solution (having, on a theoretical metal oxide basis, 11% MgO; available from Mallinckrodt Chemical of Paris, Ky.) and cobalt nitrate ($Co(NO_3)_2.6H_2O$) solution (having, on a theoretical metal oxide basis 19% CoO; available from Hall Chemical of Wickliffe, Ohio) to provide a solution containing, on a theoretical metal oxide basis 5.8% $La(NO_3)_3.6H_2O$, 5.8% $Nd(NO_3)_3.6H_2O$, about 7.1% $Y(NO_3)_3.6H_2O$, about 14.4% $Mg(NO_3)_3.6H_2O$, about 0.4% $Co(NO_3)_2.6H_2O$, and the balance deionized water) in a 4-liter flask) was slowly poured into the mixing pan, leading to agglomeration of the −100 mesh material. After about 30 seconds of mixing, rotation was stopped and the pan emptied into aluminum trays. The agglomerates were dried in a forced air oven at 80° C. for 16 hours, and then screened using a No. 22 stainless screen (978 micrometer openings) to separate the agglomerates. The retained agglomerates were crushed using a pulverizer (Model UD, obtained from Braun Corp., Los Angeles, Calif.). The crushed material was then screened over a No. 70 stainless screen (269 micrometer openings). The retained agglomerates were fed into a rotary calcining kiln to provide calcined material. The calcining kiln consisted of a 15 cm inner diameter, 1.2 meter in length, stainless steel tube having a 0.3 meter hot zone. The tube was inclined at a 3.0 degree angle with respect to the horizontal. The tube rotated at about 3.5 rpm, to provide a residence time in the tube of about 4–5 minutes. The temperature of the hot zone was about 650° C.

The calcined material was fed into a rotary firing/sintering kiln. The firing/sintering kiln consisted of an 8.9 cm inner diameter, 1.32 meter long silicon carbide tube inclined at 4.4 degrees with respect to the horizontal and had a 31 cm hot zone. The heat was applied externally via SiC electric heating elements. The sintering kiln rotated at 6.0 rpm, to provide a residence time in the tube of about 5 minutes. The firing/sintering temperature was about 1430° C. The product exited the kiln into room temperature air where it was collected in a metal container and allowed to cool to room temperature.

The density of the agglomerate abrasive grain was measured using a helium gas pycnometer (obtained under the trade designation "MICROMERITICS ACCUPYC 1330" from Micromeritics Instruments Corp., Norcross, Ga.). The average of three runs of a 12 gram sample was the density. The density of the Example 1 abrasive grain was determined 3.89 g/cm³.

The bulk density of the agglomerate abrasive grain was determined using an apparatus consisting of a metal funnel with an inside diameter of 11.3 cm at the top and an inside diameter at the stem of 1.3 cm. The entire height of the funnel was about 9.0 cm (including stem). The funnel was placed on a ring-stand above a brass cup (3.9 cm inside diameter×8.45 cm height) so that the base of the funnel stem was 11.5 cm above the top of the cup (The volume of the cup was determined by filling the cup with water from a graduated burette). The volume of the cup was calculated as 100.0 cm³.

To allow the funnel to be filed with the agglomerate abrasive grain, the stem of the funnel was closed with a rubber ball attached to the outside of the funnel stem. Agglomerate abrasive grain was poured into the funnel. The rubber ball was removed to allow the agglomerate abrasive grain to empty into and eventually overflow the metal cup. Using a straight edge, the agglomerate abrasive grain was carefully leveled to the top of the cup, tapped to allow the agglomerate abrasive grain to settle in the cup and then weighed. The bulk density was determined by dividing the weight of the mineral and cup minus the weight of the cup by the volume of the cup (which was determined as described above to be 100.0 cm³). The bulk density is reported an average of three independent measurements. The bulk density of the Example 1 agglomerate abrasive grain was 1.59 g/cm³.

Example 2

A boehmite sol was prepared by mixing 1194 parts of boehmite ("DISPERAL") with 3000 parts of acidified water (prepared by mixing 3000 parts of deionized water with 71 parts of concentrated nitric acid), 390 parts of magnesium nitrate solution (11% MgO solids; obtained from Mineral Research and Development Corp., Harrisburg, N.C.), and 400 parts of a 3.6%, on a theoretical oxide basis, $Fe_2O_3$ of a suspension of an iron oxyhydroxide (γ-FeOOH; aqueous dispersion (pH=5.0–5.5), about 90 to 95% of which is lepidocrocite and goethite, acicular particles with an average particle size of about 0.05 to 0.1 micrometer, a length to diameter or width ratio of about 1:1 to 2:1, and a surface area of about 115.3 m²/g) using a continuous mixer. The sol was dried at less than 160° C. for less than 48 hours. The dried material was crushed, and then screened to produce –100 mesh (U.S. Standards screen size) particles.

A portion of the –100 mesh dried material was agglomerated by spraying water into a 40.6 cm disk pelletizer (obtained from Feeco International, Green Bay, Wis.). The resulting agglomerate abrasive grain (60–65% solids) were dried, calcined, and fired/sintered as described in Example 1, except the firing/sintering temperature was 1330° C. at a residence time of about 10 minutes. Uniform sized agglomerates were formed. The resulting agglomerate abrasive grain were screened to –16+20 and –20+30 mesh sizes and were used to make coated abrasive discs. The coated abrasive discs were made according to conventional procedures. The agglomerate abrasive grain were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether.

The wet make resin weight was about 145 g/m². The agglomerate abrasive grain weight was about 600 g/m² (–20+30 mesh) and about 1000 g/m² (–6+20 mesh). Immediately after the make coat was applied, the agglomerates were drop coated. The make resin was precured for 90 minutes at 88° C. The wet size weight was about 650 g/m² (–20+30 mesh) and about 900 g/m₂ (–16+20 mesh). The size resin was precured for 90 minutes at 88° C., followed by a final cure of 10 hours at 100° C. A conventional $KBF_4$ supersize coating (320 g/m²) was applied on top of the cured size coat. The coated abrasive discs were flexed prior to testing.

Comparative Example A coated abrasive discs were prepared as described for Example 2, except the abrasive material was ANSI grade 60 abrasive particles available from the 3M Company under the trade designation "201 CUBITRON", was electrostatically coated, and about 325 g/m² of size resin was used. The abrasive material weight was about 400 g/m².

Four each of the Example 2, –16+20 mesh and –20+30 mesh agglomerate, coated abrasive discs were evaluated for 12 minutes on 4130 mild steel workpieces. Each disc was attached to a 16.5 cm diameter, 1.57 mm thick, hard phenolic backup pad which was in turn mounted onto a 15.2 cm diameter steel flange. The mounted disc was rotated counterclockwise at 3550 rpm. The 1.8 mm peripheral edge of a 25 cm diameter 4130 mild steel workpiece deployed 7° from a position normal to the coated abrasive disc under a load of approximately 4 Kg. The workpiece was weighed at the start of the test and at two minute intervals to determine the amount of mild steel removed (i.e., abraded). The average initial, final, and total cuts for the Example 2 coated abrasive discs were, for the –16+20 mesh agglomerate abrasive grain, 13.5 grams, 9.2 grams, and 65 grams, respectively, and, for the –20+30 mesh agglomerate abrasive grain, 15.8 grams, 9.5 grams, and 71.8 grams, respectively. The average initial, final, and total cuts for the Comparative Example A coated abrasive discs were 22.2 grams, 13.8 grams, and 101.8 grams, respectively.

Example 3

Example 3 was prepared as follows. A boehmite sol was prepared by mixing 1194 parts of boehmite ("DISPERAL") with 3000 parts of acidified water (prepared by mixing 3000 parts of deionized water with 71 parts of concentrated nitric acid) using a continuous mixer. The sol was dried at less than 160° C. for less than 48 hours. The dried material was crushed, and then screened to produce –60+120 mesh (U.S. Standards screen size) particles.

The –60+120 mesh dried particles were fed into a 40.6 cm disk pelletizer (obtained from Feeco International, Green Bay, Wis.) at 210 g/min. and mixed with acidified water (4.7% nitric acid) which was sprayed into the 40.6 cm disk pelletizer at 96 g/min. Uniform sized agglomerates were formed. The agglomerates were dried in aluminum trays a forced air oven at 95° C. for 16 hours. The dried agglomerates were calcined in a conventional box furnace at 650° C. for 8 hours. After cooling, about 1000 grams of the calcined agglomerates were soaked in 2000 ml of REO1 solution (see Example 1). An aspirator was used to pull a vacuum on the agglomerates/solution contained in the flask. After about 5 minutes, the vacuum was released, and the agglomerates placed in a Büchner filter with #54 paper. An aspirator was used to aid in the removal of excess surface liquid. The impregnated agglomerates were then dried, calcined, and fired/sintered as described in Example 1, except, the firing/sintering temperature was 1410° C.

The density of the fired/sintered agglomerate abrasive grain was determined as described in Example 1, and found to be 3.93 g/cm$^3$. The fired/sintered agglomerate abrasive grain were screened to +14 mesh, −14+16 mesh, −16+18 mesh, −18+20 mesh, −20+24 mesh, −24+30 mesh, −30+40 mesh, and −40 mesh. The densities of these various sized agglomerate abrasive grain were also determined with the helium gas pycnometer as described in Example 1, and found to be 3.925 g/cm$^3$, 3.932 g/cm$^3$, 3.930 g/cm$^3$, 3.930 g/cm$^3$, 3.935 g/cm$^3$, 3.944 g/cm$^3$, 3.953 g/cm$^3$, and 3.950 g/cm$^3$, respectively.

FIG. 6 is an optical photomicrograph of −20+24 mesh Example 3 agglomerate abrasive grain at 25×.

A portion of the −20+24 mesh agglomerate abrasive grain were incorporated into coated abrasive discs, which were tested for grinding performance. The coated abrasive discs were made according as described in Example 2, except the agglomerate abrasive grain were electrostatically coated. The agglomerate abrasive grain weight was about 600 g/m$^2$. A portion of the 40 mesh material, which due to its size was unagglomerated material, was also incorporated into coated abrasive discs, and served as Comparative Example B coated abrasive discs.

Figure 7:
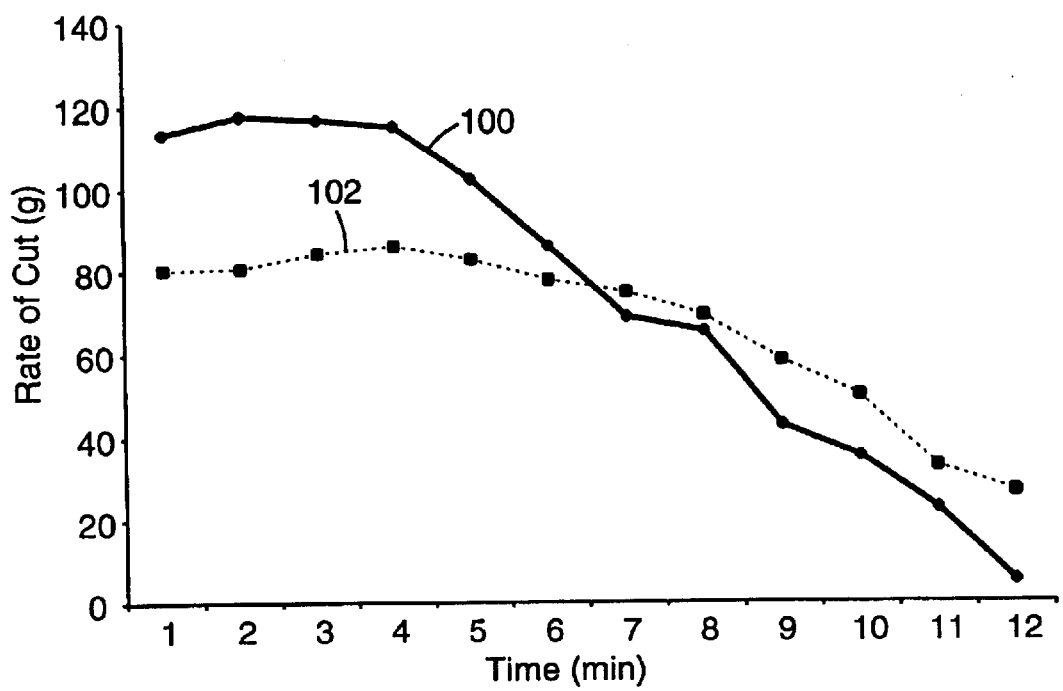
FIGS. 7, 8, 9, 10, 11a, and 11b are graphs of various grinding data of exemplary agglomerate abrasive grain according to the present invention, as well as various comparative examples.

Example 3 and Comparative Example B coated abrasive discs were ground on a Slide Action Grinder using 10.5 kilograms pressure and 1018 mild steel workpieces. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece. Each disc was used to grind individual workpiece in a sequence of one-minute intervals. The initial, cut, final cut, and total cut for the −20+24 mesh coated abrasive discs were 80.4 grams, 26.8 grams, and 804.4 grams, respectively, and for the Comparative Example B coated abrasive discs, 113.6 grams, 5.3 grams, and 884.2 grams, respectively. Additional grinding data is presented in FIG. 7, wherein line 100 shows grinding data for the −20+24 mesh Example 3 coated abrasive discs, and line 102, grinding data for the Comparative Example B coated abrasive discs.

Example 4

Example 4 was prepared as follows. Dried material was prepared as described in Example 1, except it was screened to −60+120 mesh (15% +40 mesh; 41% +50 mesh; 11% +60 mesh; 20% +80 mesh; and 13% −80 mesh). The −60+120 mesh dried particles were fed into the 40.6 cm disk pelletizer at a rate of 275 g/min. and mixed with acidified water (5.45% nitric acid) which was sprayed into the agglomerator (onto the particles) at 108 g/min. Uniform sized agglomerates were formed. The resulting agglomerates were fed into a vibratory feeder and fed into a 6 meter belt oven at temperature of 115° C. The speed of the belt was a speed of 76 cm/min. The dried agglomerates were calcined as described in Example 1, and then screened over a 34 stainless steel screen (580 micrometers) to remove fines, and then through a 13TM screen (1650 micrometers) to remove coarse particles.

About 15 kilograms of impregnated agglomerates were prepared by impregnating the +34−13TM particles with 10,800 grams of REO1 solution (described in Example 1) by tumbling the particles and solution in a conventional, portable cement mixer with the vanes removed. The impregnated agglomerates were dried with three air heat guns while the particles tumbled in the cement mixer. The dried particles were calcined and fired/sintered as described in Example 1 except the firing/sintering temperature was 1400° C. The calcined particles were fed into the firing/sintering furnace at 72 g/min.

The porosity value of the agglomerate abrasive grain was determined by dividing the interstitial porosity in the agglomerate abrasive grain by the total volume of the agglomerates and then multiply the result by 100%. This method of providing a porosity value was developed as follows. For spheres, which the agglomerates typically approximate, the maximum density obtainable for the random packing of uniform spheres is 63% (see "Mechanical Packing of Spherical Agglomerates", *Journal of the American Ceramic Society*, Vol. 44, No. 10, October 1961, pp. 513–22, the disclosure of which is incorporated herein by reference). For a mass of the agglomerate abrasive grain, the total volume, TV, is equal to the sum of the volume of agglomerate abrasive grain, VA, plus the volume of the void between agglomerate abrasive grain, VV. Note that the total volume, TV, is also the inverse of the tap density, TD.

The volume of agglomerate abrasive grain, VA, is the sum of the volume of the solid portion of the agglomerate abrasive grain, VS, plus the volume of the porosity (pores) within the agglomerate abrasive grain, VP. Note that the volume of the solid portion of the agglomerate abrasive grain, VS, is the inverse of the true density, DD. Taking the 63% packing value described above, the following equation was used $$VA/TV=0.63 \tag{1}$$

Since, as noted above, the total volume of the agglomerate abrasive grain, TV, is the inverse of the tap density, TD, $$VA=0.63/BD \tag{2}$$

Further, since VA=VP+VS, and VP is the inverse of the density, DD, $$VA=VP+(DD)^{-1} \tag{3}$$

Combining the latter two equations and then rearranging the result, $$VP=0.63(TD)^{-1}-(DD)^{-1} \tag{4}$$

The percent of pores in the agglomerate abrasive grain, referred to herein as the "porosity value" is the combination of volume of pores in the agglomerate abrasive grain and the interstitial porosity, VP, divided by the total volume of the agglomerate abrasive grain, VA, times 100%. Thus, $$\text{Porosity Value}=100\%(1-(TD/0.63DD)) \tag{5}$$

The tap density of the agglomerate abrasive grain, TD, was determined as follows. About 50 ml of agglomerate abrasive grain was weighed and then poured into a 50 ml glass graduated cylinder (NO. 20026; obtained under the trade designation "KIMAX") while the cylinder was vibrated axially using a vibrating table (Model J-1; obtained under the trade designation "SYTRON" from FMC Corp, Homer City, Calif.). The intensity of vibration was adjusted to give a minimum volume of agglomerate abrasive grain in the cylinder. This minimum volume was divided into the weight of agglomerate abrasive grain to give the tap density.

The true density, DD, of the resulting agglomerate abrasive grain was determined, as described in Example 1, to be 3.96 g/cm$^3$. The agglomerate abrasive grain were screened and found to be 1.5% +16 mesh, 16.7% +20 mesh, 34.2% +30 mesh, 28.6% +40 mesh, 11.8% +50 mesh, 2.6% +60 mesh, and 4.6% −60 mesh. The true densities, DD, of the −16+26 mesh, −26+34 mesh, and −34+48 mesh agglomerate abrasive grain were determined, as described in Example 1, to be 3.94 g/cm$^3$, 3.94 g/cm$^3$, and 3.945 g/cm$^3$, respectively. The bulk densities of the −16+26 mesh, −26+34 mesh, and −34+48 mesh agglomerate abrasive grain were determined, as described in Example 1, to be 1.43 g/cm$^3$, 1.41 g/cm$^3$, and 1.48 g/cm$^3$, respectively.

The tap densities of the −16+26 mesh, −26+34 mesh, and −34+48 mesh agglomerate abrasive grain were determined to be 1.64 g/cm$^3$, 1.71 g/cm$^3$, and 1.80 g/cm$^3$, respectively. Thus, using equation 5, the porosity values for the −16+26 mesh, −26+34 mesh, and −34+48 mesh agglomerate abrasive grain were determined to be 33.9%, 31.1%, and 27.6%, respectively.

The agglomerate abrasive grain were screened over 66/48/34/26 stainless steel screens. A portion of the −26+34 mesh material was used to make coated abrasive discs as described in Example 2, except the make, abrasive grain, size, and supersize weights were 4.5 grams, 14 grams, 14.4 grams, and 12 grams (per 7 inch disc), respectively. The −66 mesh agglomerate abrasive grain was screened to −50+60 mesh, which due to its size was unagglomerated material, was also incorporated into coated abrasive discs, and served as Comparative Example C coated abrasive discs. The make, abrasive grain, size, and supersize weights for the Comparative Example C discs were 3.5 grams, 12 grams, 7 grams, and 7 grams (per 7 inch disc), respectively.

Figure 8:
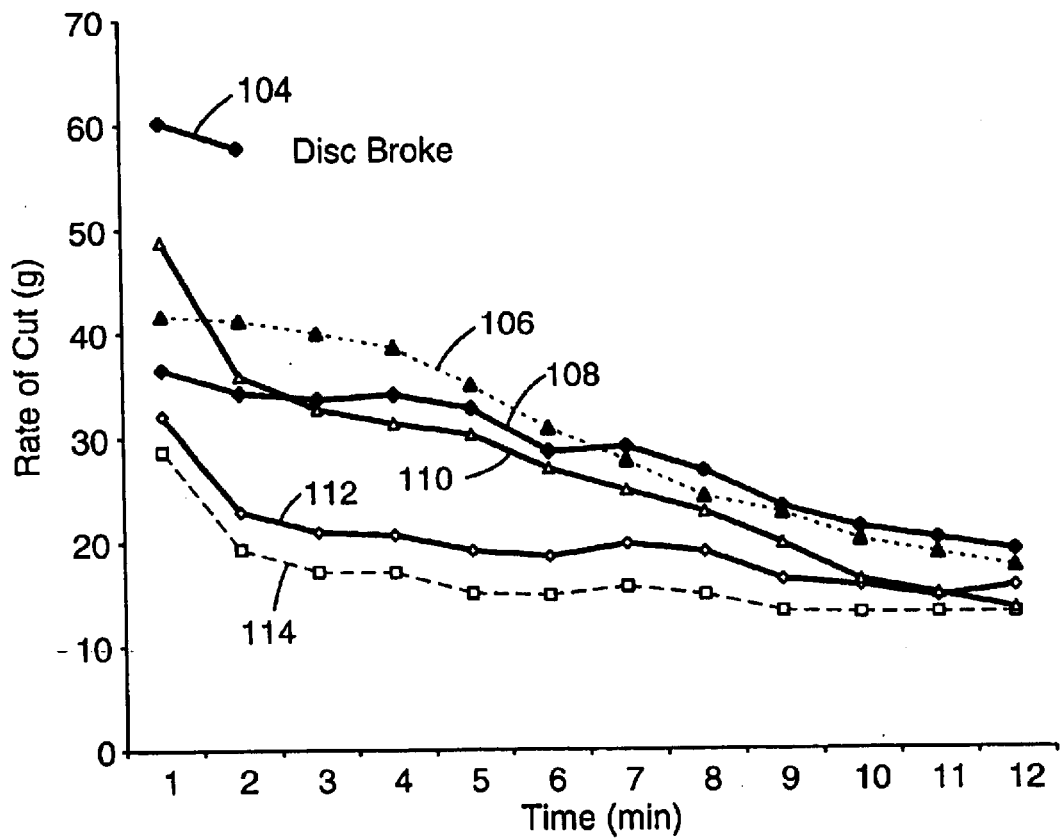

The grinding performance of the discs were evaluated as described in Example 2, except the discs were driven at 5,200 rpm on 304 stainless steel workpieces under various grinding pressures. Referring to FIG. 8, the grinding results at a pressure of 6.4 kilograms (14 lbs.) for the Example 4 coated abrasive discs is shown by line 114, and for Comparative Example C coated abrasive discs by line 108. Referring again to FIG. 8, the grinding results at a pressure of 7.3 kilograms (16 lbs.) for the Example 4 coated abrasive discs is shown by line 112, and for Comparative Example C coated abrasive discs by line 106. Further, the grinding results at a pressure of 10.0 kilograms (22 lbs.) for the Example 4 coated abrasive discs is shown by line 110, and for Comparative Example C coated abrasive discs by line 104. The Comparative Example C at 10.0 Kg grinding pressure did not survive the first minute of the test.

A portion of the −26+34 mesh material, the 26+34 mesh material, the −34+48 mesh material, the −50+60 mesh material (Comparative Example C), and ANSI grade 36 abrasive particles available from the 3M Company under the trade designation "321 CUBITRON" were used to make coated abrasive belts. The latter, which was made using by drop coating the abrasive particles, as well as electrostatically coating the particles, served as Comparative Example D. The agglomerate abrasive grain were bonded to, 30.5 cm wide by 0.8 mm thick, polyester cloth backing using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 293 g/m$^2$. Immediately after the make coat was applied, the agglomerates were coated. The make resin was precured for 90 minutes at 88° C. The wet size weight was about 432 g/m$^2$. The agglomerate abrasive grain weight was about 909 g/m$^2$. The size resin was precured for 90 minutes at 88° C., followed by a final cure of 10 hours at 100° C. A conventional KBF$_4$ supersize coating (292 g/m$^2$) was applied on top of the cured size coat. The coated backing was converted into belts using known methods. The coated abrasive belts (3×13 inch) were flexed prior to testing. The −16+26 mesh Example 4 belts were made by drop coating the agglomerate abrasive grain, as well as by electrostatically coating the agglomerate abrasive grain. The −26+34 mesh Example 4 belts were made by drop coating the agglomerate abrasive grain. The −34+48 mesh Example 4 belts were made by electrostatically coating the agglomerate abrasive grain.

Figure 9:
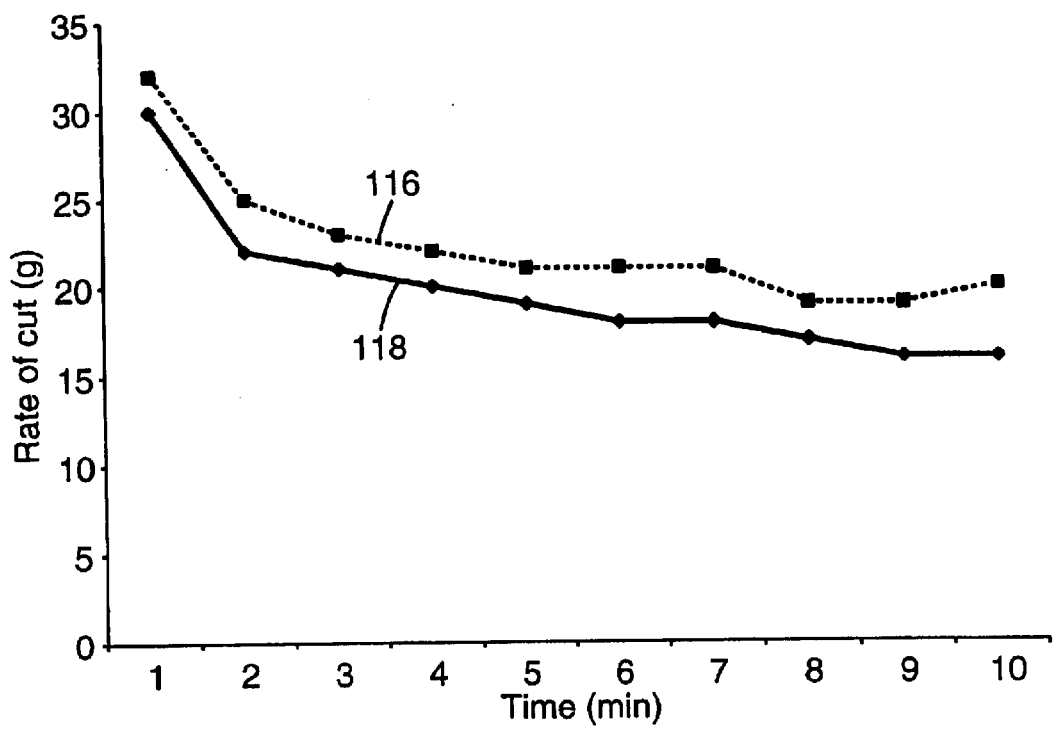
Figure 10:
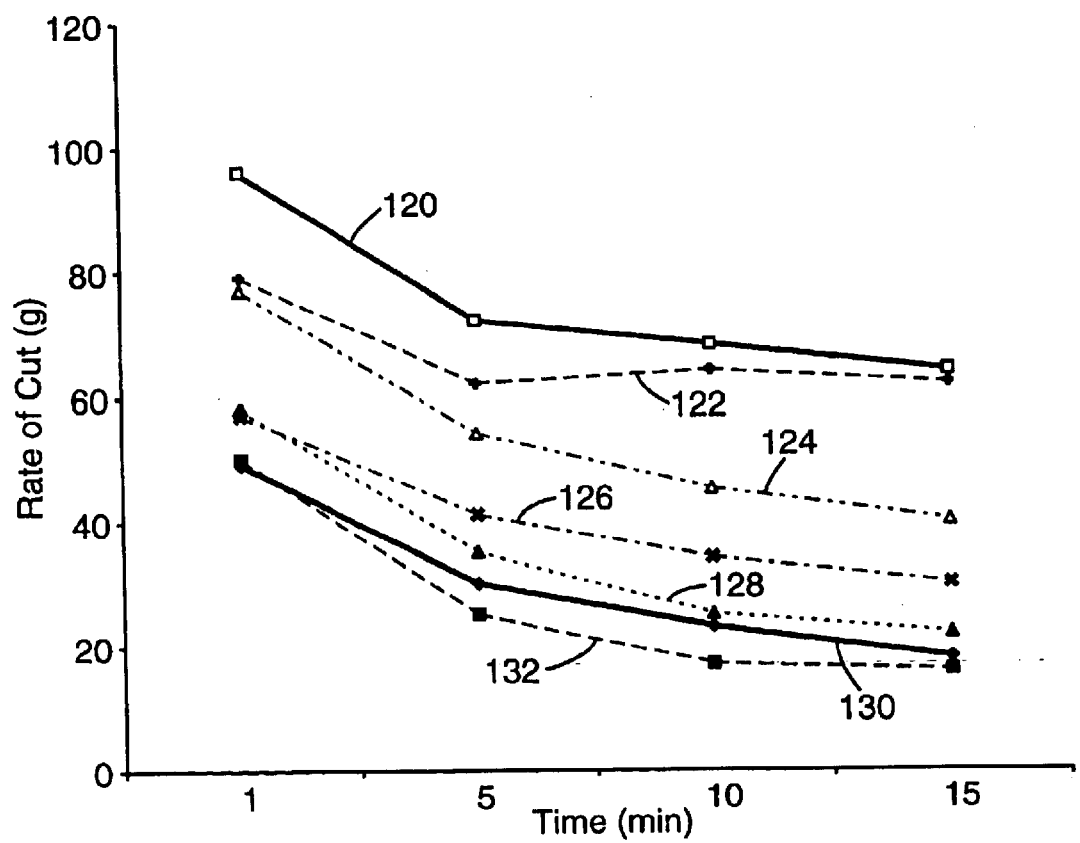

The grinding performance of the −26+34 mesh Example 4 belts and −34+48 mesh Example 4 belts were evaluated on 304 stainless steel work pieces at a pressure of 1.05×10$^5$ Kg/m$^2$ (150 psi). The grinding results are shown in FIG. 9, where line 116 is the −26+34 mesh Example 4 belt and line 118 is the −34+48 mesh Example 4 belt. The grinding results on 304 stainless steel workpiece at a pressure of 9.1 kilograms and 1750 rpm are shown in FIG. 10, where line 128 is the −26+34 mesh Example 4 belt, line 126 is the −34+48 mesh Example 4 belt, line 130 is the −16+26 mesh electrostatic coated Example 4 belt and line 132 is the −16+26 mesh drop coated Example 4 belt. In addition, grade 50, 60, and 80 coated abrasive belts, available from the 3M Company under the trade designation "977F REGALLOY", were also ground under the latter conditions. The grinding results of these grade 50, 60, and 80 coated abrasive belts are shown in FIG. 10 as lines 124, 120, and 122, respectively.

Figure 11A:
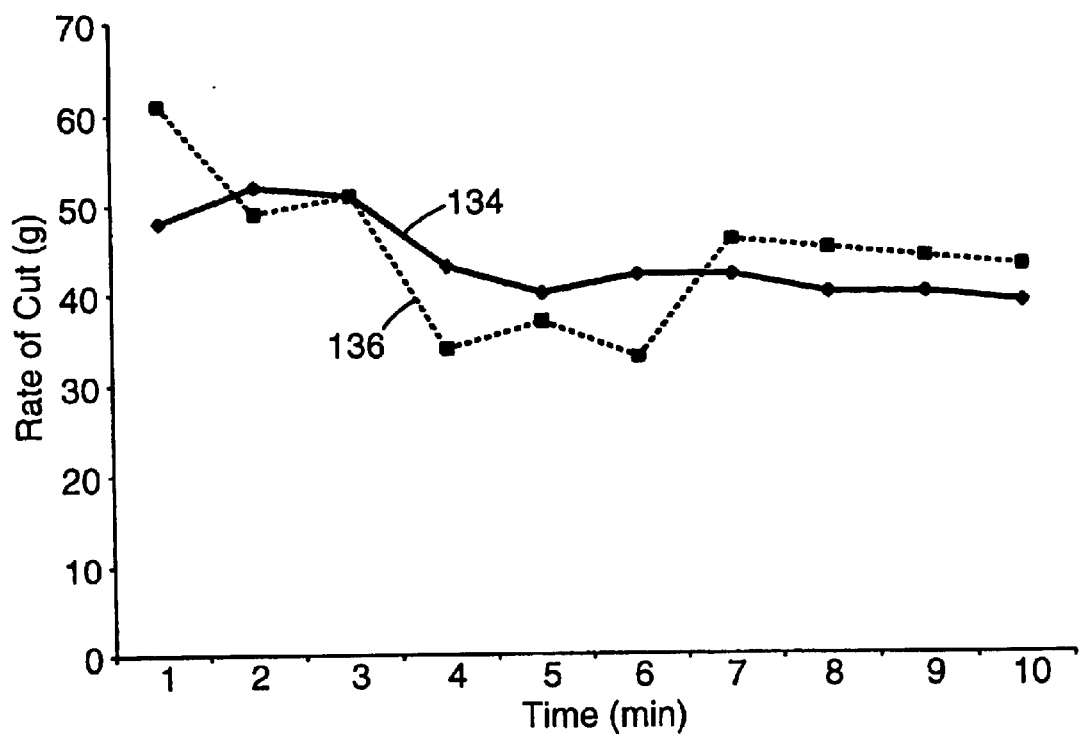

The grinding performance of −16+26 electrostatic coated Example 4 belts, as well as Comparative Example E belts made from ANSI grade 36 abrasive particles available from the 3M Company under the trade designation "321 CUBITRON" were evaluated on cast aluminum at a pressure of 150 psi (1031 kPa) and 7380 surface ft./min. (2250 m/min.) Referring FIG. 11a, line 136 shows the grinding data for the −16+26 electrostatic coated Example 4 belt, line 134 is the grinding data for the Comparative Example E belt. The Comparative Example E belt was made as described above using electrostatic coated abrasive grain.

Figure 11B:
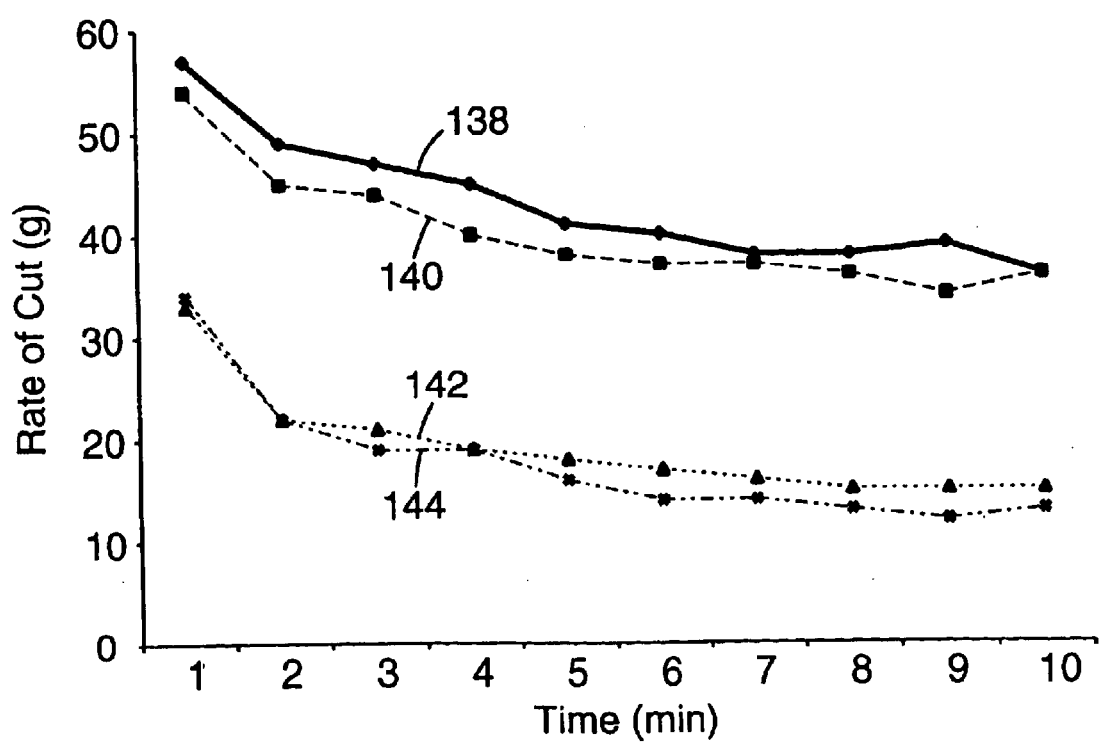

The grinding performance of −16+26 drop coated Example 4, a16+26 electrostatic coated Example 4, and Comparative Example E belts, as well as Comparative Example F belts made from ANSI grade 36 abrasive particles available from the 3M Company under the trade designation "321 CUBITRON" were evaluated as described above for the 16+26 drop coated Example 4 and Comparative Example E belts, except the workpieces were 304 stainless steel workpieces. Referring to FIG. 11b, line 140 shows the grinding data for the −16+26 drop coated Example 4 belt, line 138 the grinding data for the −16+26 electrostatic coated Example 4 belt, line 142 shows the grinding data for the −16+26 drop coated Example 4 belt, and line 144 the grinding data for the Comparative Example F belt. The Comparative Example F belt was made as described above using drop coated abrasive grain.

Example 5

Example 5 was prepared as follows. A boehmite sol was prepared by mixing 1194 parts of boehmite ("DISPERAL") with 3000 parts of acidified water (prepared by mixing 3000 parts of deionized water with 71 parts of concentrated nitric acid) using a continuous mixer. The sol was dried at less than 160° C. for less than 48 hours. The dried material was crushed, and then screened to produce −40 +80 mesh (U.S. Standards screen size) particles The retained particles were fed into a rotary calcining kiln to provide calcined material of gamrna alumina. The calcining kiln consisted of a 15 cm inner diameter, 1.2 meter in length, stainless steel tube having a 0.3 meter hot zone. The tube was inclined at a 3.0 degree angle with respect to the horizontal. The tube rotated at about 3.5 rpm, to provide a residence time in the tube of about 4–5 minutes. The temperature of the hot zone was about 650° C.

About 200 grams of the −40 +80 mesh calcined particles were fed into a 40.6 cm disk pelletizer (obtained from Feeco International, Green Bay, Wis.).

A second boehmite sol was prepared by mixing 333 parts of boehmite with 3000 parts of acidified water as described above. About 136 grams of this sol were sprayed onto the calcined particles while they were tumbled in the 40.6 cm disk pelletizer. Uniform sized agglomerates were formed, which were dried in aluminum trays in a forced air oven at 95° C. for 16 hours. The dried agglomerates were then calcined in a rotary kiln as described above.

The calcined agglomerates were impregnated with REO1 solution (described in Example 1) using 68 parts of solution per 100 grams of agglomerates. The solution was poured onto a bed of the agglomerates while they were tumbled in the disk pelletizer. The impregnated agglomerates were then dried by directing an air heat gun onto the agglomerates while they were tumbled. The dried agglomerates were calcined and fired/sintered as described in Example 1 except the firing/sintering temperature was 1400° C.

Example 6

Example 6 was prepared as follows. A 58% solids boehmite gel was made by combining 100 parts of 150 mesh and finer boehmite crusher fines (prepared as described in Example 1) with 72.4 parts of acidified water (69.4 parts water and 3 parts 67% nitric acid) using a continuous processor (obtained under the trade designation "READCO" from the Readco Company, York, Pa.). The gel was extruded through a 2 inch (5.1 cm) single screw extruder (obtained from the Bonnot Company, Uniontown, Ohio), having multiple 0.012 inch (0.31 mm) openings. The extruded gel was dried at 80° C. for 4 hours, broken into approximately 1.6 mm rods and pre-fired to 650° C. in a rotary furnace as per the calcining step described in Example 1.

50 grams of the calcined gamma alumina rods were combined with 50 grams of boehmite fines (prepared as described in Example 1), wherein the screen size was −40+100 mesh). The mixture was placed in the 40.6 cm disc pelletizer, inclined at 34 degrees with respect to horizontal and rotated at 30 rpm. A mixture of 58 grams REO1 solution (described in Example 1) and 3 grams nitric acid (67%) was sprayed onto the particles using a hand sprayer while the particles were tumbled. The resulting agglomerates were allowed to air dry overnight, after which they were calcined to 650° C. in a metal crucible and then fired/sintered at 1400° C. in a rotary tube furnace as described in Example 1. The agglomerates were then screened over a 40 mesh sieve to remove single particles.

Examples 7–11

Examples 7–11 were prepared as follows. Abrasive slurries were prepared by thoroughly mixing abrasive particles, ceramic binder precursor material, acrylate resin, and initiators, according to the formulations listed in Table 1, below.

TABLE 1

| Material | Amounts for Ex. 7 and 8, g | Amounts for Ex. 9 and 10, g | Amounts for Ex. 11, g |
|---|---|---|---|
| TMPTA | 300 | 150 | 300 |
| KB1 | 3.0 | 1.5 | 3.0 |
| CH | 2.0 | 1.0 | 2.0 |
| SCA | 15.0 | 4.0 | 8.0 |
| AOP | 1000 | 550 | 1100 |
| #60 AG321 | 2000 | — | — |
| P320 AG321 | 500 | — | — |
| P80 AO | — | 1375 | — |
| P80 SC | — | — | 2750 |
| Total inorganic solids content | 92 wt % | 93 wt % | 93 wt % |

The ingredients were added in the order listed except for the AOP and AG321 ANSI grades 60 and P320, the AO grade P80, or the SC grade P80. The AOP and AG321 grade 60 and P320, AO grade P80, or SC grade P80 were first combined together and then slowly added to the remaining ingredients. The abbreviations for the various ingredients are described below.

| | |
|---|---|
| TMPTA: | trimethylol propane triacrylate, obtained available from Sartomer Co., West Chester, PA under the trade designation "SR351". |
| KB1: | photo initiator 2,2-dimethoxy-1,2-diphenyl-1-ethanone, obtained from Sartomer Co. under the trade designation "ESACURE KB1". |
| CH: | cumene hydroperoxide, obtained from Aldrich Chemical Co., Milwaukee, WI, as item no. 24,750-2. |
| SCA: | silane coupling agent 3-methacryloxpropyl-trimethoxysilane, obtained from Union Carbide Corp., Friendly, WV under the trade designation "A-174". |
| AOP: | alpha-aluminum oxide powder, obtained from Alcoa, Houston, TX under the trade designation "A-16 SG". |
| AG321: | sol gel-derived alumina-based abrasive particles obtained from 3M Company, St. Paul, MN under the trade designation "321 CUBITRON". |
| AO: | heat treated fused aluminum oxide abrasive particles, obtained from Treibacher, Villach, Austria under the trade designation "ALODUR BFRPL". |
| SC: | silicon carbide abrasive grain, commercially available from 3M Company, St. Paul, MN. |

Mixing was done in a mixer with a flat beater rotor and on the slowest speed setting (obtained from Hobart Corporation, Troy, Ohio; model number A120T). After the AOP/AG321, AOP/AO or AOP/SC mixture was added to the resin mixture, the speed was increased to "medium" and the mixing continued for 25 minutes. The final temperature of each mixture was about 116° F. (47° C.). At this point, the abrasive slurry was very thick with cement-like handling characteristics. The mixed slurry was then placed in a refrigerator for at least 45 minutes to cool down before further processing. The temperature of the refrigerator was in the range from about 40° F. (4° C.) to about 45° F. (7° C.).

Precursor agglomerate abrasive grain were made for Examples 7–11 using a size-reducing machine (obtained from Y-Tron Quadro, Limited, Chesham, United Kingdom, under the trade designation "QUADRO COMIL") having a solid impeller (model "ARROW 1701") with a 0.175 inch (4.44 mm) gap and a conical screen with 0.050 inch (1.27 mm) round, grater-type orifices. The drive motor was operated at 350 rpm. After passing the slurries through the size-reducing machine ("QUADRO COMIL") and UV curing system, the at least partially cured precursor agglomerate abrasive grain were placed in aluminum pans and at least partially thermally cured in the forced-air oven for about 6 hours at about 350° F. (177° C.). The precursor agglomerate abrasive grain were then reduced in size by causing them to pass through the size-reducing machine ("QUADRO COMIL") using a carbide-tipped (Model "ARROW 1607") impeller at a 0.175 inch (4.44 mm) gap and a 0.079 inch (2.00 mm) grater screen. After the reduction in size the precursor agglomerate abrasive grain were screened and the particle size fraction greater than 36 mesh (0.0185 inch, 0.47 mm) was collected.

The precursor agglomerate abrasive grain were then subjected to two heating steps. In the first heating step (i.e., calcining), rod-shaped precursor agglomerate abrasive grain were calcined in order to remove acrylate resin used in the agglomerate forming process, and to cause the crystalline ceramic oxide bonding precursor material to sufficiently bond together to provide handleable and collectable precursor agglomerate abrasive grain. The precursor agglomerate abrasive grain were spread ⅝ inch (16 mm) thick in 3.5 inch×7.5 inch (89 mm×190 mm) aluminum pans (obtained from Coors Ceramics Co., Golden Colo.) and heated in air in a laboratory furnace (obtained from Lindberg/Blue M Company, Watertown, Wis.; model number BF 117) according to the following schedule:

heating from about room temperature to about 662° F. (350° C.) at a rate of 3.6° F. (2° C.)/minute;

holding for about 2 hours at about 662° F. (350° C.);

heating from about 662° F. (350° C.) to about 1832° F. (1000° C.) at about 3.6° F. (2° C.)/minute;

holding for about 4 hour soak at about 1832° F. (1000° C.); and cooling in the furnace to about room temperature by turning off the power to the furnace.

The resulting calcined precursor agglomerate abrasive grain were further reduced in size to provide a desired size distribution for making coated abrasive articles. The calcined precursor agglomerate abrasive grain were further reduced in size by passing them through the size-reducing machine ("QUADRO COMIL") using a carbide-tipped Arrow 1607 impeller at a 0.175 inch (4.44 mm) gap and a 0.079 inch (2.00 mm) grater screen. The resulting calcined precursor agglomerate abrasive grain were screened and the size fraction larger than 20 mesh (0.0320 in, 0.81 mm) and smaller than 12 mesh (0.0661 in, 1.70 mm) was retained.

For Examples 7, 9, and 11, the second heating step was performed by placing about 100 grams of calcined precursor agglomerate abrasive grain in a 3 inch (7.6 cm) diameter platinum crucible and then heating in a laboratory box furnace (obtained from CM Rapid Temp Furnace, Bloomfield, N.J. under the trade designation "RAPID TEMP"). In the second heating step, the particles were held at a maximum temperature of about 2732° F. (1500° C.) for about 90 minutes. The agglomerate abrasive grain were then allowed to cool to room temperature by shutting off the "RAPID TEMP" box furnace and allowing it to cool to room temperature.

For Examples 8 and 10 calcined precursor agglomerate abrasive grain were impregnated with an REO solution (herein referred to as "REO2 solution") before the heating firing step. REO2:solution was prepared by blending a lanthanum, neodymium, and yttrium nitrate solution (20.5% $La(NO_3)_3.6H_2O$, 20.1% $Nd(NO_3)_3.6H_2O$, 26.1% $Y(NO_3)_3.6H_2O$; available from Molycorp of Lourviers, Colo.) with a sufficient amount of MGN and cobalt nitrate (15% $Co(NO_3)_3.6H_2O$; available from Hall Chemical of Wickliffe, Ohio) to provide a solution containing about 5.8% $La(NO_3)_3.6H_2O$, about 5.8% $Nd(NO_3)_3.6H_2O$, about 7.1% $Y(NO_3)_3.6H_2O$, about 14.4% $Mg(NO_3)_3.6H_2O$, about 0.4% $Co(NO_3)_3.6H_2O$, and the balance deionized water. The calcined precursor agglomerate abrasive grain were impregnated by mixing 25 ml of REO2 solution per 100 grams of calcined precursor agglomerate abrasive grain with the calcined precursor agglomerate abrasive grain. The mixture was tumbled in a rotating, polyethylene-lined container for about 10 minutes to distribute the REO2 solution through the calcined precursor agglomerate abrasive grain. Impregnated calcined precursor agglomerate abrasive grain were then placed in aluminum pans and placed in a forced-air oven (obtained from Despach Industries, Minneapolis, Minn; model number ALD2-11) and dried for about 2 hours at about 100° C. The agglomerates were then removed and allowed to cool down to about room temperature.

The agglomerate were then passed through a rotary kiln that was heated to about 1200° F. (650° C.). The rotary kiln had a "hot zone" that was about 12 inches (30.5 cm) and a silicon carbide rotary tube that was about 15 cm in diameter, about 1.1 m long, and was elevated at about 2.5° inclination. The residence time was about 5 minutes through the length of the tube. After being passed through the rotary kiln, the agglomerates were then heated at about 2732° F. (1500° C.) for about 90 minutes according to the second heating step described in Examples 7, 9, and 11.

Coated abrasive articles with polyester cloth backings and phenolic-based make and size resins were prepared Examples 7–10 agglomerate abrasive grain. The Y-weight backing cloth was a sateen weave polyester with a basis weight of approximately 535 g/m² (obtained from Wisselink Textiles, Aalten, Netherlands). The make resin was a 52:48 mixture by weight of $CaCO_3$:water-based phenolic (obtained from Georgia-Pacific Resins, Columbus, Ohio; product number GP23155B).

An draw-down apparatus (obtained from Paul Gardner Co., Pompano Beach, Fla., under the trade designation "ACCU LAB") and a #90 wire-wound coating rod (obtained from Paul Gardner Co., Pompano Beach, Fla.) was used to spread a uniform coating of make resin onto the polyester backing. The make coating weight for the #90 wire wound coating rod setting on the draw-down apparatus was approximately 230 g/m² on a dry weight basis. Make coating weight was determined for a given setting of the #90 wire wound coating rod on the draw-down apparatus by the following procedure: weighing a backing sample, applying a make coat to the backing sample using the draw-down apparatus at a given setting, drying the make coat in a convection oven (obtained from Precision Scientific, Chicago, Ill.; model number 8) about 2 hours at about 190° F. (88° C.), and then weighing the dried make coated backing. Coating weight=(dried make coated backing sample weight—the backing sample weight)/(area of the backing sample).

The previously screened agglomerate abrasive grain were then poured by hand onto the wet make resin and rolled back and forth by hand several times to distribute the agglomerate abrasive grain evenly on the backing, and then the excess agglomerate abrasive grain were shaken off. The coated samples were heated overnight for about 10 hours in a convection oven (obtained from Precision Scientific, Chicago, Ill.; model number 8) set at about 180° F. (82° C.).

The size resin was a 52:48 mixture by weight of cryolite:water-based phenolic (obtained from Georgia-Pacific Resins, Columbus, Ohio; product number GP23155B) and was applied to the samples by hand with a paint brush. The size coated samples were heated in the convection oven for about 1 hour at about 180° F. (82° C.), and then cured for about 2 hours at about 200° F. (93° C.), followed by about 30 minutes at about 220° F. (104° C.) and about 1 hour at about 245° F. (118° C.). After curing, the coated abrasive samples were flexed over a 2 inch (5 cm) diameter bar in order to make the coated sample more suitable for installation into the Rocker Drum Test apparatus (described below).

Comparative Example G

Comparative Example G was a cloth-backed coated abrasive article containing organically-bonded agglomerate abrasive particles. The organically-bonded agglomerate abrasive particles were grade #60, and are marketed by the 3M Company, St. Paul, Minn. under the trade designation "MULTICUT C". The organically-bonded agglomerate abrasive particles was made of ANSI grade 60 AG321 abrasive particles bonded together by a cryolite-filled phenolic bond system. The coated samples were made as described above for Example 7, except the organically-bonded agglomerate abrasive particles ("MULTICUT C") particles were used in place of the agglomerate abrasive grain.

Comparative Example H

Comparative Example H was an ANSI grade 60 commercially available coated abrasive article marketed by the 3M Company, under the trade designation "3M 967F". This abrasive article included a single layer of grade #60 AG321 abrasive particles electrostatically coated onto a polyester cloth backing with phenolic based make and size resins.

Examples 7–10 were cut into 10 inch×2.5 inch (25.4 cm×6.4 cm) sheets and evaluated using the following test herein referred to as the "Rocker Drum Test". These samples were installed on a cylindrical steel drum of a testing machine. The steel drum was 13 inches (33 cm) in diameter, and was driven by an electric motor and a pushrod lever so that the drum oscillated (rocked back and forth in a small arc). A 1018 carbon steel workpiece (a workpiece is abraded by the abrasive article), 3/16 inch (0.48 cm) square, was fixed in a lever arm arrangement above the abrasive article, and a load of about 8 lb (3.6 kg) was applied to the workpiece. As the abrasive article rocked back and forth, the workpiece was abraded, and a 3/16 inch×5.5 inch (0.48 cm×14 cm) wear path was created on the abrasive article. There were approximately 60 strokes per minute on this wear path. A compressed air stream at 20 psi (138 kPa) was directed onto the abrasive article at the point of contact with the workpiece to clear grinding swarf and debris from the wear path.

The amount of steel removed after each 1000 cycles (one cycle being one back-and-forth motion) was recorded as the "interval cut" and the "total cut" was the cumulative total of "interval cuts") amount of steel removed at the endpoint of the test. The endpoint of the test was determined to be when a predetermined number of cycles were completed or when the cut rate dropped to less than approximately 40% of the maximum interval cut recorded for that test. The results presented in Table 2, below, are an average of two samples per Example.

TABLE 2

| Test interval, cycles | Comp. Ex. G Interval cut, g | Comp Ex. H Interval cut (g) | Example 7 Interval cut, g | Example 8 Interval cut, g | Example #9 Interval cut, g | Example 10 Interval cut, g |
| --- | --- | --- | --- | --- | --- | --- |
| 1000 | 1.13 | 1.81 | 2.14 | 1.03 | 2.14 | 1.08 |
| 2000 | 1.29 | 1.79 | 2.32 | 1.16 | 2.42 | 1.18 |
| 3000 | 1.32 | 1.78 | 2.33 | 1.16 | 2.38 | 1.24 |
| 4000 | 1.39 | 1.77 | 2.33 | 1.18 | 2.43 | 1.25 |
| 5000 | 1.36 | 1.61 | 2.28 | 1.14 | 2.39 | 1.22 |
| 6000 | 1.41 | 1.17 | 2.02 | 1.16 | 2.41 | 1.17 |
| 7000 | 1.48 | 0.24 | 1.54 | 1.11 | 2.45 | 1.12 |
| 8000 | 1.47 | — | 1.44 | 1.08 | 2.56 | 1.08 |
| 9000 | 1.51 | — | 1.19 | 1.02 | 2.52 | 0.95 |
| Total Cut, g | 12.36 | 10.17 | 17.59 | 10.04 | 21.70 | 11.21 |

Example 9, which included alumina and rare earth oxide, provided a maximum cut rate of 70% of Comparative Example G, and of 140% of Comparative Example H. Compared to the Example 9 abrasive article, the corresponding Example 7 abrasive article, which used agglomerate abrasive grain that did not include rare earth oxide, provided similar cut rates initially, but the total cut provided by the Example 7 abrasive article was limited by shelling of the agglomerate abrasive grain from the backing after about 5000 test cycles.

The Example 9 abrasive article maintained a consistent cut rate, as measured by the interval cuts, within a range of about 18% from lowest to highest over the duration of the test. The cut rate, as measured by the interval cuts, of the Comparative Example G abrasive article increased steadily by about 34% over the duration of the test. The Comparative Example H abrasive article maintained a consistent cut rate, as measured by the interval cuts, over the first few test intervals, but then decreased abruptly as the workpiece wore through the abrasive coating to the backing. The cut rates, as measured by the interval cuts, of Examples 8 and 10 abrasive articles were similar, but were about half the cut rates, as measured by the interval cuts, provided by the Examples 7 and 9 abrasive articles.

The strengths of Examples 7–11 agglomerate abrasive grain were measured using a Crush Test. Approximately 5 grams of screened agglomerate abrasive grain were used for each test. Agglomerate abrasive grain were poured onto an epoxy resin lab benchtop and spread out by hand to isolate individual particles. Agglomerate abrasive grain that were in the range from about 0.039 in (1 mm) to about 0.078 in (2 mm) were selected and crushed using a force gauge equipped with a flat compression foot fitting (obtained from Shimpo Instruments, Lincolnwood, Ill.; model number FGV-50). The force gauge read from 0 to 60 lbs (0 to 267 N). The flat compression fool of the force gauge was held in a horizontal position above and contacting the agglomerate abrasive grain to be crushed and a constant force was applied by hand until the agglomerate abrasive grain broke (breakage was measured by audible sound and/or feel). The maximum force applied to cause the agglomerate abrasive grain to break (i.e. Crush Test Value) was recorded and the test repeated. The Crush Test Values reported in Table 3 were the averages of at least 40 samples of a given agglomerate abrasive grain example.

TABLE 3

|  | Example 7 | Example 8 | Example 9 | Example 10 | Example 11 |
|---|---|---|---|---|---|
| Average Crush Test Value, lb. (N) | 17.4 (77.5) | 22.3 (99.2) | 7.78 (34.6) | 10.2 (45.4) | 9.74 (3.1) |
| Standard Deviation, lb. (N) | 2.9 (12.9) | 3.2 (14.4) | 1.85 (8.2) | 2.79 (12.4) | 2.6 (11.6) |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Agglomerate abrasive grain comprising a plurality of abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, and wherein the abrasive particles have an average particle size of at least 5 micrometers.

2. The agglomerate abrasive grain according to claim 1, wherein the average particle size of the particles is at least 25 micrometers.

3. The agglomerate abrasive grain according to claim 1, wherein the average particle size of the particles is at least 100 micrometers.

4. The agglomerate abrasive grain according to claim 1, wherein the abrasive particles comprise fused abrasive particles.

5. An abrasive article including:
   binder material; and
   a plurality of agglomerate abrasive grain according to claim 4 secured within said article by said binder material.

6. The agglomerate abrasive grain according to claim 1, wherein the abrasive particles include abrasive particles selected from the group consisting of fused aluminum oxide abrasive particles, white fused aluminum oxide abrasive particles, heat-treated fused aluminum oxide abrasive particles, brown fused aluminum oxide abrasive particles, silicon carbide abrasive particles, boron carbide abrasive particles, titanium carbide abrasive particles, diamond abrasive particles, cubic boron nitride abrasive particles, garnet abrasive particles, fused alumina-zirconia abrasive particles, sintered alpha alumina-based abrasive particles, boehmite-derived, sintered alumina abrasive particles, and a combination thereof.

7. The agglomerate abrasive grain according to claim 1, wherein the bonding material comprises, on a theoretical oxide basis, at least 60 percent by weight $Al_2O_3$, based on the total metal oxide content of the bonding material.

8. The agglomerate abrasive grain according to claim 1, wherein the bonding material comprises, on a theoretical oxide basis, at least 90 percent by weight $Al_2O_3$, based on the total metal oxide content of the bonding material.

9. The agglomerate abrasive grain according to claim 1, wherein the bonding material comprises, on a theoretical oxide basis, at least 95 percent by weight $Al_2O_3$, based on the total metal oxide content of the bonding material.

10. The agglomerate abrasive grain according to claim 1, wherein the abrasive particles include sintered, alpha alumina-based abrasive particles.

11. The agglomerate abrasive grain according to claim 10, wherein the sintered, alpha alumina-based abrasive particles comprise of alpha alumina crystals having an average crystal size of less than 1 micrometer.

12. The agglomerate abrasive grain according to claim 10, wherein the bonding material and the sintered, ceramic alpha alumina-based abrasive particles have substantially the same composition.

13. The agglomerate abrasive grain according to claim 10, wherein the bonding material and the sintered, ceramic alpha alumina-based abrasive particles have substantially the same composition and microstructure.

14. The agglomerate abrasive grain according to claim 10, wherein the average particle size of the particles is at least 25 micrometers.

15. The agglomerate abrasive grain according to claim 14, wherein the bonding material comprises, on a theoretical oxide basis, at least 60 percent by weight $Al_2O_3$, based on the total metal oxide content of the bonding material.

16. The agglomerate abrasive grain according to claim 14, wherein the bonding material comprises, on a theoretical oxide basis, at least 95 percent by weight $Al_2O_3$, based on the total metal oxide content of the bonding material.

17. An abrasive article including:
   binder material; and
   a plurality of agglomerate abrasive grain according to claim 14 secured within said article by said binder material.

18. An abrasive article including:
   binder material; and
   a plurality of agglomerate abrasive grain according to claim 1 secured within said article by said binder material.

19. The agglomerate abrasive grain according to claim 1, wherein the abrasive particles comprises at least one of fused aluminum oxide abrasive particles, silicon carbide abrasive particles, boron carbide abrasive particles, titanium carbide abrasive particles, diamond abrasive particles, cubic boron nitride abrasive particles, garnet, or fused alumina-zirconia abrasive particles.

20. The agglomerate abrasive grain according to claim 19, further comprising boehmite-derived, sintered alumina abrasive particles.

21. An abrasive article including:
   binder material; and
   a plurality of agglomerate abrasive grain according to claim 19 secured within said article by said binder material.

22. Agglomerate abrasive grain comprising a plurality of polycrystalline abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent.

23. The agglomerate abrasive grain according to claim 22, wherein the abrasive particles have a density of at least 95% of theoretical density.

24. The agglomerate abrasive grain according to claim 22, wherein the abrasive grain has a porosity value of at least 30 percent.

25. The agglomerate abrasive grain according to claim 22, wherein the abrasive particles comprise fused abrasive particles.

26. An abrasive article including:
   binder material; and
   a plurality of agglomerate abrasive grain according to claim 25 secured within said article by said binder material.

27. An abrasive article including:
   binder material; and
   a plurality of agglomerate abrasive grain according to claim 25 secured within said article by said binder material.

28. The agglomerate abrasive grain according to claim 22, wherein the abrasive particles comprise sintered, alpha alumina-based abrasive particles.

29. The agglomerate abrasive grain according to claim 22, wherein the abrasive particles include abrasive particles selected from the group consisting of fused aluminum oxide abrasive particles, white fused aluminum oxide abrasive particles, heat-treated fused aluminum oxide abrasive particles, brown fused aluminum oxide abrasive particles, silicon carbide abrasive particles, boron carbide abrasive particles, titanium carbide abrasive particles, diamond abrasive particles, cubic boron nitride abrasive particles, garnet abrasive particles, fused alumina-zirconia abrasive particles, sintered alpha alumina-based abrasive particles, boehmite-derived, sintered alumina abrasive particles, and a combination thereof.

30. The agglomerate abrasive grain according to claim 22, wherein the bonding material comprises, on a theoretical oxide basis, at least 60 percent by weight $Al_2O_3$, based on the total metal oxide content of the bonding material.

31. The agglomerate abrasive grain according to claim 22, wherein the bonding material comprises, on a theoretical oxide basis, at least 90 percent by weight $Al_2O_3$, based on the total metal oxide content of the bonding material.

32. The agglomerate abrasive grain according to claim 22, wherein the bonding material and the sintered, ceramic alpha alumina-based abrasive particles have substantially the same composition.

33. The agglomerate abrasive grain according to claim 22, wherein the bonding material and the sintered, ceramic alpha alumina-based abrasive particles have substantially the same composition and microstructure.

34. The agglomerate abrasive grain according to claim 22, wherein the abrasive particles comprise at least one of fused aluminum oxide abrasive particles, silicon carbide abrasive particles, boron carbide abrasive particles, titanium carbide abrasive particles, diamond abrasive particles, cubic boron nitride abrasive particles, garnet abrasive particles, or fused alumrina-zirconia abrasive particles.

35. The agglomerate abrasive grain according to claim 34, further comprising boehmite-derived, sintered alumina abrasive particles.

36. An abrasive article including:
   binder material; and
   a plurality of agglomerate abrasive grain according to claim 34 secured within said article by said binder material.

37. A method for making agglomerate abrasive grain comprising:
   contacting a plurality of at least one of abrasive particles or precursor abrasive particles with a precursor bonding material such that the particles agglomerate together; and
   heating the agglomerated particles at at least one temperature for a time sufficient to convert the agglomerated particles, into agglomerate abrasive grain comprising a plurality of abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the abrasive particles of the agglomerate abrasive grain have an average particle size of at least 5 micrometers.

38. The method according to claim 37, wherein the abrasive particles comprise fused abrasive particles.

39. The method according to claim 37, wherein the abrasive particles include abrasive particles selected from the group consisting of fused aluminum oxide abrasive particles, white fused alumina abrasive particles, heat-treated aluminum oxide abrasive particles, brown aluminum oxide abrasive particles, silicon carbide abrasive particles, boron carbide abrasive particles, titanium carbide abrasive particles, diamond abrasive particles, cubic boron nitride abrasive particles, garnet abrasive particles, fused alumina-zirconia abrasive particles, sintered alpha alumina-based abrasive particles, boehmite-derived alumina abrasive particles, and a combination thereof.

40. The method according to claim 37, wherein the precursor abrasive particles comprise boehmite.

41. The method according to claim 37, wherein the bonding material comprises, on a theoretical oxide basis, at least 60 percent by weight $Al_2O_3$, based on the total metal oxide content of the bonding material.

42. The method according to claim 37, wherein the bonding material comprises, on a theoretical oxide basis, at least 90 percent by weight $Al_2O_3$, based on the total metal oxide content of the bonding material.

43. The method according to claim 37, further comprising, prior to said heating:
   drying the agglomerated particles;
   calcining the dried agglomerated particles to provide porous agglomerated particles; and
   impregnating the porous agglomerated particles with a composition comprising water and at least one of metal oxide or metal oxide precursor.

44. The method according to claim 37, wherein the average particle size of the particles is at least 25 micrometers.

45. The method according to claim 37, wherein the average particle size of the particles is at least 100 micrometers.

46. The method according to claim 37, wherein the abrasive particles are comprised of crystals having an average crystal size less than 10 micrometers.

47. The method according to claim 37, wherein the abrasive particles include sintered, crystalline ceramic alpha alumina-based abrasive particles.

48. The method according to claim 37, wherein the bonding material and the sintered, ceramic alpha alumina-based abrasive particles have substantially the same composition.

49. The method according to claim 37, wherein the bonding material and the sintered, ceramic alpha alumina-based abrasive particles have substantially the same composition and microstructure.

50. The method according to claim 37, wherein the abrasive particles of the agglomerate abrasive grain have a density of at least 85% of theoretical density, and the agglomerate abrasive grain has a porosity value of at least 30 percent.

51. A method for making agglomerate abrasive grain comprising:
   contacting a plurality of at least one of abrasive particles or precursor abrasive particles with a precursor bonding material such that the particles agglomerate together; and
   heating the agglomerated particles at at least one temperature for a time sufficient to convert the agglomerated particles into agglomerate abrasive grain comprising a plurality of abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the heat-treated abrasive particles have a density of at least 85% of theoretical density, and the agglomerate abrasive grain has a porosity value of at least 10 percent.

52. The method according to claim 51, wherein the abrasive particles comprise fused abrasive particles.

53. The method according to claim 51, wherein the abrasive particles include abrasive particles selected from the group consisting of fused aluminum oxide abrasive particles, white fused alumina abrasive particles, heat-treated aluminum oxide abrasive particles, brown aluminum oxide abrasive particles, silicon carbide abrasive particles, boron carbide abrasive particles, titanium carbide abrasive particles, diamond abrasive particles, cubic boron nitride abrasive particles, garnet abrasive particles, fused alumina-zirconia abrasive particles, sintered alpha alumina-based abrasive particles, boehmite-based alumina abrasive particles, and a combination thereof.

54. The method according to claim 51, wherein the precursor abrasive particles comprise boehmite.

55. The method according to claim 51, wherein the bonding material comprises, on a theoretical oxide basis, at least 60 percent by weight $Al_2O_3$, based on the total metal oxide content of the bonding material.

56. The method according to claim 51, wherein the bonding material comprises, on a theoretical oxide basis, at least 90 percent by weight $Al_2O_3$, based on the total metal oxide content of the bonding material.

57. The method according to claim 51, further comprising, prior to said heating:
   drying the agglomerated particles;
   calcining the dried agglomerated particles to provide porous agglomerated particles; and
   impregnating the porous agglomerated particles with a composition comprising water and at least one of metal oxide or metal oxide precursor.

58. The method according to claim 51, wherein the average particle size of the particles is at least 25 micrometers.

59. The method according to claim 51, wherein the average particle size of the particles is at least 100 micrometers.

60. The method according to claim 51, wherein the abrasive particles are comprised of crystals having an average crystal size less than 10 micrometers.

61. The method according to claim 51, wherein the abrasive particles include sintered, crystalline ceramic alpha alumina-based abrasive particles.

62. The method according to claim 51, wherein the bonding material and the sintered, ceramic alpha alumina-based abrasive particles have substantially the same composition.

63. The method according to claim 51, the bonding material and the sintered, ceramic alpha alumina-based abrasive particles have substantially the same composition and microstructure.

64. The method according to claim 51, wherein the abrasive particles have a density of at least 95% of theoretical density.

65. The method according to claim 51, wherein the abrasive grain has a porosity value of at least 30 percent.

66. Agglomerate abrasive grain comprising a plurality of sintered polycrystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles have substantially the same volume.

67. The agglomerate abrasive grain according to claim 66, wherein the bonding material comprises, on a theoretical oxide basis, at least 60 percent by weight $Al_2O_3$, based on the total metal oxide content of the bonding material.

68. An abrasive article including:
   binder material; and
   a plurality of agglomerate abrasive grain according to claim 67 secured within said article by said binder material.

69. The agglomerate abrasive grain according to claim 54, wherein the bonding material comprises, on a theoretical oxide basis, at least 95 percent by weight $Al_2O_3$, based on the total metal oxide content of the bonding material.

70. The agglomerate abrasive grain according to claim 66, wherein the crystalline abrasive particles include alpha alumina-based abrasive particles.

71. The agglomerate abrasive grain according to claim 66, wherein the crystalline abrasive particles include sintered, crystalline ceramic alpha alumina-based abrasive particles.

72. The agglomerate abrasive grain according to claim 71, wherein the sintered, crystalline ceramic alpha alumina-based abrasive particles are comprised of alpha alumina crystals, and wherein the average size of the alpha alumina crystals is less than 1 micrometer.

73. The agglomerate abrasive grain according to claim 66, wherein the crystalline ceramic, metal oxide bonding material and the sintered, ceramic alpha alumina-based abrasive particles have substantially the same composition and microstructure.

74. Agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles are greater than 20 micrometers in size.

75. The agglomerate abrasive grain according to claim 74, wherein the bonding material comprises, on a theoretical oxide basis, at least 60 percent by weight $Al_2O_3$, based on the total metal oxide content of the bonding material.

76. The agglomerate abrasive grain according to claim 74, wherein the bonding material comprises, on a theoretical oxide basis, at least 90 percent by weight $Al_2O_3$, based on the total metal oxide content of the bonding material.

77. The agglomerate abrasive grain according to claim 74, wherein the crystalline abrasive particles include alpha alumina-based abrasive particles.

78. The agglomerate abrasive grain according to claim 74, wherein the crystalline abrasive particles include sintered, crystalline ceramic alpha alumina-based abrasive particles.

79. The agglomerate abrasive grain according to claim 78, wherein the sintered, crystalline ceramic alpha alumina-based abrasive particles are comprised of alpha alumina crystals, and wherein the average size of the alpha alumina crystals is less than 1 micrometer.

80. The agglomerate abrasive grain according to claim 78, wherein the crystalline ceramic, metal oxide bonding material and the sintered, ceramic alpha alumina-based abrasive particles have substantially the same composition and microstructure.

81. The agglomerate abrasive grain according to claim 74, wherein at least three of the largest abrasive particles are greater than 40 micrometers in size.

82. abrasive article including:
   binder material; and
   a plurality of agglomerate abrasive grain according to claim 74 secured within said article by said binder material.

83. Agglomerate abrasive grain comprising a plurality of sintered, crystalline abrasive particles bonded together via crystalline ceramic, metal oxide bonding material, wherein said agglomerate abrasive grain comprises, on a theoretical oxide basis, at least 85% by weight $Al_2O_3$, based on the total metal oxide content of the agglomerate abrasive grain, and wherein at least three of the largest abrasive particles are greater than 20 micrometers in size.

84. The agglomerate abrasive grain according to claim 83, wherein the bonding material comprises, on a theoretical oxide basis, at least 97 percent by weight $Al_2O_3$, based on the total metal oxide content of the bonding material.

85. The agglomerate abrasive grain according to claim 83, wherein the crystalline abrasive particles include alpha alumina-based abrasive particles.

86. The agglomerate abrasive grain according to claim 83, wherein the crystalline abrasive particles include sintered, crystalline ceramic alpha alumina-based abrasive particles.

87. The agglomerate abrasive grain according to claim 86, wherein the sintered, crystalline ceramic alpha alumina-based abrasive particles are comprised of alpha alumina crystals, and wherein the average size of the alpha alumina crystals is less than 1 micrometer.

88. The agglomerate abrasive grain according to claim 86, wherein the crystalline ceramic, metal oxide bonding material and the sintered, ceramic alpha alumina-based abrasive particles have substantially the same composition and microstructure.

89. The agglomerate abrasive grain according to claim 83, wherein at least three of the largest abrasive particles are greater than 40 micrometers in size.

90. An abrasive article including:
   binder material; and
   a plurality of agglomerate abrasive grain according to claim 83 secured within said article by said binder material.

91. The agglomerate abrasive grain according to claim 83, wherein the sintered, crystalline abrasive particles include sintered, crystalline ceramic alpha alumina-based abrasive particles.

92. The agglomerate abrasive grain according to claim 91, wherein the sintered, crystalline alpha alumina-based abrasive particles are comprised of alpha alumina crystals, and wherein the average size of the alpha alumina crystals is less than 1 micrometer.

93. The agglomerate abrasive grain according to claim 91, wherein at least three of the largest abrasive particles are greater than 40 micrometers in size.

94. An abrasive article including:
   binder material; and
   a plurality of agglomerate abrasive grain according to claim 91 secured within said article by said binder material.

95. Agglomerate abrasive grain comprising a plurality of sintered, polycrystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to about 60 percent.

96. The agglomerate abrasive grain according to claim 95, wherein the plurality of abrasive particles has a porosity value of at least 30 percent.

97. The agglomerate abrasive grain according to claim 95, wherein the agglomerate abrasive grain has a porosity value in the range from 30 to about 45 percent.

98. The agglomerate abrasive grain according to claim 95, wherein the bonding material comprises, on a theoretical oxide basis, at least 60 percent by weight $Al_2O_3$, based on the total metal oxide content of the bonding material.

99. The agglomerate abrasive grain according to claim 95, wherein the bonding material comprises, on a theoretical oxide basis, at least 90 percent by weight $Al_2O_3$, based on the total metal oxide content of the bonding material.

100. The agglomerate abrasive grain according to claim 95, wherein the bonding material comprises, on a theoretical oxide basis, at least 95 percent by weight $Al_2O_3$, based on the total metal oxide content of the bonding material.

101. The agglomerate abrasive grain according to claim 95, wherein the crystalline abrasive particles include alpha alumina-based abrasive particles.

102. The agglomerate abrasive grain according to claim 95, wherein the crystalline abrasive particles include sintered, crystalline ceramic alpha alurina-based abrasive particles.

103. The agglomerate abrasive grain according to claim 102, wherein the sintered, crystalline ceramic alpha alumina-based abrasive particles are comprised of alpha alumina crystals, and wherein the average size of the alpha alumina crystals is less than 1 micrometer.

104. The agglomerate abrasive grain according to claim 102, wherein the crystalline ceramic, metal oxide bonding material and the sintered, ceramic alpha alumina-based abrasive particles have substantially the same composition and microstructure.

105. The agglomerate abrasive grain according to claim 95, wherein at least three of the largest abrasive particles are greater than 20 micrometers in size.

106. An abrasive article including:
   binder material; and
   a plurality of agglomerate abrasive grain according to claim 95 secured within said article by said binder material.

107. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles have substantially the same volume, said method comprising:
   contacting dried, boehmite-based precursor particles in the presence of liquid such that a plurality of said precursor particles agglomerate together; and heating the agglomerated particles at at least one temperature for a time sufficient to provide said agglomerate abrasive grain.

108. The method according to claim 107, wherein the liquid comprises water.

109. The method according to claim 107, wherein the liquid comprises acidified water.

110. The method according to claim 107, wherein the liquid comprises water and metal oxide precursor.

111. The method according to claim 110, wherein the metal oxide precursor is a metal nitrate salt in solution.

112. The method according to claim 107, wherein the liquid comprises water and metal oxide precursor selected from the group consisting of chromium nitrate, cobalt nitrate, dysprosium nitrate, erbium nitrate, europium nitrate, ferric nitrate, gadolinium nitrate, lanthanum nitrate, lithium nitrate, magnesium nitrate, manganese nitrate, neodymium nitrate, nickel nitrate, praseodymium nitrate, samarium nitrate, yttrium nitrate, zinc nitrate, zirconium hydroxynitrate, zirconium nitrate, zirconium oxynitrate, and combinations thereof in solution.

113. The method according to claim 107, wherein contacting the dried, boehmite-based precursor particles in the presence of liquid includes rotating the particles in the presence of the liquid with a disc agglomerator.

114. The method according to claim 107, wherein the bonding material and the sintered, crystalline, alpha alumina-based abrasive particles comprise, on a theoretical oxide basis, at least 60 percent by weight $Al_2O_3$, based on the total metal oxide content of the bonding material.

115. The method according to claim 107, wherein the bonding material and the sintered, crystalline, alpha alumina-based abrasive particles comprise, on a theoretical oxide basis, at least 90 percent by weight $Al_2O_3$, based on the total metal oxide content of the bonding material.

116. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles have substantially the same volume, said method comprising:

contacting dried, boehmite-based precursor particles in the presence of liquid such that a plurality of said precursor particles agglomerate together;

drying the agglomerated precursor particles;

calcining the dried agglomerated precursor particles to provide porous agglomerated precursor particles;

impregnating the porous agglomerated precursor particles with a composition comprising liquid and at least one of metal oxide or metal oxide precursor; and heating the impregnated, agglomerated precursor particles at at least one temperature for a time sufficient to provide said agglomerate abrasive grain.

117. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles are greater than 20 micrometers in size, said method comprising:

contacting dried, boehmite-based precursor particles in the presence of liquid such that a plurality of said precursor particles agglomerate together; and heating the agglomerated particles at at least one temperature for a time sufficient to provide said agglomerate abrasive grain.

118. The method according to claim 117, wherein the liquid comprises water.

119. The method according to claim 117, wherein the liquid comprises acidified water.

120. The method according to claim 117, wherein the liquid comprises water and metal oxide precursor.

121. The method according to claim 120, wherein the metal oxide precursor is a metal nitrate salt in solution.

122. The method according to claim 117, wherein the liquid comprises water and metal oxide precursor selected from the group consisting of chromium nitrate, cobalt nitrate, dysprosium nitrate, erbium nitrate, europium nitrate, ferric nitrate, gadolinium nitrate, lanthanum nitrate, lithium nitrate, magnesium nitrate, manganese nitrate, neodymium nitrate, nickel nitrate, praseodymium nitrate, samarium nitrate, yttrium nitrate, zinc nitrate, zirconium hydroxynitrate, zirconium nitrate, zirconium oxynitrate, and combinations thereof in solution.

123. The method according to claim 117, wherein contacting the dried, boehmite-based precursor particles in the presence of liquid includes rotating the particles in the presence of the liquid with a disc agglomerator.

124. The method according to claim 117, wherein the sintered, crystalline, alpha alumina-based abrasive particles are comprised of alpha alumina crystals having an average size less than 10 micrometers.

125. The method according to claim 117, wherein the bonding material and the sintered, crystalline, alpha alumina-based abrasive particles comprise, on a theoretical oxide basis, at least 60 percent by weight $Al_2O_3$, based on the total metal oxide content of the bonding material.

126. The method according to claim 117, wherein the bonding material and the sintered, crystalline, alpha alumina-based abrasive particles comprise, on a theoretical oxide basis, at least 90 percent by weight $Al_2O_3$, based on the total metal oxide content of the bonding material.

127. The method according to claim 117, further comprising:

drying the agglomerated precursor particles;

calcining the dried agglomerated precursor particles to provide porous agglomerated precursor particles; and impregnating the porous agglomerated precursor particles with a composition comprising liquid and at least one of metal oxide or metal oxide precursor.

128. The method according to claim 127, wherein the liquid comprises water.

129. The method according to claim 127, wherein the liquid comprises acidified water.

130. The method according to claim 127, wherein the liquid comprises water and metal oxide precursor.

131. The method according to claim 130, wherein the metal oxide precursor is a metal nitrate salt in solution.

132. The method according to claim 127, wherein the liquid comprises water and metal oxide precursor selected from the group consisting of chromium nitrate, cobalt nitrate, dysprosium nitrate, erbium nitrate, europium nitrate, ferric nitrate, gadolinium nitrate, lanthanum nitrate, lithium nitrate, magnesium nitrate, manganese nitrate, neodymium nitrate, nickel nitrate, praseodymium nitrate, samarium nitrate, yttrium nitrate, zinc nitrate, zirconium hydroxynitrate, zirconium nitrate, zirconium oxynitrate, and combinations thereof in solution.

133. The method according to claim 127, wherein contacting the dried, boehmite-based precursor particles in the presence of liquid includes rotating the particles in the presence of the liquid with a disc agglomerator.

134. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein at least three of the largest abrasive particles are greater than 20 micrometers in size, said method comprising:

contacting dried, boehmite-based precursor particles in the presence of liquid such that a plurality of said precursor particles agglomerate together;

drying the agglomerated precursor particles;

calcining the dried agglomerated precursor particles to provide porous agglomerated precursor particles;

impregnating the porous agglomerated precursor particles with a composition comprising liquid and at least one of metal oxide or metal oxide precursor; and heating the impregnated, agglomerated precursor particles at at least one temperature for a time sufficient to provide said agglomerate abrasive grain.

135. A method for making agglomerate abrasive grain comprising a plurality of sintered, crystalline, alpha alumina-based abrasive particles bonded together via crystalline ceramic, metal oxide bonding material, wherein said agglomerate abrasive grain comprises, on a theoretical oxide basis, at least 85% by weight alumina, based on the total metal oxide content of the agglomerate abrasive grain, and wherein at least three of the largest abrasive particles are greater than 20 micrometers in size, said method comprising:

contacting dried, boehmite-based precursor particles in the presence of liquid such that a plurality of said precursor particles agglomerate together; and heating the agglomerated particles at at least one temperature for a time sufficient to provide the agglomerate abrasive grain.

136. The method according to claim 135, wherein the liquid comprises water.

137. The method according to claim 135, wherein the liquid comprises acidified water.

138. The method according to claim 135, wherein the liquid comprises water and metal oxide precursor.

139. The method according to claim 138, wherein the metal oxide precursor is a metal nitrate salt in solution.

140. The method according to claim 135, wherein the liquid comprises water and metal oxide precursor selected from the group consisting of chromium nitrate, cobalt nitrate, dysprosium nitrate, erbium nitrate, europium nitrate, ferric nitrate, gadolinium nitrate, lanthanum nitrate, lithium nitrate, magnesium nitrate, manganese nitrate, neodymium nitrate, nickel nitrate, praseodymium nitrate, samarium nitrate, yttrium nitrate, zinc nitrate, zirconium hydroxynitrate, zirconium nitrate, zirconium oxynitrate, and combinations thereof in solution.

141. The method according to claim 135, wherein contacting the dried, boehmite-based precursor particles in the presence of liquid includes rotating the particles in the presence of the liquid with a disc agglomerator.

142. The method according to claim 135, wherein the sintered, crystalline, alpha alumina-based abrasive particles are comprised of alpha alumina crystals having an average size less than 5 micrometers.

143. The method according to claim 135, wherein at least three of the largest abrasive particles are greater than 40 micrometers in size.

144. The method according to claim 135, wherein the bonding material and the sintered, crystalline, alpha alumina-based abrasive particles comprise, on a theoretical oxide basis, at least 95 percent by weight $Al_2O_3$, based on the total metal oxide content of the bonding material.

145. The method according to claim 135, further comprising:

drying the agglomerated precursor particles;

calcining the dried agglomerated precursor particles to provide porous agglomerated precursor particles; and impregnating the porous agglomerated precursor particles with a composition comprising liquid and at least one of metal oxide or metal oxide precursor.

146. A method for making agglomerate abrasive grain comprising a plurality of sintered, crystalline, alpha alumina-based abrasive particles bonded together via crystalline ceramic, metal oxide bonding material, wherein said agglomerate abrasive grain comprises, on a theoretical oxide basis, at least 85% by weight alumina, based on the total metal oxide content of the agglomerate abrasive grain, and wherein at least three of the largest abrasive particles are greater than 20 micrometers in size, said method comprising:

contacting dried, boehmite-based precursor particles in the presence of liquid such that a plurality of said precursor particles agglomerate together;

drying the agglomerated precursor particles;

calcining the dried agglomerated precursor particles to provide porous agglomerated precursor particles;

impregnating the porous agglomerated precursor particles with a composition comprising liquid and at least one of metal oxide or metal oxide precursor; and heating the impregnated, agglomerated precursor particles at at least one temperature for a time sufficient to provide said agglomerate abrasive grain.

147. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein said agglomerate abrasive grain has a porosity value in the range from 10 to 60 percent, said method comprising:

contacting dried, boehmite-based precursor particles in the presence of liquid such that a plurality of said precursor particles agglomerate together; and heating the agglomerated particles at at least one temperature for a time sufficient to provide said agglomerate abrasive grain.

148. The method according to claim 147, wherein the liquid comprises water.

149. The method according to claim 147, wherein the liquid comprises acidified water.

150. The method according to claim 147, wherein the liquid comprises water and metal oxide precursor.

151. The method according to claim 150, wherein the metal oxide precursor is a metal nitrate salt in solution.

152. The method according to claim 147, wherein the liquid comprises water and metal oxide precursor selected from the group consisting of chromium nitrate, cobalt nitrate, dysprosium nitrate, erbium nitrate, europium nitrate, ferric nitrate, gadolinium nitrate, lanthanum nitrate, lithium nitrate, magnesium nitrate, manganese nitrate, neodymium nitrate, nickel nitrate, praseodymium nitrate, samarium nitrate, yttrium nitrate, zinc nitrate, zirconium hydroxynitrate, zirconium nitrate, zirconium oxynitrate, and combinations thereof in solution.

153. The method according to claim 147, wherein contacting the dried, boehmite-based precursor particles in the presence of liquid includes rotating the particles in the presence of the liquid with a disc agglomerator.

154. The method according to claim 147, wherein the sintered, crystalline, alpha alumina-based abrasive particles are comprised of alpha alumina crystals having an average size less than 5 micrometers.

155. The method according to claim 147, wherein at least three of the largest abrasive particles are greater than 40 micrometers in size.

156. The method according to claim 147, wherein the bonding material and the sintered, crystalline, alpha alumina-based abrasive particles comprise, on a theoretical oxide basis, at least 60 percent by weight $Al_2O_3$, based on the total metal oxide content of the bonding material.

157. The method according to claim 147, wherein the bonding material and the sintered, crystalline, alpha alumina-based abrasive particles comprise, on a theoretical oxide basis, at least 90 percent by weight $Al_2O_3$, based on the total metal oxide content of the bonding material.

158. The method according to claim 147, wherein the plurality of abrasive particles has a porosity value of at least 30 percent.

159. The method according to claim 147, wherein the agglomerate abrasive grain has a porosity value in the range from 20 to about 50 percent.

160. The method according to claim 147, wherein the agglomerate abrasive grain has a porosity value in the range from 30 to about 45 percent.

161. The method according to claim 147, further comprising:
drying the agglomerated precursor particles;
calcining the dried agglomerated precursor particles to provide porous agglomerated precursor particles; and
impregnating the porous agglomerated precursor particles with a composition comprising liquid and at least one of metal oxide or metal oxide precursor.

162. A method for making agglomerate abrasive grain comprising a plurality of sintered, crystalline, alpha alumina-based abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein said agglomerate abrasive grain has a porosity value in the range from 10 to 60 percent, said method comprising:
contacting dried, boehmite-based precursor particles in the presence of liquid such that a plurality of said precursor particles agglomerate together;
drying the agglomerated precursor particles;
calcining the dried agglomerated precursor particles to provide porous agglomerated precursor particles;
impregnating the porous agglomerated precursor particles with a composition comprising liquid and at least one of metal oxide or metal oxide precursor; and
heating the impregnated, agglomerated precursor particles at least one temperature for a time sufficient to provide said agglomerate abrasive grain.

163. A method of abrading a surface, said method comprising:
contacting at least agglomerate abrasive grain comprising a plurality of abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, and wherein the abrasive particles have an average particle size of at least 5 micrometers, with a surface of a workpiece; and
moving at least of one said agglomerate abrasive grain or said surface relative to the other to abrade at least a portion of said surface with said agglomerate abrasive grain.

164. A method of abrading a surface, said method comprising:
contacting at least agglomerate abrasive grain comprising a plurality of polycrystalline abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent, with a surface of a workpiece; and
moving at least of one said agglomerate abrasive grain or said surface relative to the other to abrade at least a portion of said surface with said agglomerate abrasive grain.

165. A method according to claim 164, wherein the polycrystalline abrasive particles comprise at least one of fused aluminum oxide abrasive particles, silicon carbide abrasive particles, boron carbide abrasive particles, titanium carbide abrasive particles, diamond abrasive particles, cubic boron nitride abrasive particles, garnet, or fused alumina-zirconia abrasive particles.

166. A method of abrading a surface, said method comprising:
contacting at least agglomerate abrasive grain comprising a, plurality of sintered polycrystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles have substantially the same volume, with a surface of a workpiece; and
moving at least of one said agglomerate abrasive grain or said surface relative to the other to abrade at least a portion of said surface with said agglomerate abrasive grain.

167. A method of abrading a surface, said method comprising:
contacting at least agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles are greater than 20 micrometers in size, with a surface of a workpiece; and moving at least of one said agglomerate abrasive grain or said surface relative to the other to abrade at least a portion of said surface with said agglomerate abrasive grain.

168. A method of abrading a surface, said method comprising:

contacting at least agglomerate abrasive grain comprising a plurality of sintered, crystalline abrasive particles bonded together via crystalline ceramic, metal oxide bonding material, wherein said agglomerate abrasive grain comprises, on a theoretical oxide basis, at least 85% by weight $Al_2O_3$, based on the total metal oxide content of the agglomerate abrasive grain, and wherein at least three of the largest abrasive particles are greater than 20 micrometers in size, with a surface of a workpiece; and moving at least of one said agglomerate abrasive grain or said surface relative to the other to abrade at least a portion of said surface with said agglomerate abrasive grain.

169. A method of abrading a surface, said method comprising:

contacting at least agglomerate abrasive grain comprising a plurality of sintered, polycrystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to about 60 percent, with a surface of a workpiece; and moving at least of one said agglomerate abrasive grain or said surface relative to the other to abrade at least a portion of said surface with said agglomerate abrasive grain.

170. A method of abrading a surface, said method comprising:

contacting at least agglomerate abrasive grain comprising a plurality of abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, and wherein the abrasive particles have an average particle size of at least 5 micrometers, with a surface of a workpiece; and moving at least of one said agglomerate abrasive grain or said surface relative to the other to abrade at least a portion of said surface with said agglomerate abrasive grain.

171. Agglomerate abrasive grain comprising a plurality of sintered, crystalline alpha alumina-based abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent.

172. The agglomerate abrasive grain according to claim 171, wherein the abrasive particles have a density of at least 95% of theoretical density.

173. The agglomerate abrasive grain according to claim 171, wherein the abrasive particles comprise sintered, alpha alumina-based abrasive particles.

174. The agglomerate abrasive grain according to claim 171, wherein the bonding material and the sintered, crystalline alpha alumina-based abrasive particles have substantially the same composition.

175. An abrasive article including:

binder material; and a plurality of agglomerate abrasive grain according to claim 171 secured within said article by said binder material.

176. A method for making agglomerate abrasive grain comprising:

contacting a plurality of abrasive particles with a precursor bonding material such that the particles agglomerate together; and heating the agglomerated particles at at least one temperature for a time sufficient to convert the agglomerated particles, into agglomerate abrasive grain comprising a plurality of sintered, crystalline alpha alumina-based abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the abrasive particles of the agglomerate abrasive grain have an average particle size of at least 5 micrometers.

177. The method according to claim 176, wherein the abrasive particles comprise fused abrasive particles.

178. The method according to claim 176, wherein the bonding material comprises, on a theoretical oxide basis, at least 60 percent by weight $Al_2O_3$, based on the total metal oxide content of the bonding material.

179. The method according to claim 176, further comprising, prior to said heating:

drying the agglomerated particles;

calcining the dried agglomerated particles to provide porous agglomerated particles; and impregnating the porous agglomerated particles with a composition comprising water and at least one of metal oxide or metal oxide precursor.

180. The method according to claim 176, wherein the average particle size of the particles is at least 25 micrometers.

181. The method according to claim 176, wherein the abrasive particles include sintered, crystalline alpha alumina-based abrasive particles.

182. The method according to claim 176, wherein the bonding material and the sintered alpha alumina-based abrasive particles have substantially the same composition.

183. A method for making agglomerate abrasive grain comprising:

contacting a plurality of abrasive particles with a precursor bonding material such that the particles agglomerate together; and heating the agglomerated particles at at least one temperature for a time sufficient to convert the agglomerated particles into agglomerate abrasive grain comprising a plurality of sintered, crystalline alpha alumina-based abrasive particles bonded together with a sintered bonding material; wherein the sintered bonding material comprises, on a theoretical oxide basis, at least 50 percent by weight crystalline $Al_2O_3$, based on the total metal oxide content of the bonding material; and wherein the heat-treated abrasive particles have a density of at least 85% of theoretical density, and the agglomerate abrasive grain has a porosity value of at least 10 percent.

184. The method according to claim 183, wherein the abrasive particles comprise fused abrasive particles.

185. The method according to claim 183, wherein the precursor abrasive particles comprise boehmite.

186. The method according to claim 183, wherein the bonding material comprises, on a theoretical oxide basis, at least 90 percent by weight $Al_2O_3$, based on the total metal oxide content of the bonding material.

187. The method according to claim 183, further comprising, prior to said heating:
drying the agglomerated particles;
calcining the dried agglomerated particles to provide porous agglomerated particles; and
impregnating the porous agglomerated particles with a composition comprising water and at least one of metal oxide or metal oxide precursor.

188. The method according to claim 187, wherein the average particle size of the particles is at least 25 micrometers.

189. The method according to claim 187, wherein the abrasive particles are comprised of crystals having an average crystal size less than 10 micrometers.

190. The method according to claim 187, wherein the bonding material and the sintered, crystalline alpha alumina-based abrasive particles have substantially the same composition.

191. The method according to claim 187, wherein the abrasive grain has a porosity value of at least 30 percent.

192. Agglomerate abrasive grain comprising a plurality of sintered crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles have substantially the same volume.

193. The agglomerate abrasive grain according to claim 192, wherein the crystalline abrasive particles include alpha alumina-based abrasive particles.

194. The agglomerate abrasive grain according to claim 192, wherein the sintered, crystalline abrasive particles include sintered, crystalline alpha alumina-based abrasive particles.

195. An abrasive article including:
binder material; and
a plurality of agglomerate abrasive grain according to claim 192 secured within said article by said binder material.

196. Agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, wherein the crystalline abrasive particles are comprised of crystals having an average size less than 10 micrometers, and wherein at least three of the largest abrasive particles are greater than 20 micrometers in size.

197. The agglomerate abrasive grain according to claim 196, wherein the sintered, crystalline abrasive particles include sintered, crystalline alpha alumina-based abrasive particles.

198. The agglomerate abrasive grain according to claim 196, wherein at least three of the largest abrasive particles are greater than 40 micrometers in size.

199. An abrasive article including:
binder material; and
a plurality of agglomerate abrasive grain according to claim 196 secured within said article by said binder material.

200. Agglomerate abrasive grain comprising a plurality of sintered, crystalline abrasive particles bonded together via crystalline ceramic, metal oxide bonding material, wherein the bonding material comprises, on a theoretical oxide basis, at least 50 percent by weight $Al_2O_3$, based on the total metal oxide content of the bonding material, and wherein the agglomerate abrasive grain has a porosity value in the range from 10 to about 60 percent.

201. The agglomerate abrasive grain according to claim 200, wherein the plurality of abrasive particles has a porosity value of at least 30 percent.

202. The agglomerate abrasive grain according to claim 200, wherein the agglomerate abrasive grain has a porosity value in the range from 30 to about 45 percent.

203. The agglomerate abrasive grain according to claim 200, wherein the crystalline abrasive particles include alpha alumina-based abrasive particles.

204. The agglomerate abrasive grain according to claim 200, wherein the crystalline abrasive particles include sintered, crystalline alpha alumina-based abrasive particles.

205. The agglomerate abrasive grain according to claim 200, wherein at least three of the largest abrasive particles are greater than 20 micrometers in size.

206. An abrasive article including:
binder material; and
a plurality of agglomerate abrasive grain according to claim 200 secured within said article by said binder material.

207. A method of abrading a surface, said method comprising:
contacting at least agglomerate abrasive grain comprising a plurality of abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, wherein the abrasive particles have an average particle size of at least 5 micrometers, and wherein the abrasive particles comprises at least one of fused aluminum oxide abrasive particles, silicon carbide abrasive particles, boron carbide abrasive particles, titanium carbide abrasive particles, diamond abrasive particles, cubic boron nitride abrasive particles, garnet, or fused alumina-zirconia abrasive particles, with a surface of a workpiece; and
moving at least of one said agglomerate abrasive grain or said surface relative to the other to abrade at least a portion of said surface with said agglomerate abrasive grain.

208. A method of abrading a surface, said method comprising:
contacting at least agglomerate abrasive grain comprising a plurality of fused abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, and wherein the abrasive particles have an average particle size of at least 5 micrometers, with a surface of a workpiece; and
moving at least of one said agglomerate abrasive grain or said surface relative to the other to abrade at least a portion of said surface with said agglomerate abrasive grain.

209. A method of abrading a surface, said method comprising:

contacting at least agglomerate abrasive grain abrasive grain comprising a plurality of sintered, crystalline abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent, with a surface of a workpiece; and moving at least of one said agglomerate abrasive grain or said surface relative to the other to abrade at least a portion of said surface with said agglomerate abrasive grain.

210. A method of abrading a surface, said method comprising:

contacting at least agglomerate abrasive grain abrasive grain comprising a plurality of fused, polycrystalline abrasive particles bonded together with a sintered, crystalline ceramic bonding material, wherein the bonding material comprises, on a theoretical oxide basis, at least 50 percent by weight crystalline $Al_2O_3$, based on a total metal oxide content of the bonding material, the abrasive particles have a density of at least 85% of theoretical density, and the agglomerate abrasive grain has a porosity value of at least 10 percent, with a surface of a workpiece; and moving at least of one said agglomerate abrasive grain or said surface relative to the other to abrade at least a portion of said surface with said agglomerate abrasive grain.

* * * * *

UNITED STATES PATENT AND TRADEMARK OFFICE
CERTIFICATE OF CORRECTION

PATENT NO. : 6,790,126 B2
DATED : September 14, 2004
INVENTOR(S) : Wood, William P.

It is certified that error appears in the above-identified patent and that said Letters Patent is hereby corrected as shown below:

Column 2,
Line 30, delete "Lohrner" and insert in place thereof -- Lohmer --.

Column 4,
Line 36, delete "grain;" and insert in place thereof -- grain, --.

Column 9,
Line 23, delete "10" following "weight".
Line 24, delete "Al2O3" and insert in place thereof -- $Al_2O_3$ --.

Column 12,
Line 18, delete "Bochmite-based" and insert in place thereof -- Boehmite-based --.
Line 67, delete "Chemistry." and insert in place thereof -- Chemistry, --.

Column 14,
Line 40, delete "alumni" and insert in place thereof -- aluminas --.
Line 57, delete "$Y_3Ai_5O_{12}$" and insert in place thereof -- $Y_3Al_5O_{12}$ --.
Line 63, insert -- $Zn^{2+}$ -- following "$Ni^{2+}$".

Column 15,
Line 61, delete "Bochmite" and insert in place thereof -- Boehmite --.

Column 17,
Line 53, delete "he" and insert in place thereof -- be --.

Column 18,
Line 10, delete "bum" and insert in place thereof -- burn --.
Line 16, delete "noncrystalline" and insert in place thereof -- non-crystalline --.

Column 22,
Line 3, delete "aggiomerate" and insert in place thereof -- agglomerate --.

Column 23,
Line 2, delete "." following "rotatable".

Column 24,
Line 3, delete "nanomcters" and insert in place thereof -- nanometers --.

Column 26,
Line 23, insert -- . -- following "thereof."

UNITED STATES PATENT AND TRADEMARK OFFICE
CERTIFICATE OF CORRECTION

PATENT NO. : 6,790,126 B2
DATED : September 14, 2004
INVENTOR(S) : Wood, William P.

It is certified that error appears in the above-identified patent and that said Letters Patent is hereby corrected as shown below:

Column 28,
Line 45, delete "exarnple" and insert in place thereof -- example --.

Column 32,
Line 63, delete "zircoaluminatcs" and insert in place thereof -- zircoaluminates --.

Column 36,
Line 35, delete "$Mg(NO_3)_3.6H_2O$" and insert in place thereof -- $Mg(NO_3)_2.6H_2O$ --.

Column 38,
Line 7, delete,"(-6+20 mesh)" and insert in place thereof -- (-16+20 mesh) --.

Column 39,
Line 21, delete "perforrnance" and insert in place thereof -- performance --.
Line 36, delete "bevelcd" and insert in place thereof -- beveled --.

Column 43,
Line 2, insert -- . -- following "particles".
Lines 2-10, delete "The retained particles were fed into a rotary calcining kiln to provide calcined material of gamma alumina. The calcining kiln consisted of a 15 cm inner diameter, 1.2 meter in length, stainless steel tube having a 0.3 meter hot zone. The tube was inclined at a 3.0 degree angle with respect to the horizontal. The tube rotated at about 3.5 rpm, to provide a residence time in the tube of about 4-5 minutes. The temperature of the hot zone was about 650° C." and insert on line 3 as a new paragraph.
Line 4, delete "gamrna" and insert in place thereof -- gamma --.
Line 48, delete "boehmite" and insert in place thereof -- -boehmite --.

Column 47,
Line 60, insert -- ( -- following "cumulative".

Column 48,
Line 20, delete "70%" and insert in place thereof -- 170% --.

Column 49,
Line 64, delete "mctal" and insert in place thereof -- metal --.

Column 51,
Line 50, delete "alumrina" and insert in place thereof -- alumina --.

UNITED STATES PATENT AND TRADEMARK OFFICE
CERTIFICATE OF CORRECTION

PATENT NO. : 6,790,126 B2
DATED : September 14, 2004
INVENTOR(S) : Wood, William P.

It is certified that error appears in the above-identified patent and that said Letters Patent is hereby corrected as shown below:

Column 54,
Line 1, insert -- wherein -- following "51".
Line 28, delete "54" and insert in place thereof -- 66 --.

Column 55,
Line 16, insert -- An -- before "abrasive".

Column 56,
Line 36, delete "alurina" and insert in place thereof -- alumina --.

Column 58,
Line 40, delete "mcthod" and insert in place thereof -- method --.

Column 62,
Line 39, delete "," before "plurality".
Line 39, insert -- , -- following "sintered".

Signed and Sealed this

Thirteenth Day of December, 2005

JON W. DUDAS
*Director of the United States Patent and Trademark Office*